United States Patent
Nakagawa

(10) Patent No.: US 9,949,089 B2
(45) Date of Patent: Apr. 17, 2018

(54) POSITION MANAGEMENT SYSTEM, POSITION MANAGEMENT APPARATUS, AND POSITION MANAGEMENT METHOD

(71) Applicant: Kenichi Nakagawa, Tokyo (JP)

(72) Inventor: Kenichi Nakagawa, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/140,713

(22) Filed: Apr. 28, 2016

(65) Prior Publication Data

US 2016/0337812 A1    Nov. 17, 2016

(30) Foreign Application Priority Data

May 13, 2015 (JP) .................................. 2015-098298
May 13, 2015 (JP) .................................. 2015-098299

(Continued)

(51) Int. Cl.
*H04W 4/04*   (2009.01)
*H04W 64/00*  (2009.01)
(Continued)

(52) U.S. Cl.
CPC ............. *H04W 4/04* (2013.01); *G01S 5/0252* (2013.01); *H04W 4/008* (2013.01); *H04W 4/028* (2013.01); *H04W 4/043* (2013.01); *H04W 64/006* (2013.01)

(58) Field of Classification Search
CPC ..... G01S 5/0252; H04W 4/008; H04W 4/028; H04W 4/04; H04W 4/043; H04W 64/006
See application file for complete search history.

(56) References Cited

U.S. PATENT DOCUMENTS 9,392,411 B1 *   7/2016  Al-Yousif ............. H04W 4/023
2004/0171373 A1 * 9/2004  Suda ..................... H04W 88/02
                                                          455/415

(Continued)

FOREIGN PATENT DOCUMENTS

JP    5225242    7/2013
JP    5257662    8/2013

(Continued)

OTHER PUBLICATIONS

Office Action dated Sep. 22, 2017 issued to related U.S. Appl. No. 15/151,627.

*Primary Examiner* — Babar Sarwar
(74) *Attorney, Agent, or Firm* — IPUSA, PLLC

(57) ABSTRACT

A position management system includes a first receiving unit configured to receive a radio wave according to a predetermined wireless communication standard from a first device when the movement of a second device is detected; a second receiving unit configured to receive second position information including latitude and longitude information from an IMES transmitting device when the movement of the second device is detected; and an acquiring unit configured to measure an intensity of the received radio wave, estimate a position of the second device based on the intensity, and acquire first position information indicating the estimated position. The second receiving unit receives a radio wave from GPS when the second device moves outdoors where communication with the IMES transmitting device is not possible, and sets latitude and longitude information, which is measured based on the radio wave received from the GPS, as the second position information.

14 Claims, 37 Drawing Sheets

(30) Foreign Application Priority Data

| May 13, 2015 | (JP) | ................................ 2015-098300 |
| May 13, 2015 | (JP) | ................................ 2015-098301 |
| May 13, 2015 | (JP) | ................................ 2015-098302 |

(51) Int. Cl.
  *H04W 4/02* (2018.01)
  *H04W 4/00* (2018.01)
  *G01S 5/02* (2010.01)

(56) References Cited

U.S. PATENT DOCUMENTS

2010/0090899 A1* 4/2010 Zhao ..................... G01S 5/0252
                                                      342/387
2012/0122487 A1* 5/2012 Holm ................... G01C 21/206
                                                      455/456.2
2012/0223860 A1* 9/2012 Leclercq ................ G01S 19/34
                                                      342/357.63
2013/0342399 A1* 12/2013 Fukuda ..................... G01S 1/02
                                                      342/386
2014/0035724 A1* 2/2014 Rothschild .............. G01S 13/75
                                                      340/8.1
2014/0087710 A1   3/2014 Kusakari et al.

FOREIGN PATENT DOCUMENTS

| JP | 2014-025910 | 2/2014 |
| JP | 2014-077777 | 5/2014 |
| JP | 5602686 | 10/2014 |
| JP | 2014-217049 | 11/2014 |

* cited by examiner

| DEVICE ID | INSTALLATION AREA ID |
|---|---|
| AP1 | A001 |
| AP2 | A001 |
| AP3 | A002 |
| ... | ... |

FIG.7

TAG ID:T002

TAG ID:T001   43

| TIME AND DATE | FIRST POSITION INFORMATION | | SECOND POSITION INFORMATION | |
|---|---|---|---|---|
| | AREA ID | COORDINATE INFORMATION | LATITUDE AND LONGITUDE INFORMATION | FLOOR INFORMATION |
| 2015/1/31 14:01:03 | — | — | $x_n, y_n$ | — |
| 2015/1/31 14:01:02 | — | — | $x_{n-1}, y_{n-1}$ | — |
| 2015/1/31 14:01:01 | — | — | $x_{n-2}, y_{n-2}$ | — |
| ⋮ | ⋮ | ⋮ | ⋮ | ⋮ |
| 2015/1/31 8:30:45 | A001 | $X_m, Y_m$ | $x_m, y_m$ | 1.0 |
| 2015/1/31 8:30:44 | A001 | $X_{m-1}, Y_{m-1}$ | $x_{m-1}, y_{m-1}$ | 1.0 |
| 2015/1/31 8:30:43 | A001 | $X_{m-2}, Y_{m-2}$ | $x_{m-2}, y_{m-2}$ | 1.0 |
| ⋮ | ⋮ | ⋮ | ⋮ | ⋮ |

MOVEMENT HISTORY INFORMATION OF OUTDOORS

MOVEMENT HISTORY INFORMATION OF INDOORS

| AREA ID | MAP DISPLAY DATA |
|---------|------------------|
| A001 | X WING FIRST FLOOR |
| A002 | X WING SECOND FLOOR |
| A003 | Y WING FIRST FLOOR |
| ... | ... |

| TAG ID | ARTICLE NAME |
|--------|--------------|
| T001 | MOLD OF ○○ |
| T002 | MOLD OF ○× |
| T003 | MOLD OF △△ |
| ... | ... |

| DEVICE ID | INSTALLATION AREA ID |
|---|---|
| AP1 | A001 |
| AP2 | A001 |
| AP3 | A002 |
| ... | ... |

| TAG ID | STORAGE DESTINATION | |
|---|---|---|
| | NAME | HOST NAME |
| T001 | STORAGE SYSTEM A | hosta.xxx.co.jp |
| T002 | STORAGE SYSTEM A | hosta.xxx.co.jp |
| T003 | STORAGE SYSTEM A | hosta.xxx.co.jp |
| ... | ... | ... |
| T101 | STORAGE SYSTEM B | hostb.xxx.co.jp |
| T102 | STORAGE SYSTEM B | hostb.xxx.co.jp |
| T103 | STORAGE SYSTEM B | hostb.xxx.co.jp |
| ... | ... | ... |

FIG.26A　　　FIG.26B

| TERMINAL ID |
|---|
| DEV001 |
| DEV002 |
| DEV003 |
| ⋮ |

444-1

| TERMINAL ID |
|---|
| DEV101 |
| DEV102 |
| DEV103 |
| ⋮ |

TAG ID:T002

TAG ID:T001

| TIME AND DATE | POSITION INFORMATION | |
|---|---|---|
| | AREA ID | COORDINATE INFORMATION |
| 2015/1/31 14:01:03 | A001 | $X_n, Y_n$ |
| 2015/1/31 14:01:02 | A001 | $X_{n-1}, Y_{n-1}$ |
| 2015/1/31 14:01:01 | A001 | $X_{n-2}, Y_{n-2}$ |
| ... | ... | ... |

TAG ID:T102

TAG ID:T101

| TIME AND DATE | POSITION INFORMATION | |
|---|---|---|
| | AREA ID | COORDINATE INFORMATION |
| 2015/1/31 9:30:01 | A002 | $X_m, Y_m$ |
| 2015/1/31 9:30:00 | A002 | $X_{m-1}, Y_{m-1}$ |
| 2015/1/31 9:29:59 | A002 | $X_{m-2}, Y_{m-2}$ |
| ... | ... | ... |

| AREA ID | MAP DISPLAY DATA |
|---------|------------------|
| A001 | X WING FIRST FLOOR |
| A002 | X WING SECOND FLOOR |
| A003 | Y WING FIRST FLOOR |
| ... | ... |

FIG.29A

| TAG ID | ARTICLE NAME |
|--------|--------------|
| T001 | MOLD OF ○○ OF COMPANY ABC |
| T002 | MOLD OF ○× OF COMPANY ABC |
| T003 | MOLD OF △△ OF COMPANY ABC |
| ... | ... |

| TAG ID | ARTICLE NAME |
|--------|--------------|
| T101 | MOLD OF ○△ OF COMPANY XYZ |
| T102 | MOLD OF △× OF COMPANY XYZ |
| T103 | MOLD OF ×× OF COMPANY XYZ |
| ... | ... |

SELECTION OF ARTICLE

PLEASE SELECT THE ARTICLE NAME OF AN ARTICLE
YOU WANT TO SEARCH FOR

| IMAGE | ARTICLE NAME |
|-------|--------------|
|       | MOLD OF ○○ OF COMPANY ABC |
|       | MOLD OF ○× OF COMPANY ABC |
|       | MOLD OF ○△ OF COMPANY XYZ |

FIG.37A

TAG ID:T002

TAG ID:T001

| TIME AND DATE | FIRST POSITION INFORMATION | | SECOND POSITION INFORMATION | | |
|---|---|---|---|---|---|
| | AREA ID | COORDINATE INFORMATION | LATITUDE AND LONGITUDE INFORMATION | FLOOR INFORMATION | |
| 2015/1/31 14:01:03 | A001 | $X_n, Y_n$ | $x_n, y_n$ | 1.0 | |
| 2015/1/31 14:01:02 | A001 | $X_{n-1}, Y_{n-1}$ | $x_{n-1}, y_{n-1}$ | 1.0 | |
| 2015/1/31 14:01:01 | A001 | $X_{n-2}, Y_{n-2}$ | $x_{n-2}, y_{n-2}$ | 1.0 | |
| ... | ... | ... | ... | ... | |

TAG ID:T102

TAG ID:T101

| TIME AND DATE | FIRST POSITION INFORMATION | | SECOND POSITION INFORMATION | |
|---|---|---|---|---|
| | AREA ID | COORDINATE INFORMATION | LATITUDE AND LONGITUDE INFORMATION | FLOOR INFORMATION |
| 2015/1/31 9:30:01 | A002 | $X_m, Y_m$ | $x_m, y_m$ | 1.5 |
| 2015/1/31 9:30:00 | A002 | $X_{m-1}, Y_{m-1}$ | $x_{m-1}, y_{m-1}$ | 1.5 |
| 2015/1/31 9:29:59 | A002 | $X_{m-2}, Y_{m-2}$ | $x_{m-2}, y_{m-2}$ | 1.5 |
| ... | ... | ... | ... | ... |

445A-2

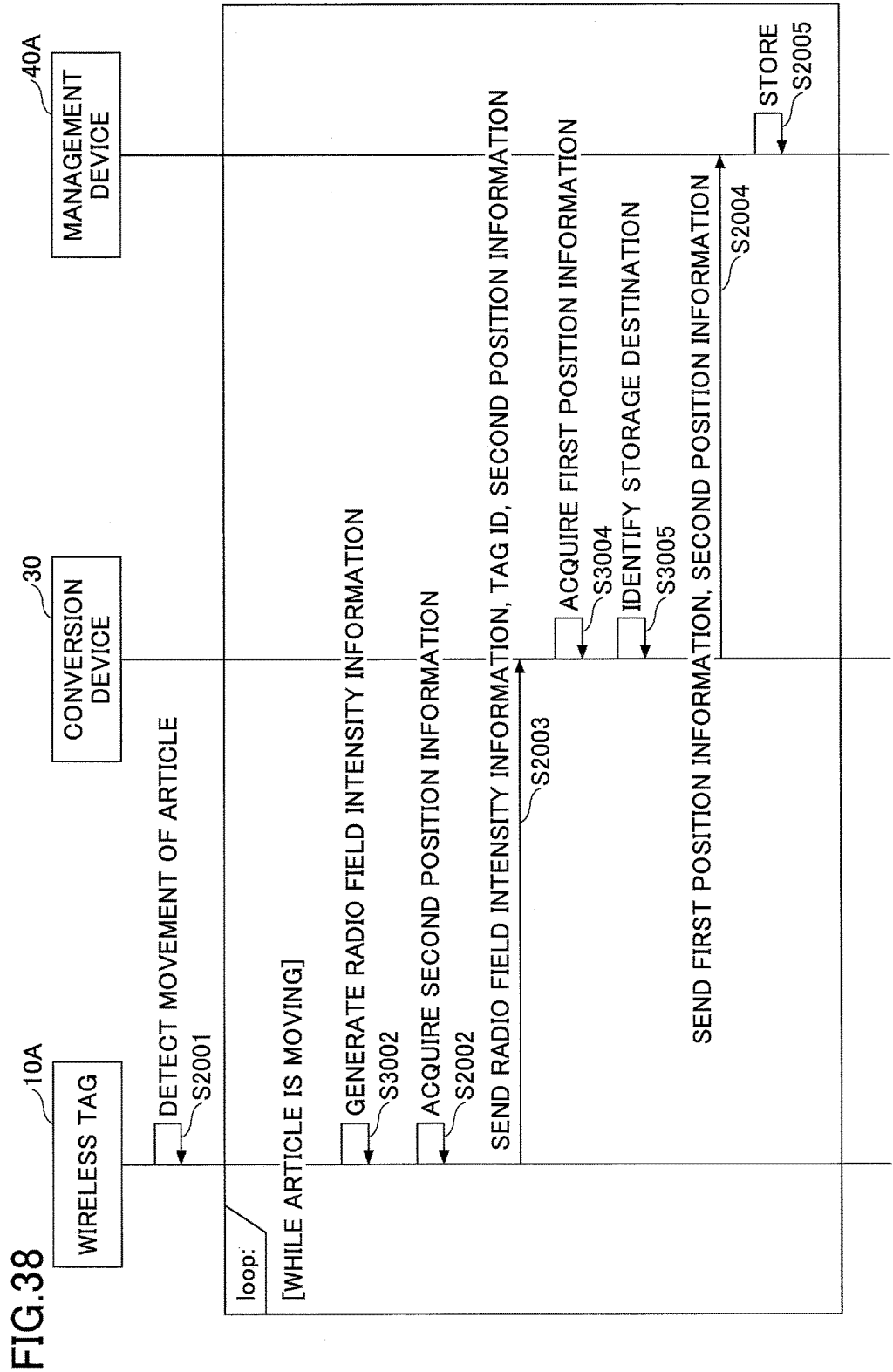

POSITION MANAGEMENT SYSTEM, POSITION MANAGEMENT APPARATUS, AND POSITION MANAGEMENT METHOD

BACKGROUND OF THE INVENTION

1. Field of the Invention

The present invention relates to a position management system, a position management apparatus, and a position management method.

2. Description of the Related Art

Conventionally, there is known a technology of estimating position information of an article indoors, by using radio waves received by a communication device such as a wireless tag, etc., that is attached, etc., to the article. By using this technology, the user such as an administrator of the article, etc., recognizes the position of the article, such as the installation location, the storage location, etc.

Furthermore, there is known an indoor positioning system in which a plurality of location positioning devices are combined (see, for example, Patent Document 1).

However, the purpose of the above conventional technology is to manage the position of an article indoors, and therefore when the article is taken outdoors from indoors, etc., the position of the article cannot be managed. Therefore, for example, when an article that is installed or stored indoors is taken outdoors, the position of the article cannot be recognized.

Furthermore, in the above conventional technology, there have been cases where the position information of an article cannot be flexibly managed. For example, when the position information of an article is managed by a server, it has not been possible to flexibly change the server managing the position information, according to the type, the importance level, etc., of the article.

Patent Document 1: Japanese Patent No. 5225242

SUMMARY OF THE INVENTION

The present invention provides a position management system, a position management apparatus, and a position management method, in which one or more of the above-described disadvantages are eliminated.

According to an aspect of the present invention, there is provided a position management system for managing position information of a second device configured to perform communication with a predetermined first device installed indoors and an IMES transmitting device, the position management system including one or more information processing apparatuses for implementing various functions of the position management system, the position management system including a detecting unit configured to detect a movement of the second device; a first receiving unit configured to receive a radio wave according to a predetermined wireless communication standard from the first device when the movement of the second device is detected by the detecting unit; a second receiving unit configured to receive second position information including latitude and longitude information from the IMES transmitting device when the movement of the second device is detected by the detecting unit; an acquiring unit configured to measure an intensity of the radio wave received by the first receiving unit, estimate a position of the second device based on the measured intensity of the radio wave, and acquire first position information indicating the estimated position; and a storing unit configured to store the first position information and the second position information in association with time information in a predetermined storage unit, wherein the second receiving unit receives a radio wave from GPS when the second device moves outdoors where the second device cannot perform communication with the IMES transmitting device, and sets latitude and longitude information, which is measured based on the radio wave received from the GPS, as the second position information.

According to an aspect of the present invention, there is provided a position management apparatus for managing position information of a second device configured to perform communication with a predetermined first device installed indoors and an IMES transmitting device, the position management apparatus including a receiving unit configured to receive information indicating an intensity of a radio wave received from the first device by the second device, and second position information including latitude and longitude information received from the IMES transmitting device by the second device, according to a movement of the second device; an acquiring unit configured to estimate a position of the second device based on the information indicating the intensity of the radio wave received by the receiving unit, and acquire first position information indicating the estimated position; and a storing unit configured to store the first position information and the second position information in association with time information in a predetermined storage unit, wherein the receiving unit receives a radio wave from GPS when the second device moves outdoors where the second device cannot perform communication with the IMES transmitting device, and acquires the second position information indicating latitude and longitude information that is measured based on the radio wave received from the GPS.

According to an aspect of the present invention, there is provided a position management method performed in a position management system for managing position information of a second device configured to perform communication with a predetermined first device installed indoors and an IMES transmitting device, the position management system including one or more information processing apparatuses for implementing various functions of the position management system, the position management method including detecting a movement of the second device; receiving a radio wave according to a predetermined wireless communication standard from the first device when the movement of the second device is detected at the detecting; receiving second position information including latitude and longitude information from the IMES transmitting device when the movement of the second device is detected at the detecting; measuring an intensity of the received radio wave, estimating a position of the second device based on the measured intensity of the radio wave, and acquiring first position information indicating the estimated position; and storing the first position information and the second position information in association with time information in a predetermined storage unit, wherein the receiving of the second position information includes receiving a radio wave from GPS when the second device moves outdoors where the second device cannot perform communication with the IMES transmitting device, and setting latitude and longitude information, which is measured based on the radio wave received from the GPS, as the second position information.

According to an aspect of the present invention, there is provided a position management method performed in a position management apparatus for managing position information of a second device configured to perform communication with a predetermined first device installed indoors and an IMES transmitting device, the position management method including receiving information indicating an intensity of a radio wave received from the first device by the second device, and second position information including latitude and longitude information received from the IMES transmitting device by the second device, according to a movement of the second device; estimating a position of the second device based on the information indicating the intensity of the radio wave received at the receiving, and acquiring first position information indicating the estimated position; and storing the first position information and the second position information in association with time information in a predetermined storage unit, wherein the receiving includes receiving a radio wave from GPS when the second device moves outdoors where the second device cannot perform communication with the IMES transmitting device, and acquiring the second position information indicating latitude and longitude information that is measured based on the radio wave received from the GPS.

According to an aspect of the present invention, there is provided a non-transitory computer-readable recording medium storing a program that causes a computer that constitutes a position management apparatus to execute a process, the position management apparatus managing position information of a second device configured to perform communication with a predetermined first device installed indoors and an IMES transmitting device, the process including receiving information indicating an intensity of a radio wave received from the first device by the second device, and second position information including latitude and longitude information received from the IMES transmitting device by the second device, according to a movement of the second device; estimating a position of the second device based on the information indicating the intensity of the radio wave received at the receiving, and acquiring first position information indicating the estimated position; and storing the first position information and the second position information in association with time information in a predetermined storage unit, wherein the receiving includes receiving a radio wave from GPS when the second device moves outdoors where the second device cannot perform communication with the IMES transmitting device, and acquiring the second position information indicating latitude and longitude information that is measured based on the radio wave received from the GPS.

According to an aspect of the present invention, there is provided a position management system for managing position information of a second device configured to perform wireless communication with a predetermined first device installed indoors, the position management system including one or more information processing apparatuses for implementing various functions of the position management system, the position management system including a receiving unit configured to receive a radio wave of the wireless communication from the first device when movement of the second device is detected; a measuring unit configured to measure an intensity of the radio wave when the radio wave is received from the first device by the receiving unit; an acquiring unit configured to estimate a position of the second device based on the intensity of the radio wave measured by the measuring unit, and acquire position information indicating the estimated position; an identifying unit configured to identify a storage destination of the position information acquired by the acquiring unit, according to the second device; and a storing unit configured to store the position information in association with time information in a predetermined storage unit, based on the storage destination identified by the identifying unit.

BRIEF DESCRIPTION OF THE DRAWINGS

Other objects, features and advantages of the present invention will become more apparent from the following detailed description when read in conjunction with the accompanying drawings, in which:

FIG. 6 illustrates an example of an installation area database;

FIG. 7 illustrates an example of a movement history information database;

FIG. 8 illustrates an example of a map information database;

FIG. 9 illustrates an example of an article information database;

FIG. 24 illustrates an example of an installation area database;

FIG. 25 illustrates an example of a storage destination information database;

FIGS. 26A and 26B illustrate examples of an authentication information database;

FIGS. 27A and 27B illustrate examples of a movement history information database;

FIG. 28 illustrates an example of a map information database;

FIGS. 29A and 29B illustrate examples of an article information database;

FIG. 32 illustrates an example of an article selection screen;

FIGS. 37A and 37B illustrate examples of a movement history information database;

FIG. 38 is a sequence diagram of an example of a process of storing the movement history information according to the fourth embodiment;

DETAILED DESCRIPTION OF THE PREFERRED EMBODIMENTS

Embodiments of the present invention will be described with reference to the accompanying drawings.

First Embodiment

<System Configuration>

Figure 1:
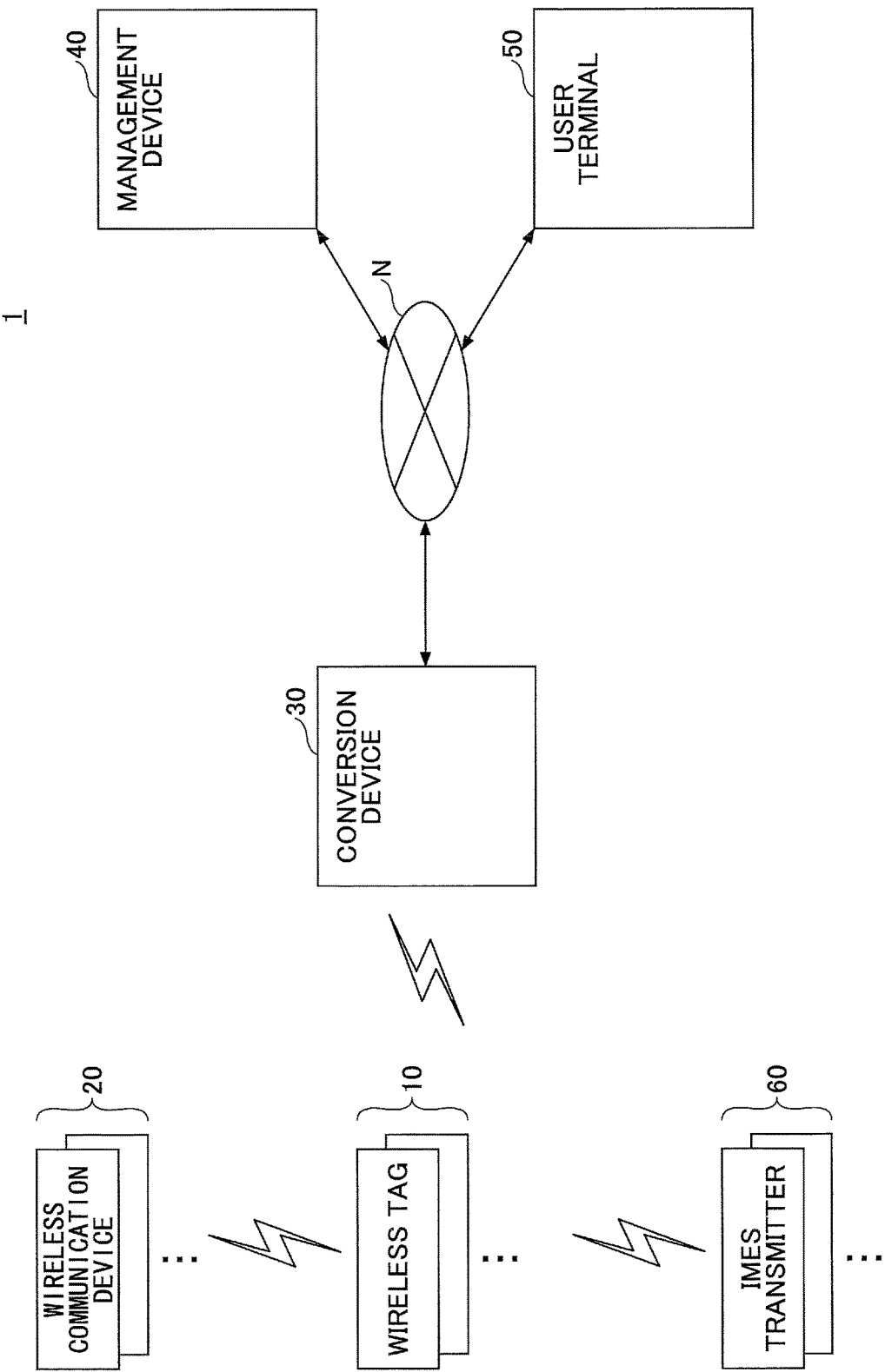
FIG. 1 illustrates an example of a system configuration of a position management system according to a first embodiment.

First, a description is given of a position management system 1 according to a first embodiment of the present invention. FIG. 1 illustrates an example of a system configuration of the position management system 1 according to the first embodiment. The position management system 1 according to the first embodiment includes a wireless tag 10, a wireless communication device 20, a conversion device 30, and a management device 40. Furthermore, the position management system 1 according to the first embodiment includes a user terminal 50 and an IMES (Indoor Messaging System) transmitter 60. Furthermore, the conversion device 30, the management device 40, and the user terminal 50 are communicatively connected to each other via a network N such as the Internet, a telephone line network, etc.

The wireless tag 10 is a device that is, for example, attached to each article that is a management target, whose position, such as the installation location, the storage location, etc., is managed. When an article to which the wireless tag 10 is attached is moved, the wireless tag 10 measures the radio field intensity of wireless communication received from the wireless communication device 20, and sends information relevant to the measured radio field intensity (radio field intensity information) to the conversion device 30.

Furthermore, when an article to which the wireless tag 10 is attached is moved, the wireless tag 10 acquires position information such as the latitude and longitude information, from the IMES transmitter 60 and GPS (Global Positioning System). More specifically, the wireless tag 10 acquires position information from the IMES transmitter 60 indoors, and acquires position information based on radio waves received from GPS outdoors.

The wireless communication device 20 is a device for performing wireless communication with the wireless tag 10, etc., according to a predetermined wireless communication standard. A plurality of wireless communication devices 20 are installed in the room or on the floor, etc., (that is, in an "area" described below) where the article that is the management target is installed, stored, etc. The plurality of wireless communication devices 20 transmit radio waves of wireless communication in a predetermined surrounding range at every predetermined time interval. Here, as the predetermined wireless communication standard, standards of various kinds of wireless communication may be used, such as Zigbee (registered trademark), RFID (Radio Frequency Identifier), Bluetooth (registered trademark), infrared rays, Wi-Fi (registered trademark), ultrasonic waves, etc.

The conversion device 30 is an information processing apparatus for receiving the radio field intensity information and position information such as the latitude and longitude information from the wireless tag 10. Furthermore, the conversion device 30 converts the radio field intensity information received from the wireless tag 10 into position information. Then, the conversion device 30 sends the position information converted from the radio field intensity information and the position information such as the latitude and longitude information, to the management device 40.

Here, in the following, the position information converted from the radio field intensity information at the conversion device 30 is expressed as "first position information". On the other hand, the position information according to the IMES standard acquired from the IMES transmitter 60 and position information acquired based on radio waves received from GPS, are expressed as "second position information".

The management device 40 is a storage device or an information processing apparatus that manages the first position information and the second position information received from the conversion device 30. Furthermore, the management device 40 also manages information relevant to a map of the room or the floor, etc., where the article that is the management target is installed, stored, etc. In response to a request from the user terminal 50, the management device 40 sends first position information, second position information, and information relevant to a map, to the user terminal 50 that is the request source.

Note that the position management system 1 may use, for example, a cloud storage, etc., provided from an external service provider, instead of the management device 40, and the position management system 1 may be adapted to various providing modes referred to as ASP (Application Service Provider), Web service, etc.

The user terminal 50 is an information processing apparatus that the user uses for displaying a position of an article that is a management target. The user terminal 50 acquires, from the management device 40, information of an article to be searched for such as first position information, second position information, and information relevant to a map, and displays the position of the article on the map based on the acquired information. Accordingly, the user is able to recognize the installation location, the storage location, etc., of the article. Here, as the user terminal 50, for example, a mobile phone, a smartphone, a tablet terminal, a notebook PC, a desktop PC, etc., may be used.

The IMES transmitter 60 is a device for transmitting the second position information according to the IMES standard. At least one IMES transmitter 60 is installed in an area, and the IMES transmitter 60 sends the second position information within a predetermined surrounding range. Here, the second position information according to the IMES standard includes the latitude and longitude information, the floor information, etc., of the IMES transmitter 60 set in advance. Floor information is information relevant to the floor of a building, etc., and is set in units of, for example, 0.5 floors. Accordingly, it is possible to recognize the floor of a building on which the article to which the wireless tag 10 is attached is located, in the latitude and longitude indicated by the latitude and longitude information included in the second position information.

Note that the configuration of the position management system 1 illustrated in FIG. 1 is one example; the position management system 1 may have another configuration. For example, the conversion device 30 and the management device 40 may be respectively constituted by a plurality of devices, or the conversion device 30 and the management device 40 may constitute a single device.

<Hardware Configuration>

Next, a description is given of a hardware configuration of the position management system 1 according to the first embodiment.

Figure 2:
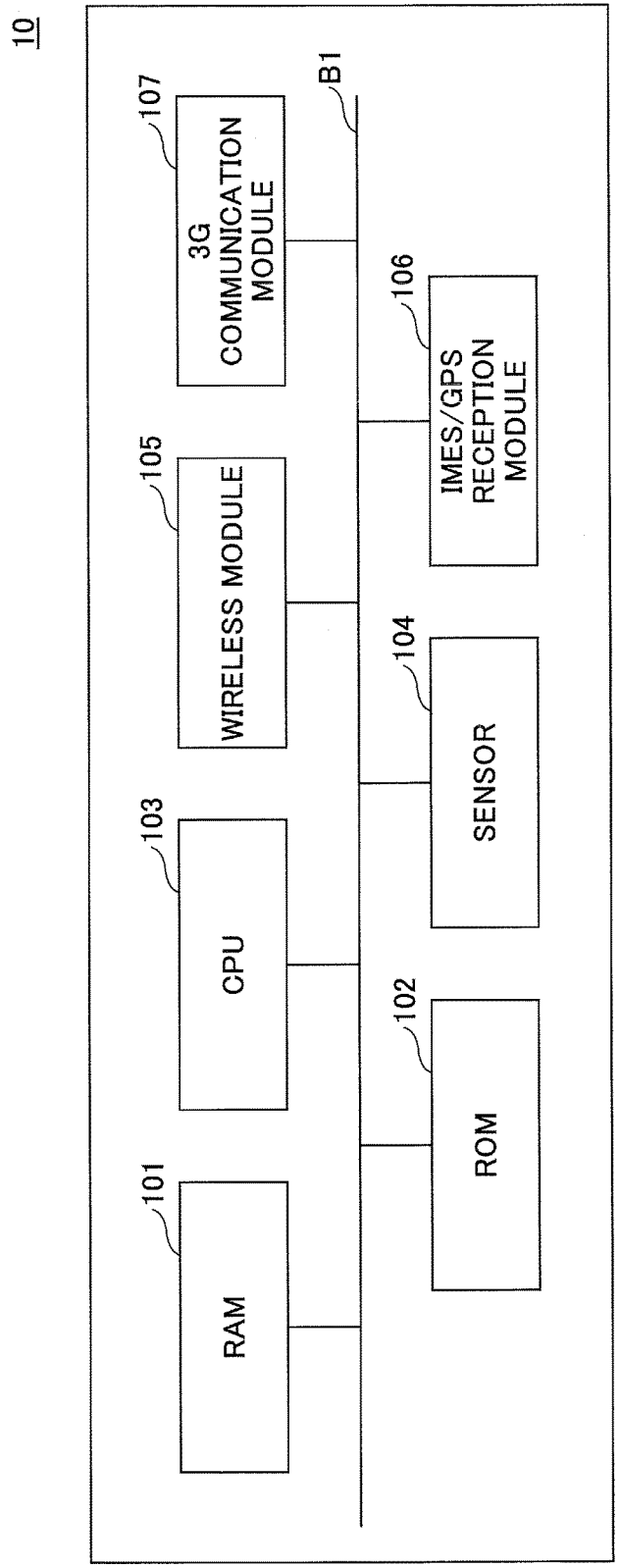
FIG. 2 illustrates an example of a hardware configuration of a wireless tag according to the first embodiment.

First, a hardware configuration of the wireless tag 10 is described with reference to FIG. 2. FIG. 2 illustrates an example of a hardware configuration of the wireless tag 10 according to the first embodiment. The wireless tag 10 includes a RAM (Random Access Memory) 101, a ROM (Read Only Memory) 102, and a CPU (Central Processing Unit) 103. Furthermore, the wireless tag 10 includes a sensor 104, a wireless module 105, an IMES/GPS reception module 106, and a 3G (3rd Generation) communication module 107. Furthermore, these hardware elements are connected to each other by a bus B1.

The RAM 101 is a volatile semiconductor memory for temporarily storing programs and data. The ROM 102 is a non-volatile semiconductor memory that can store data even after the power is turned off. The CPU 103 is an arithmetic device that loads, for example, the programs and data of the ROM 102, into the RAM 101, and executes various processes.

The sensor 104 is, for example, an acceleration sensor, a gyro sensor, etc., and is a sensor for detecting that the article has started moving or that the article is moving, according to the oscillation of the article to which the wireless tag 10 is attached.

The wireless module 105 is a module for performing wireless communication with the wireless communication device 20 according to a predetermined wireless communication standard.

The IMES/GPS reception module 106 is a module for receiving radio waves according to the IMES standard sent from the IMES transmitter 60 and radio waves sent from GPS.

The 3G communication module 107 is a module for performing communication by a 3G line.

The wireless tag 10 according to the present embodiment implements various processes described below, by the hardware configuration illustrated in FIG. 2.

Figure 3:
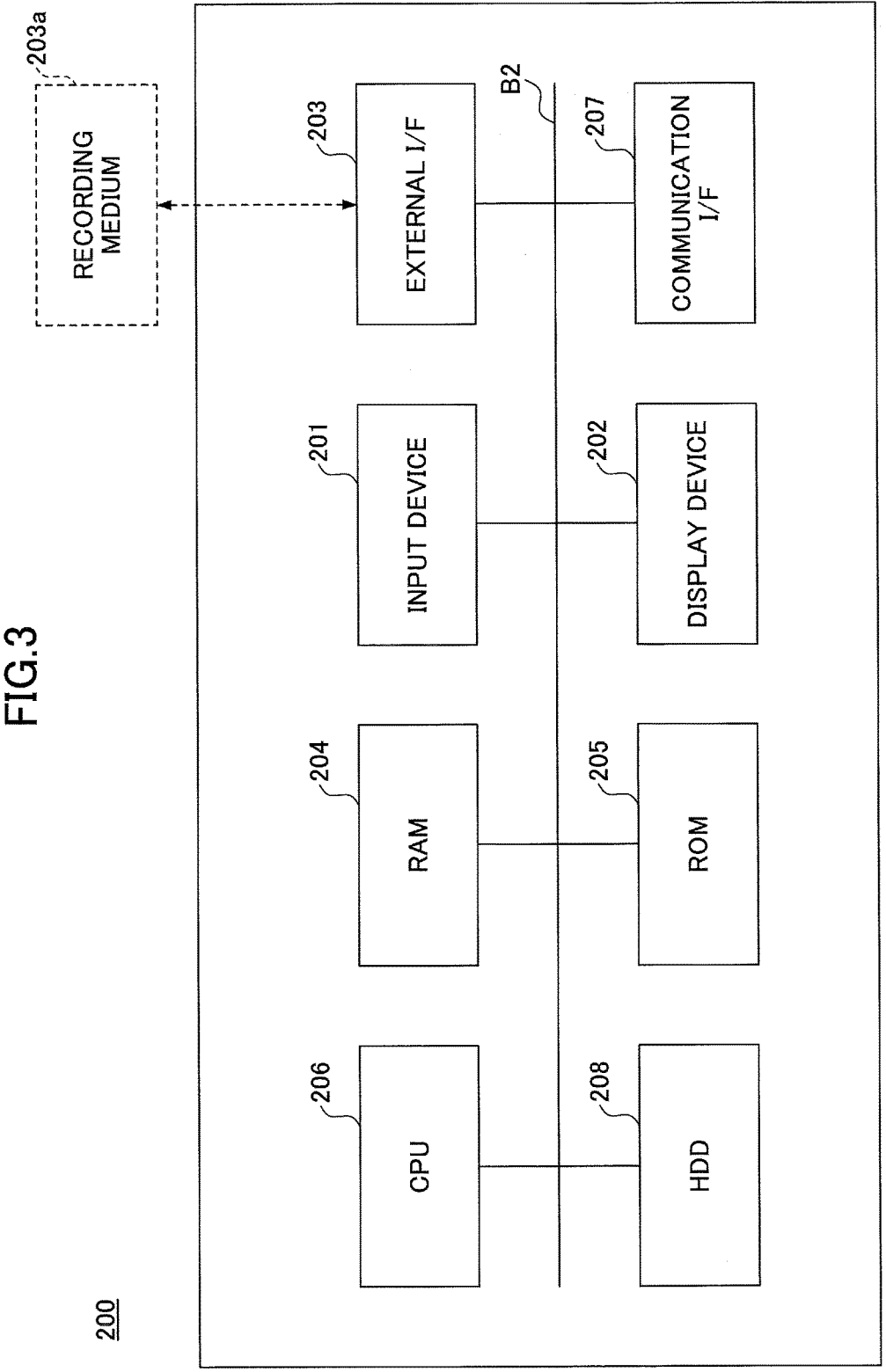
FIG. 3 illustrates an example of a hardware configuration of a computer according to the first embodiment.

Next, a hardware configuration of the conversion device 30, the management device 40, and the user terminal 50 is described with reference to FIG. 3. FIG. 3 illustrates an example of a hardware configuration of a computer according to the first embodiment. A computer 200 includes an input device 201, a display device 202, an external I/F 203, a RAM 204, a ROM 205, a CPU 206, a communication I/F 207, and a HDD (Hard Disk Drive) 208. Furthermore, these hardware elements are connected to each other by a bus B2.

The input device 201 includes a keyboard, a mouse, a touch panel, etc., and is used for inputting various signals in the computer 200. The display device 202 includes a display, etc., and displays various processing results. Note that the conversion device 30 and the management device 40 may have a mode in which the input device 201 and/or the display device 202 are connected and used according to need.

The external I/F 203 is an interface between the computer 200 and an external device. An example of an external device is a recording medium 203a, etc. Accordingly, the computer 200 is able to read and/or write information in the recording medium 203a via the external I/F 203. Examples of the recording medium 203a are a CD (Compact Disk), a DVD (Digital Versatile Disk), an SD memory card, a USB memory (Universal Serial Bus memory), etc.

The RAM 204 is a volatile semiconductor memory for temporarily storing programs and data. The ROM 205 is a non-volatile semiconductor memory that can store data even after the power is turned off. The CPU 206 is an arithmetic device that loads, for example, the programs and data of the HDD 208, the ROM 205, etc., into the RAM 204, and executes various processes.

The communication I/F 207 is an interface for connecting the computer 200 to the network N. Furthermore, the communication I/F 207 of the conversion device 30 includes a wireless module for performing wireless communication with the wireless tag 10 and/or the wireless communication device 20, according to a predetermined wireless communication standard. Furthermore, the communication I/F 207 of the conversion device 30 includes a communication module for performing communication by a 3G line with the wireless tag 10.

The HDD 208 is a non-volatile memory storing programs and data. The stored programs and data include the OS (Operating System) that is the basic software for controlling the entire computer 200, and various programs operating on the OS. Note that the computer 200 may include a non-volatile memory such as SSD (Solid State Drive), etc., instead of the HDD 208.

The conversion device 30, the management device 40, and the user terminal 50 according to the present embodiment implement various processes described below, by the computer 200 illustrated in FIG. 3.

<Usage Scene>

Figure 4:
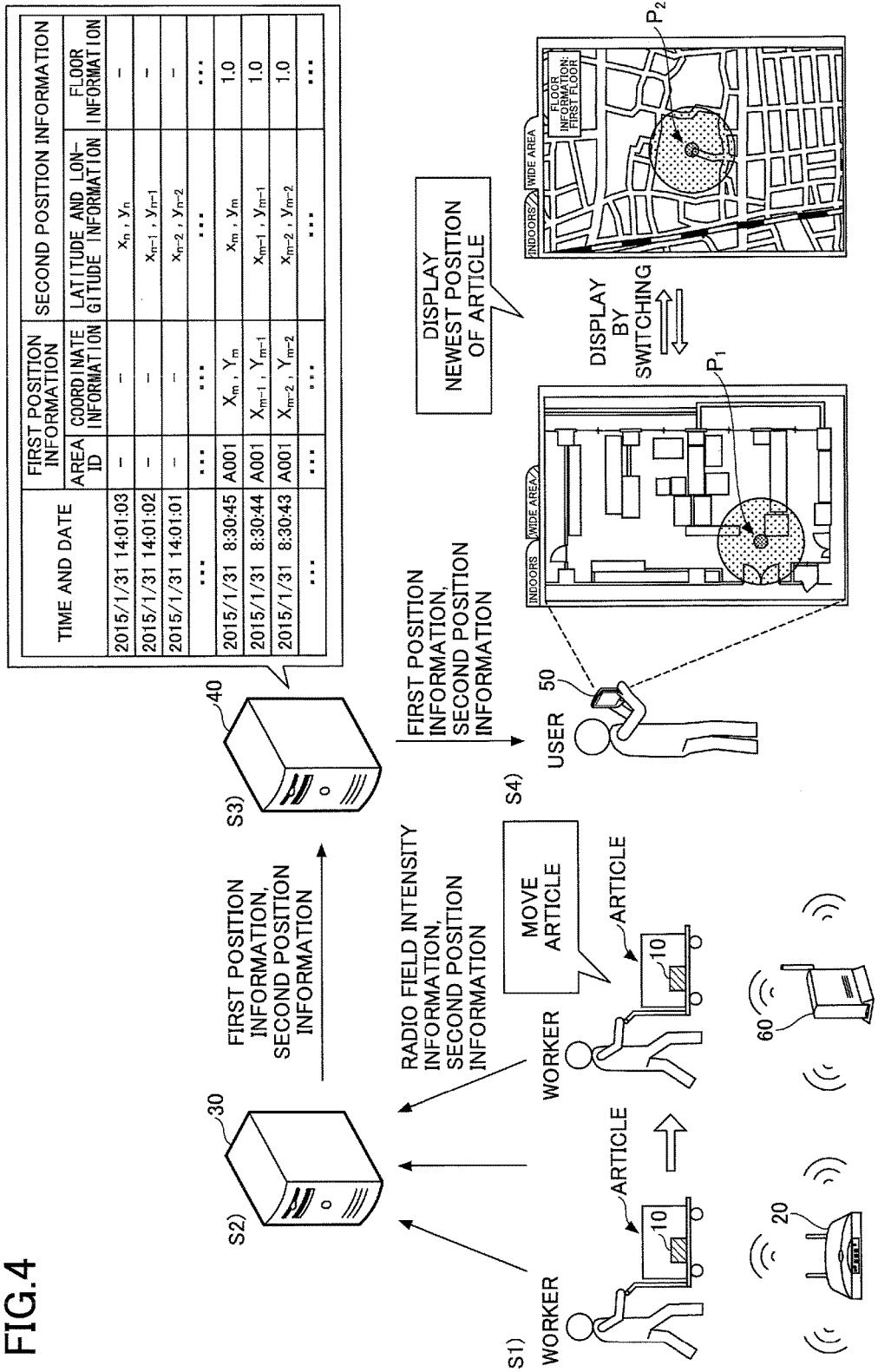
FIG. 4 is for describing a usage scene of the position management system according to the first embodiment.

Next, a description is given of a usage scene of the position management system 1 according to the first embodiment, with reference to FIG. 4. FIG. 4 is for describing a usage scene of the position management system 1 according to the first embodiment.

The position management system 1 according to the first embodiment is used, for example, for managing articles such as a mold, various components, equipment, etc., in a factory. The articles that are management targets have wireless tags 10 attached. Furthermore, in one area indicating one predetermined compartment (for example, one room, one floor, etc.) in the factory, a plurality of wireless communication devices 20 and at least one IMES transmitter 60 are installed. Furthermore, the wireless communication devices 20 and the IMES transmitter 60 send radio waves according to their respective communication standards to the surroundings, at predetermined time intervals.

A description is given of a case where a worker, etc., of the factory moves an article that is a management target, indoors of the building.

Step S1) First, when a worker moves an article indoors, the wireless tag 10 attached to the article detects the movement of the article. Then, the wireless tag 10 receives radio waves from the plurality of wireless communication devices 20, and measures the radio field intensity of the received radio waves. Furthermore, the wireless tag 10 receives radio waves transmitted from the IMES transmitter 60, and acquires second position information. Then, the wireless tag 10 sends the radio field intensity information indicating the measured radio field intensity and the second position information to the conversion device 30.

Note that while the article is moving, at every predetermined time interval (for example, a time interval of several milliseconds through several seconds), the wireless tag 10 receives radio waves from the plurality of wireless communication devices 20 and measures the radio field intensity, and acquires the second position information from the IMES transmitter 60.

Step S2) The conversion device 30 acquires first position information of the wireless tag 10, based on the radio field intensity information received from the wireless tag 10. That is, the conversion device 30 converts the radio field intensity information received from the wireless tag 10 into first position information. This conversion is performed every time the conversion device 30 receives the radio field intensity information and the second position information from the wireless tag 10.

Then, the conversion device 30 sends the first position information and the second position information to the management device 40. Note that the process of sending the first position information and the second position information to the management device 40 by the conversion device 30 may be performed in response to a query process from the management device 40 to the conversion device 30.

Step S3) The management device 40 stores the first position information and the second position information received from the conversion device 30, in association with a time and date, in a storage area. Accordingly, the position management system 1 according to the present embodiment manages history information (that is, movement history information) of the first position information and the second position information at every predetermined time interval, when an article to which the wireless tag 10 is attached is moved.

Step S4) A user who wants to know the position of the article operates the user terminal 50, and acquires the newest first position information and second position information of the wireless tag 10 that is attached to the corresponding article, from the movement history information of the wireless tag 10 managed by the management device 40.

Then, the user terminal 50 displays a position $P_1$ of an article based on the first position information on the map of indoors. Accordingly, the user is able to recognize the position of the corresponding article by the position $P_1$ displayed on the map of indoors.

Furthermore, the user terminal 50 displays a position $P_2$ of the article based on the second position information acquired from the IMES transmitter 60, on a wide area map including outdoors; the display can be switched between the wide area map and an indoor map. Accordingly, when the article is taken outdoors, by switching the display to the wide area map, it is possible to display the position of the article based on second position information acquired from GPS.

As described above, the position management system 1 according to the present embodiment displays the position of the article based on second position information acquired from the IMES transmitter 60, when the article is indoors. On the other hand, when the article is outdoors (outside the building, where radio waves transmitted from the IMES transmitter 60 cannot reach), a position based on second position information acquired from GPS is displayed. Therefore, the position management system 1 according to the present embodiment is able to manage positions of articles across indoors and outdoors in a seamless manner.

Note that outdoors means a range outside the building, where radio waves from the wireless communication device 20 and the IMES transmitter 60 cannot reach. Therefore, even when a position is outside a building, if radio waves from the wireless communication device 20 and the IMES transmitter 60 can be received by the wireless tag 10, the position is referred to as an indoor position.

<Functional Configuration>

Figure 5:
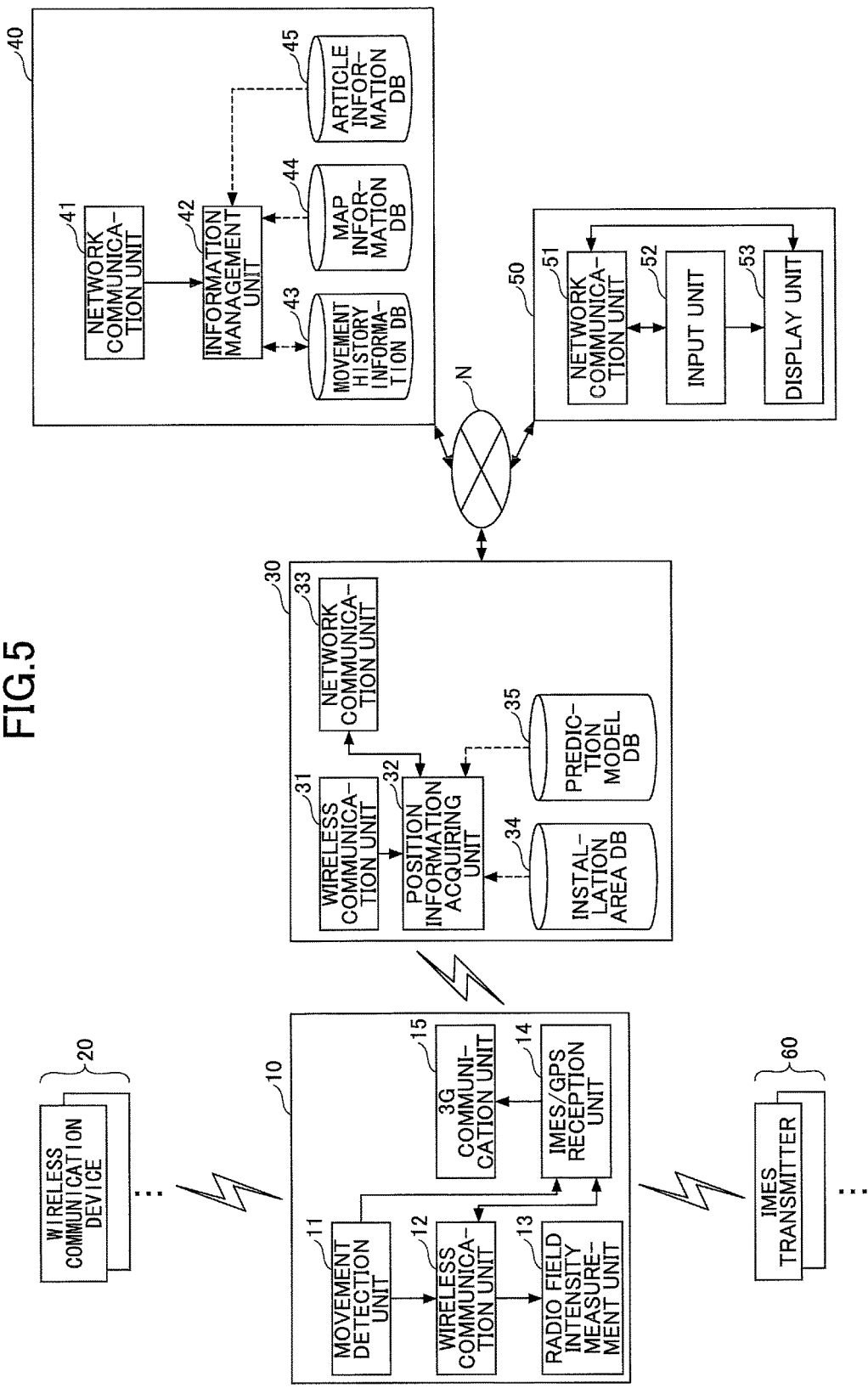
FIG. 5 illustrates an example of a functional configuration of the position management system according to the first embodiment.

Next, a description is given of a functional configuration of the position management system 1 according to the first embodiment, with reference to FIG. 5. FIG. 5 illustrates an example of a functional configuration of the position management system 1 according to the first embodiment. The wireless tag 10 includes a movement detection unit 11, a wireless communication unit 12, a radio field intensity measurement unit 13, an IMES/GPS reception unit 14, and a 3G communication unit 15.

The movement detection unit 11 is realized by, for example, the CPU 103, the sensor 104, etc., and detects that the article has started moving or that the article is moving, according to the oscillation of the article to which the wireless tag 10 is attached.

The wireless communication unit 12 is realized by the wireless module 105, etc., and performs wireless communication indoors with the wireless communication device 20, etc. For example, the wireless communication unit 12 sends the radio field intensity information generated by the radio field intensity measurement unit 13 and the second position information acquired by the IMES/GPS reception unit 14, to the conversion device 30.

The radio field intensity measurement unit 13 is realized by, for example, the CPU 103, etc., and measures the radio field intensity of the radio waves of wireless communication received by the wireless communication unit 12, and generates radio field intensity information.

The IMES/GPS reception unit 14 is realized by, for example, the CPU 103, the IMES/GPS reception module 106, etc., and receives radio waves according to the IMES standard from the IMES transmitter 60 indoors, and acquires the second position information. Furthermore, IMES/GPS reception unit 14 receives radio waves form GPS outdoors, and positions (measures) the latitude and longitude, to acquire the second position information.

Note that it is assumed that the second position information acquired from the IMES transmitter 60 includes the latitude and longitude information and the floor information, and the second position information acquired from GPS includes the latitude and longitude information.

The 3G communication unit 15 is realized by, for example, the CPU 103, the 3G communication module 107, etc., and sends the second position information acquired from GPS, to the conversion device 30, by using a 3G line outdoors.

Furthermore, the conversion device 30 includes a wireless communication unit 31, a position information acquiring unit 32, a network communication unit 33, an installation area database 34, and a prediction model database 35.

The wireless communication unit 31 is realized by, for example, the CPU 206, the communication I/F 207, etc., and performs wireless communication with the wireless tag 10 or the wireless communication device 20, and receives radio field intensity information and second position information.

The position information acquiring unit 32 is realized by, for example, the CPU 206, etc., and acquires first position information based on radio field intensity information received from the wireless communication unit 31, installation area information stored in the installation area database 34, and a prediction model stored in the prediction model database 35.

The network communication unit 33 is realized by, for example, the CPU 206, the communication I/F 207, etc., and sends the first position information acquired by the position information acquiring unit 32 and the second position information received from the wireless tag 10, to the management device 40 via the network N.

Furthermore, when the wireless tag 10 is outdoors, the network communication unit 33 receives second position information sent from the wireless tag 10 using the 3G line, and sends the received second position information to the management device 40.

The installation area database 34 is realized by, for example, the HDD 208 or a storage device connected to the conversion device 30 via a network, and stores installation area information. Details of the installation area information are described below.

The prediction model database 35 is realized by, for example, the HDD 208 or a storage device connected to the conversion device 30 via a network, and stores a prediction model for estimating the first position information based on the radio field intensity information. This kind of prediction model is a distance attenuation model of the radio field intensity, for estimating the position information of a position for which the radio field intensity is measured. The distance attenuation model is generated by learning, in advance, information of radio field intensities of a plurality of positions, by a learning apparatus using, for example, a machine learning algorithm such as Random Forest, Support Vector Machine, etc.

Furthermore, the management device 40 includes a network communication unit 41, an information management unit 42, a movement history information database 43, a map information database 44, and an article information database 45.

The network communication unit 41 is realized by, for example, the CPU 206, the communication I/F 207, etc., and receives first position information and second position information from the conversion device 30 via the network N. Furthermore, the network communication unit 41 receives a request to acquire the position information of an article, etc., from the user terminal 50 via the network N.

The information management unit 42 is realized by, for example, the CPU 206, etc., and reads information from various databases and writes (stores) information in various databases. For example, when the network communication unit 41 receives a request to acquire position information of an article from the user terminal 50, the information management unit 42 acquires the newest first position information and second position information of the article from the movement history information database 43, in response to the acquisition request.

The movement history information database 43, the map information database 44, and the article information database 45 are realized by, for example, the HDD 208 or a storage device connected to the management device 40 via a network, and store movement history information, map information, and article information, respectively. Details of movement history information, map information, and article information are described below.

Furthermore, the user terminal 50 includes a network communication unit 51, an input unit 52, and a display unit 53.

The network communication unit 51 is realized by, for example, the CPU 206, the communication I/F 207, etc., and sends a request to acquire position information of an article to the management device 40 via the network N. Furthermore, the network communication unit 51 receives first position information, second position information, etc., of an article sent from the management device 40 in response to the acquisition request.

The input unit 52 is realized by, for example, the CPU 206, the input device 201, etc., and accepts input by a user. For example, the input unit 52 accepts a specification of an article (an article for which the position is to be displayed) input from the input device 201.

The display unit 53 is realized by, for example, the CPU 206, the display device 202, etc., and displays a position of an article on a map, when the network communication unit 51 receives first position information and second position information of the article, information relevant to a map, etc.

Here, a description is given of the installation area information stored in the installation area database 34, with reference to FIG. 6. FIG. 6 illustrates an example of the installation area database 34. The installation area information is information for managing the area in which the wireless communication device 20 is installed, and includes data items of a device ID and an installation area ID. The device ID is identification information for uniquely identifying the wireless communication device 20. The installation area ID is identification information for identifying, for example, one area indicating one predetermined compartment in a building of a factory, etc.

For example, in FIG. 6, device IDs "AP1" and "AP2" are associated with the installation area ID "A001". This means that in the area having the installation area ID "A001", two wireless communication devices 20 of device IDs "AP1" and "AP2" are installed. As described above, in the installation area information stored in the installation area database 34, the area where the wireless communication device 20 is installed is managed.

Next, a description is given of the movement history information stored in the movement history information database 43, with reference to FIG. 7. FIG. 7 illustrates an example of the movement history information database 43. The movement history information is information for managing the history of the first position information and the second position information of the wireless tag 10 at every hour, and includes data items of a time and date, first position information, and second position information, for each tag ID.

The tag ID is identification information for uniquely identifying the wireless tag 10. The time and date is information relevant to the date and the time when, for example, the wireless tag 10 sends the radio field intensity information and the second position information to the conversion device 30.

The first position information includes an area ID and coordinate information. The area ID is identification information for identifying, for example, one area indicating one predetermined compartment in a building of a factory, etc., similar to the installation area ID described with reference to FIG. 6. The information of the compartment area managed by the area ID and the installation area ID may be the same compartment area information according to the same compartment divisions, or may be compartment area information according to different compartment divisions between the area ID and the installation area ID. The coordinate information is information of coordinates indicating a position in an area indicated by the associated area ID. Here, these coordinates are relative coordinates from a reference point set in advance in an area indicated by the area ID.

The second position information includes latitude and longitude information and floor information. The latitude and longitude information is information indicating the latitude and longitude received by the wireless tag 10 from the IMES transmitter 60, or information indicating the latitude and longitude measured based on radio waves received by the wireless tag 10 form GPS. The floor information is information relevant to the floor in a building, etc., defined according to the IMES standard. Accordingly, when the wireless tag 10 acquires second position information from GPS, the floor information is not set (in FIG. 7, "-" indicates that the floor information is not set). Similarly, when an article to which the wireless tag 10 is attached is outdoors, the wireless tag 10 cannot communicate with the wireless communication device 20, and therefore the first position information is not set.

For example, in FIG. 7, the movement history information from the time and date "2015/1/31 14:01:01" to "2015/1/31 14:01:03" of the wireless tag 10 having the tag ID "T001", is the movement history of outdoors. At this time, the first position information is not set, and the latitude and longitude information acquired from GPS is set as the second position information.

On the other hand, the movement history information from the time and date "2015/1/31 8:30:43" to "2015/1/31 8:30:45" of the wireless tag 10 having the tag ID "T001", is the movement history of indoors. At this time, as the first position information, the area ID and the coordinate information acquired by the position information acquiring unit 32 are set. Furthermore, as the second position information, the latitude and longitude information and the floor information acquired by the wireless tag 10 from the IMES transmitter 60, are set.

As described above, in the movement history information stored in the movement history information database 43, the movement history information of the wireless tag 10 of indoors and outdoors (that is, the movement history information of the article to which the wireless tag 10 is attached) is managed. Note that in FIG. 7, the time and date is expressed by year/month/date and hour/minutes/seconds; however, in addition, for example, the time and date may be further managed in units of one one-thousandth of a second (milliseconds). Note that in the following, the first position information and the second position information included in the movement history information of indoors is also referred to as "indoor position information", and the first position information and the second position information included in the movement history information of outdoors is also referred to as "outdoor position information".

Next, a description is given of the map information stored in the map information database 44, with reference to FIG. 8. FIG. 8 illustrates an example of the map information database 44. The map information is information for managing the map display data of an area indicated by an area ID, and includes data items of an area ID and map display data. The area ID is the same as the area ID described with reference to FIG. 7. The map display data is information relevant to the map described above, and is data for displaying the map of the area indicated by the associated area ID. The map display data is not limited to data in a raster format such as JPEG (Joint Photographic Experts Group), BMP (Bit Map), PNG (Portable Network Graphics), etc.; the map display data may be data in a vector format.

For example, in FIG. 8, an area ID "A001" is associated with map display data "X wing first floor". This means that the map of the area having the area ID "A001" is the map display data "X wing first floor". Note that in the map information database 44 illustrated in FIG. 8, the map display data of indoors of a building is managed; however, in addition, 8, the wide area map display data including the outdoors of a building may be managed.

Next, a description is given of the article information stored in the article information database 45, with reference to FIG. 9. FIG. 9 illustrates an example of the article information database 45. The article information is information for managing the wireless tags 10 and articles in association with each other, and includes data items of a tag ID and an article name. The tag ID is identification information for uniquely identifying the wireless tag 10. The article name is the name of the article, to which the wireless tag 10 having the associated tag ID, is attached.

For example, in FIG. 9, the wireless tag 10 having the tag ID "T001" is associated with the article name "mold of ◯◯". This means that the wireless tag 10 having the tag ID "T001" is attached to the article having the article name "mold of ◯◯". Note that in FIG. 9, the article information may include a data item of "article ID", etc., that is identification information for uniquely identifying the article, instead of or in addition to the data item "article name".

<Details of Process>

Next, a description is given of details of processes of the position management system 1 according to the first embodiment.

Figure 10:
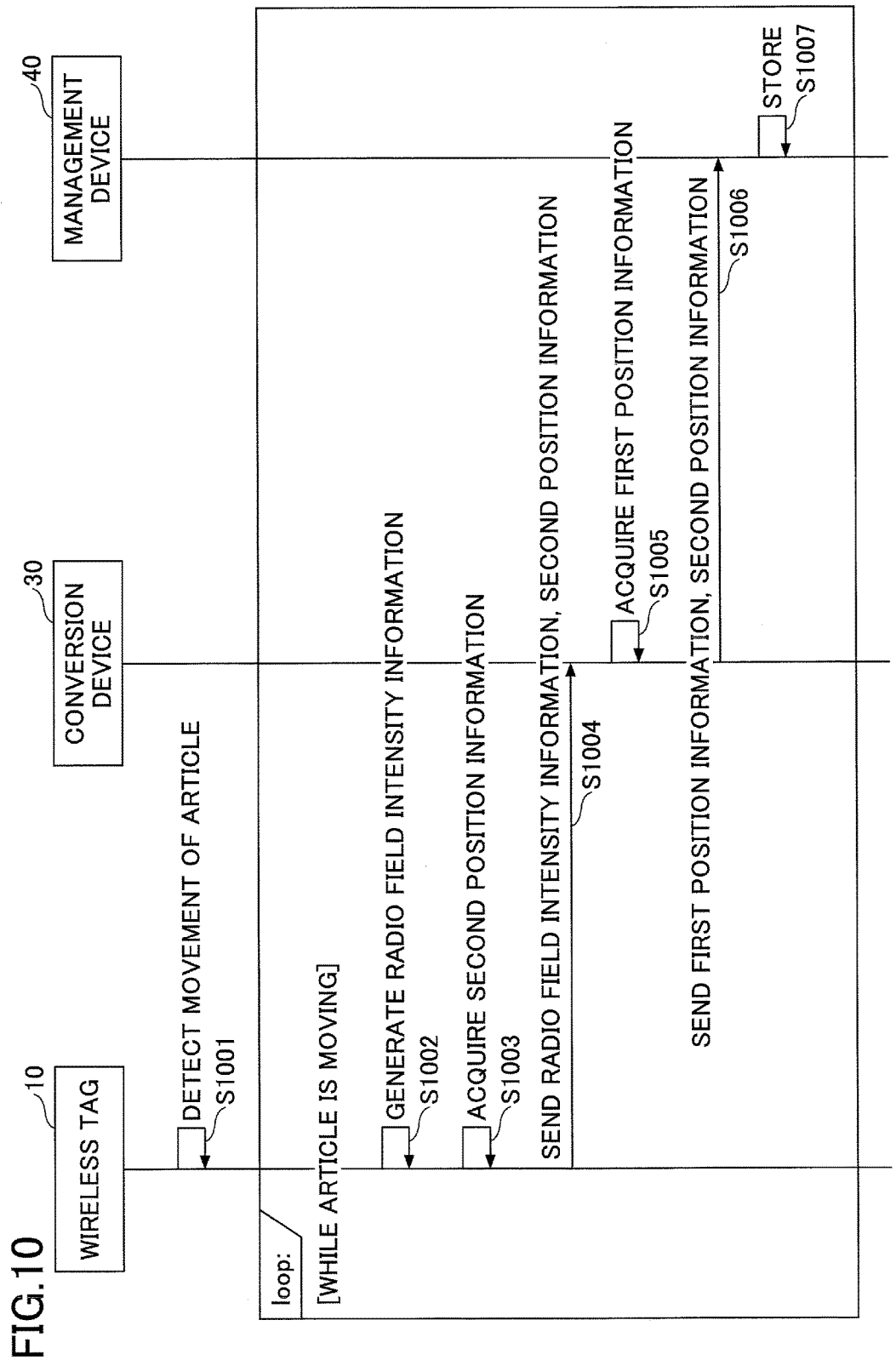
FIG. 10 is a sequence diagram of an example of a process of storing the movement history information of indoors according to the first embodiment.

First, a description is given of a process of storing the movement history information of the wireless tag 10 in the management device 40 in a case where, for example, a worker of a factory, etc., moves an article to which the wireless tag 10 is attached indoors, with reference to FIG. 10. FIG. 10 is a sequence diagram of an example of a process of storing the movement history information of indoors according to the first embodiment.

The worker, etc., starts to move an article, to which the wireless tag 10 is attached. Then, the movement detection unit 11 of the wireless tag 10 detects that the movement of the article has started (step S1001). At this time, the wireless tag 10 supplies power to the wireless module 105 and the IMES/GPS reception module 106 from a power source, upon being triggered by the detection of the start of movement by the movement detection unit 11. Then, the wireless communication unit 12 receives radio waves of wireless communication sent from the wireless communication device 20. Furthermore, the IMES/GPS reception unit 14 receives radio waves according to the IMES standard sent from the IMES transmitter 60.

As described above, power is supplied to the wireless module 105 and the IMES/GPS reception module 106 upon being triggered by the detection of the start of movement by the movement detection unit 11. Therefore, it is possible to suppress the power consumption of the wireless module 105 and the IMES/GPS reception module 106 while the article is not moving.

Next, the radio field intensity measurement unit 13 of the wireless tag 10 measures the radio field intensity of the radio waves received from the wireless communication device 20 by the wireless communication unit 12, and generates radio field intensity information (step S1002). At this time, the wireless communication unit 12 receives a plurality of radio waves sent from a plurality of wireless communication device 20, and the radio field intensity measurement unit 13 measures the radio field intensity of the respective radio waves, and generates the radio field intensity information.

That is, the radio field intensity information generated by the radio field intensity measurement unit 13 includes a plurality of pairs of device IDs and radio field intensity values. For example, the radio field intensity information includes a plurality of pairs of device IDs and radio field intensity values, such as (device ID, radio field intensity value)=(AP1, 50), (AP2, 60), etc. Furthermore, the radio field intensity information may include the time and date (information relevant to date and time) when the radio field intensity measurement unit 13 has generated the radio field intensity information.

Next, the IMES/GPS reception unit 14 of the wireless tag 10 acquires second position information included in the radio wave received from the IMES transmitter 60 (step S1003). Note that when the IMES/GPS reception unit 14 receives radio waves according to the IMES standard from a plurality of IMES transmitters 60, the IMES/GPS reception unit 14 acquires the second position information included in the radio wave having strong radio field intensity (reception intensity).

The wireless communication unit 12 of the wireless tag 10 sends, to the conversion device 30, the radio field intensity information generated by the radio field intensity measurement unit 13 and the second position information acquired by the IMES/GPS reception unit 14 (step S1004). Note that the wireless communication unit 12 may directly send the radio field intensity information and the second position information to the conversion device 30, or may send this information to the conversion device 30 via one or more wireless communication devices 20.

For example, when the wireless tag 10 and the conversion device 30 are located at a distance in which wireless communication cannot be directly performed with each other, the wireless communication unit 12 of the wireless tag 10 sends the radio field intensity information and the second position information to a nearby wireless communication device 20. Then, when the wireless communication device 20 is able to directly send information to the conversion device 30, the wireless communication device 20 sends the radio field intensity information and the second position information to the conversion device 30. On the other hand, when the wireless communication device 20 is unable to directly send information to the conversion device 30, the wireless communication device 20 sends the radio field intensity information and the second position information to another wireless communication device 20. As described above, the wireless communication unit 12 of the wireless tag 10 may send the radio field intensity information and the second position information to the conversion device 30, by relaying the information to one or more wireless communication devices 20.

Next, when the wireless communication unit 31 receives the radio field intensity information and the second position information, the position information acquiring unit 32 of the conversion device 30 acquires the first position information based on the radio field intensity information, the installation area information, and the prediction model (step S1005).

More specifically, the position information acquiring unit 32 refers to the installation area information, and converts the device ID of the wireless communication device 20 included in the radio field intensity information into an installation area ID. That is, the position information acquiring unit 32 converts (device ID, radio field intensity value) included in the radio field intensity information, into (installation area ID, radio field intensity value). Then, the position information acquiring unit 32 estimates the first position information of the wireless tag 10 based on (installation area ID, radio field intensity value) and the prediction model, and acquires the estimated first position information. The estimated first position information acquired at this time includes an area ID and the coordinate information (relative coordinates) from a reference point in the area indicated by the area ID. Accordingly, in the conversion device 30, the radio field intensity information is converted into first position information at the conversion device 30.

Note that in the present embodiment, in step S1005, the device ID of the wireless communication device 20 is converted into an installation area ID; however, this conversion may be performed in step S1007 described below. That is, in step S1005, the position information acquiring unit 32 may estimate the first position information of the wireless tag 10 based on the respective items of (device ID, radio field intensity value) and the prediction model, and acquire this estimated first position information.

Then, the network communication unit 33 of the conversion device 30 sends the first position information and the second position information to the management device 40, via a network N (step S1006).

When the network communication unit 41 receives the first position information and the second position information, the information management unit 42 of the management device 40 stores this information in association with the time and date (information relevant to date and time) in the movement history information stored in the movement history information database 43 (step S1007). At this time, the time and date associated with the first position information and the second position information is to be the time and date when the wireless tag 10 has sent the radio field intensity information and the second position information. However, the time and date are not so limited; the time and date may be the time and date when the management device 40 has received the first position information and the second position information from the conversion device 30.

The processes of steps S1002 through S1007 described above are performed at every predetermined interval (for example, a time interval such as several milliseconds through several seconds), while the worker, etc., is moving the article to which the wireless tag 10 is attached. That is, the processes are performed at every predetermined time interval while the movement detection unit 11 of the wireless tag 10 attached to the article, is detecting that the article is being moved.

Accordingly, the movement history information (that is, the movement history information of indoors) when a worker, etc., moves an article indoors, is managed in the management device 40.

Note that when a predetermined time (for example, 60 seconds) passes without the movement detection unit 11 detecting that the article has started moving or that the article is moving, the wireless tag 10 stops supplying power to the wireless module 105 and the IMES/GPS reception module 106 from the power source. Therefore, for example, when a predetermined time passes after the article stops moving, the wireless communication unit 12 and the IMES/GPS reception unit 14 stop receiving radio waves sent from the wireless communication device 20 and the IMES transmitter 60, respectively.

Figure 11:
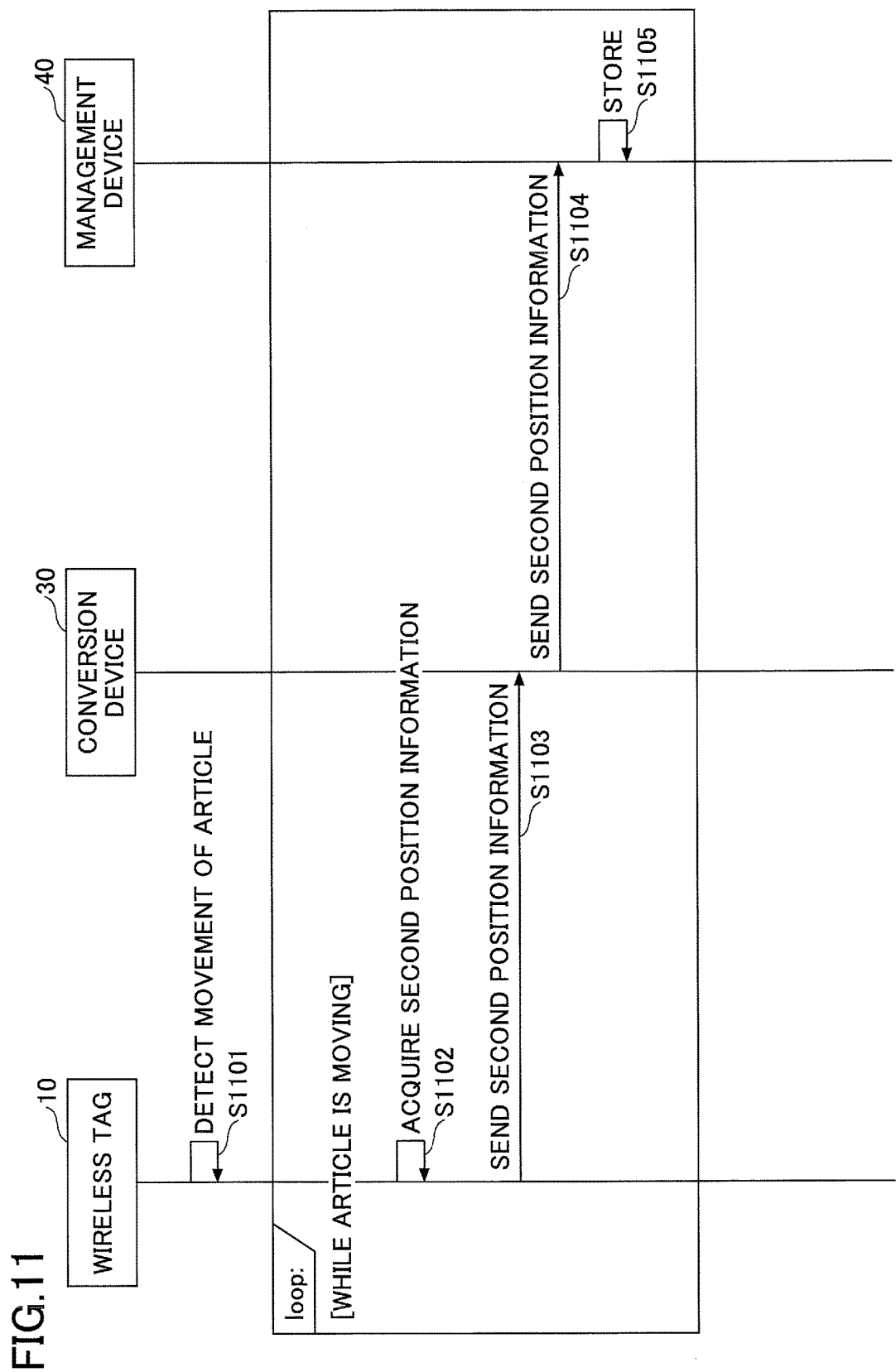
FIG. 11 is a sequence diagram of an example of a process of storing the movement history information of outdoors according to the first embodiment.

Next, a description is given of a process of storing the movement history information of the wireless tag 10 in the management device 40 in a case where, for example, a worker of a factory, etc., moves an article to which the wireless tag 10 is attached outdoors, with reference to FIG. 11. FIG. 11 is a sequence diagram of an example of a process of storing the movement history information of outdoors according to the first embodiment.

The worker, etc., starts to move an article, to which the wireless tag 10 is attached. Then, the movement detection unit 11 of the wireless tag 10 detects that the movement of the article has started (step S1101). At this time, the wireless tag 10 supplies power to the wireless module 105 and the IMES/GPS reception module 106 from a power source, upon being triggered by the detection of the start of movement by the movement detection unit 11.

Here, the article to which the wireless tag 10 is attached is outdoors, and therefore the wireless communication unit 12 cannot receive radio waves sent from the wireless communication device 20. Furthermore, similarly, the IMES/GPS reception unit 14 cannot receive radio waves sent from the IMES transmitter 60. In this case, the IMES/GPS reception unit 14 receives radio waves sent from GPS.

The IMES/GPS reception unit 14 of the wireless tag 10 measures the latitude and longitude based on radio waves received from GPS, and acquires second position information (step S1102).

The 3G communication unit 15 of the wireless tag 10 sends the second position information to the conversion device 30 (step S1103). Note that the 3G communication unit 15 according to the present embodiment sends the second position information to the conversion device 30 by using a 3G line; however, the present embodiment is not so limited. That is, the wireless tag 10 may send the second position information to the conversion device 30 by using, for example, LTE (Long Term Evolution).

The network communication unit 33 of the conversion device 30 sends the second position information received from the wireless tag 10, to the management device 40 (step S1104). As described above, the conversion device 30 transfers the second position information received from the wireless tag 10, to the management device 40.

When the network communication unit 41 receives the second position information, the information management unit 42 of the management device 40 stores the second position information in association with the time and date in the movement history information stored in the movement history information database 43 (step S1105). At this time, the time and date associated with the second position information may be the time and date when the wireless tag 10 has sent the second position information. However, the time and date are not so limited; for example, the time and date when the management device 40 has received the second position information from the conversion device 30 may be used.

The processes of steps S1102 through S1205 described above are performed at every predetermined interval (for example, a time interval such as several milliseconds through several seconds), while the worker, etc., is moving the article to which the wireless tag 10 is attached. That is, the processes are performed at every predetermined time interval while the movement detection unit 11 of the wireless tag 10 attached to the article, is detecting that the article is being moved.

Accordingly, the movement history information (that is, the movement history information of outdoors) when a worker, etc., moves an article outdoors, is managed in the management device 40.

Note that when a predetermined time (for example, 60 seconds) passes without the movement detection unit 11 detecting that the article has started moving or that the article is moving, the wireless tag 10 stops supplying power to the wireless module 105 and the IMES/GPS reception module 106 from the power source. Therefore, for example when a predetermined time passes after the article stops moving, the IMES/GPS reception unit 14 stops receiving radio waves sent from GPS.

Furthermore, in the position management system 1 according to the present embodiment, when an article is moved from indoors to outdoors, while the wireless tag 10 is able to receive radio waves from the wireless communication device 20 and the IMES transmitter 60, the process of FIG. 10 is to be executed. When the wireless tag 10 can no longer receive radio waves from the wireless communication device 20 and the IMES transmitter 60, the process of FIG. 11 is to be executed.

On the other hand, when the article is moved from outdoors to indoors, while the wireless tag 10 is unable to receive radio waves from the wireless communication device 20 and the IMES transmitter 60, the process of FIG. 11 is to be executed. When the wireless tag 10 becomes capable of receiving radio waves from the wireless communication device 20 and the IMES transmitter 60, the process of FIG. 10 is to be executed.

Figure 12:
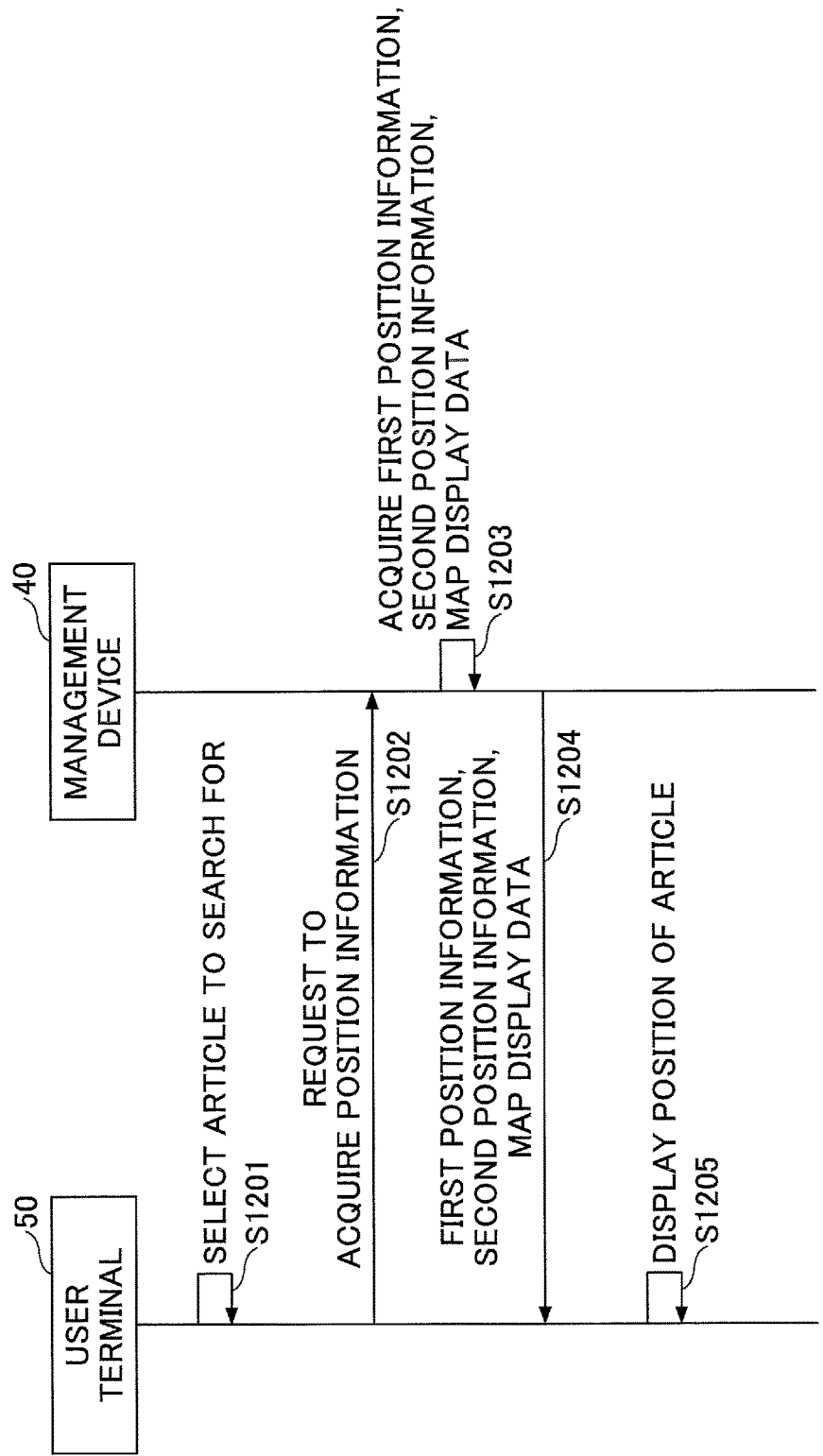
FIG. 12 is a sequence diagram of an example of a process of displaying position information according to the first embodiment.

Next, a description is given of a process of displaying the position of an article on the user terminal 50 by the user, with reference to FIG. 12. FIG. 12 is a sequence diagram of an example of a process of displaying position information according to the first embodiment.

Figure 13:
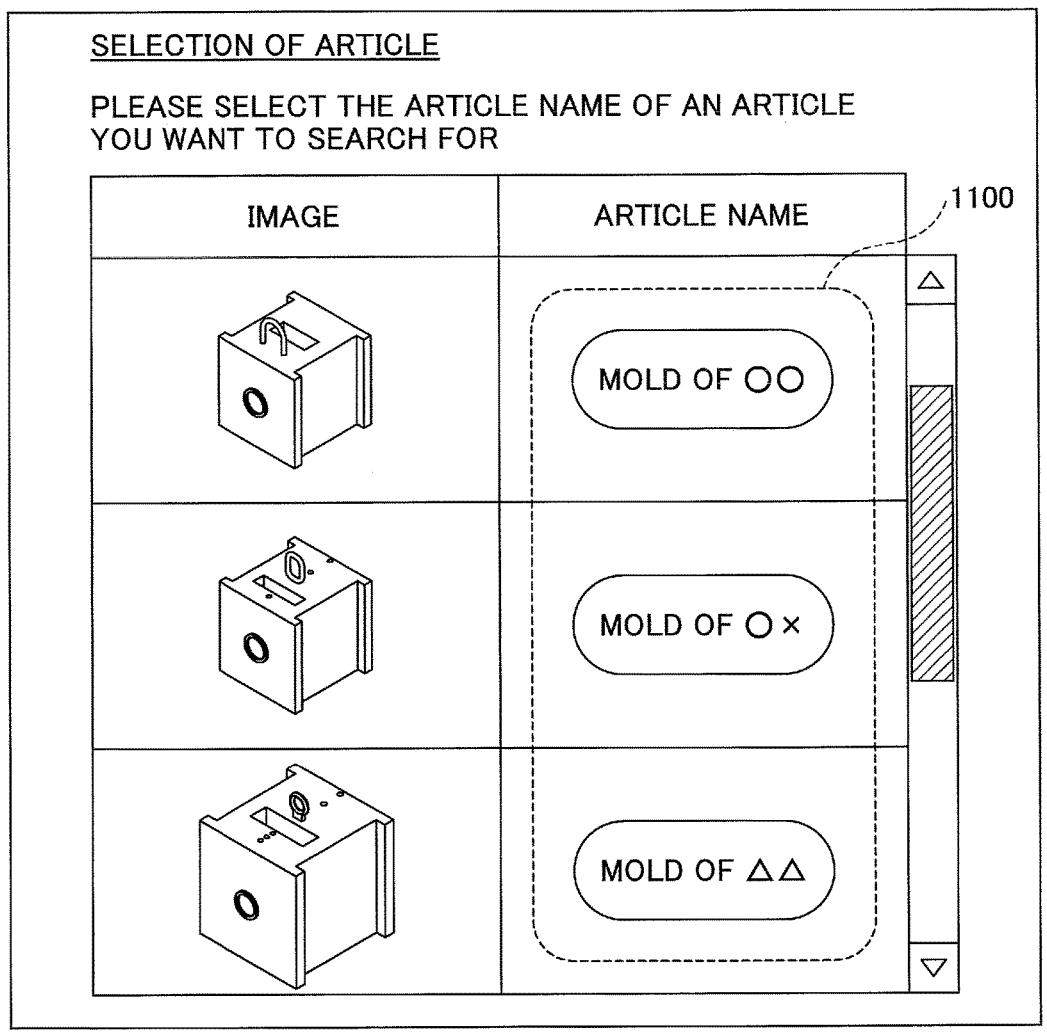
FIG. 13 illustrates an example of an article selection screen.

First, the user operates the user terminal 50, and displays, for example, an article selection screen 1000 illustrated in FIG. 13, on the display device 202. Then, the user selects the article to be searched for (that is, the article for which the user wants to display the present position) in the article selection screen 1000 (step S1201). This can be performed, for example, as the user selects the desired article name from a list of article names 1100 displayed on the article selection screen 1000.

Next, when the input unit 52 accepts a selection of an article name, the network communication unit 51 of the user terminal 50 sends a request to acquire position information of the article having the selected article name, to the management device 40 (step S1202). Here, the acquisition request includes the selected article name. Note that the acquisition request may include an article ID for uniquely identifying the article having the selected article name, instead of the article name.

When the network communication unit 41 receives the request to acquire the position information, the information management unit 42 of the management device 40 acquires the corresponding first position information, second position information, and map display data (step S1203).

That is, first, the information management unit 42 acquires a tag ID associated with an article name from the article information stored in the article information database 45. Next, the information management unit 42 acquires the newest first position information and second position information associated with the acquired tag ID (that is, the first position information and second position information having the newest time and date) from the movement history information stored in the movement history information database 43. Lastly, the information management unit 42 acquires the map display data associated with the area ID included in the acquired first position information, from the map information stored in the map information database 44. As described above, the information management unit 42 acquires the newest first position information and second position information, and map display data for displaying a map of the area, of the article having the article name selected by the user.

Note that when an area ID included in the newest first position information is not set (that is, when the newest first position information and second position information are position information of outdoors), the information management unit 42 does not acquire the map display data.

Then, the network communication unit 41 of the management device 40 sends the first position information, the second position information, and the map display data acquired by the information management unit 42, to the user terminal 50 (step S1204). Furthermore, at this time, the network communication unit 41 of the management device 40 sends, to the user terminal 50, first error information indicating the error of the first position information and second error information indicating the error of the second position information.

Note that the first error information may be a value set in advance by the administrator, etc., of the position management system 1, based on, for example, the prediction precision of the prediction model stored in the prediction model database 35, a standard of wireless communication used by the wireless communication device 20, etc. Furthermore, the second error information may be the positioning error according to the IMES standard.

Figure 14:
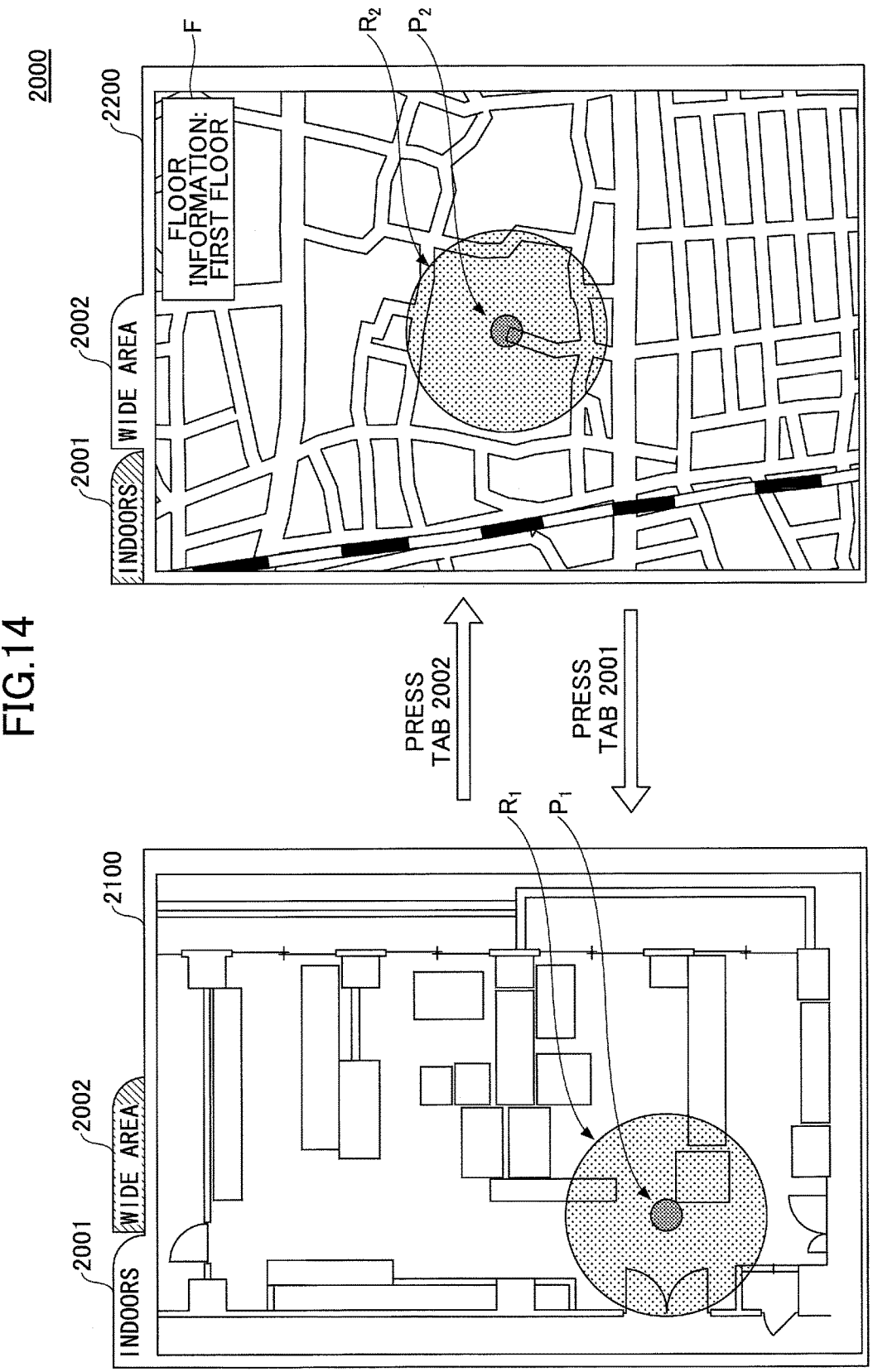
FIG. 14 illustrates an example of an article position display screen when the article is indoors.

Lastly, when the network communication unit 51 receives the first position information, the second position information, the map display data, etc., the display unit 53 of the user terminal 50 displays, for example, an article position display screen 2000 illustrated in FIG. 14, on the display device 202 (step S1205). The article position display screen 2000 illustrated in FIG. 14 is a position display screen in a case where the article is indoors (that is, when position information of indoors is received from the management device 40). In the article position display screen 2000 illustrated in FIG. 14, the display of an indoors position display screen 2100 and a wide area position display screen including outdoors 2200 can be switched by selecting a tab 2001 or a tab 2002.

In the indoors position display screen 2100, the newest position of the article based on the first position information is displayed at a position $P_1$ on the map displayed based on map display data. Furthermore, in the indoors position display screen 2100, an error range $R_1$ indicating the error of the position of an article is displayed based on the first error information. Accordingly, the user is able to recognize the position of the article displayed on the map of indoors of the building. Here, in the indoors position display screen 2100, by selecting the tab 2002, it is possible to switch the display to the wide area position display screen including outdoors 2200.

In the wide area position display screen including outdoors 2200, the newest position of the article based on the second position information is displayed at a position $P_2$ on the map indicating a wider range including outdoors. Furthermore, in the wide area position display screen including outdoors 2200, an error range $R_2$ indicating the error of the position of an article is displayed based on the second error information. Furthermore, in the floor information F, the floor of building on which the article is located is displayed, based on the floor information included in the second position information. Accordingly, the user is able to recognize the position of the article displayed on the map including outdoors outside the factory.

Figure 15:
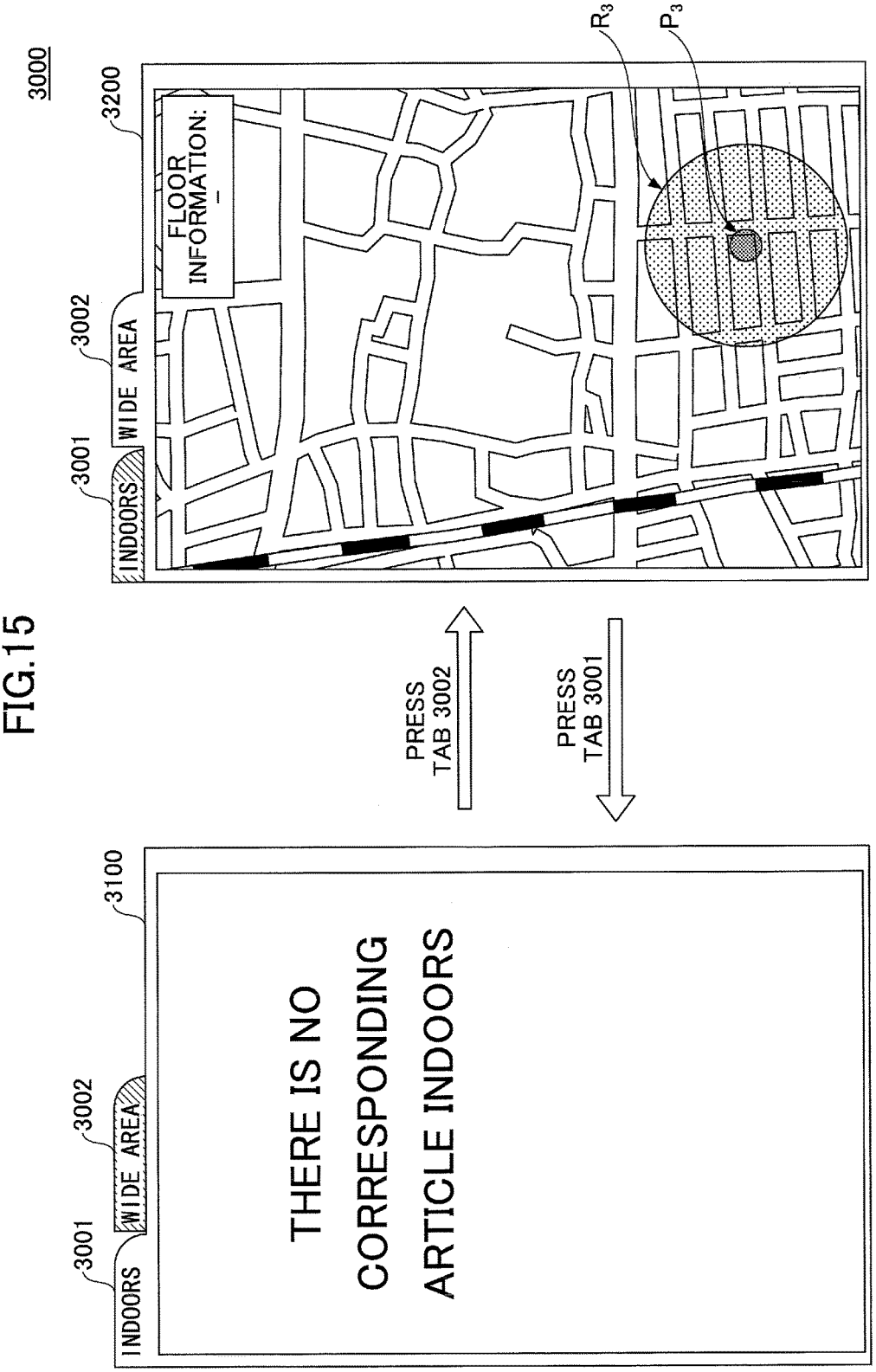
FIG. 15 illustrates an example of an article position display screen when the article is outdoors.

Here, when the user terminal 50 receives position information of outdoors from the management device 40 in step S1205, for example, the user terminal 50 displays an article position display screen 3000 as illustrated in FIG. 15, on the display device 202. The article position display screen 3000 illustrated in FIG. 15 is a position display screen in the case where the article is outdoors. In the article position display screen 3000 illustrated in FIG. 15, the display of an indoors position display screen 3100 and a wide area position display screen including outdoors 3200 can be switched by selecting a tab 3001 or a tab 3002.

The indoors position display screen 3100 is displaying a screen indicating that there is no corresponding article indoors. As described above, when the user terminal 50 receives position information of outdoors, a screen indicating that there is no corresponding article indoors is displayed on the indoors position display screen 3100. Here, in the indoors position display screen 3100, by selecting the tab 3002, it is possible to switch the display to the wide area position display screen including outdoors 3200.

In the wide area position display screen including outdoors 3200, the newest position of the article based on the second position information is displayed at a position $P_3$ on the map indicating a wider range including outdoors. Furthermore, in the wide area position display screen including outdoors 3200, an error range $R_3$ indicating the error of the position of an article is displayed based on the second error information. Note that the second position information is latitude and longitude information acquired from radio waves received by the wireless tag 10 from GPS. Accordingly, even when the article is taken outdoors, the user is able to recognize the position of the article displayed on the map including outdoors outside the factory.

As described above, the position management system 1 according to the first embodiment manages the movement history information of indoors and the movement history information of outdoors of the wireless tag 10 attached to an article. Furthermore, in the position management system 1 according to the first embodiment, position information according to the IMES standard is used as the movement history information of indoors, while position information positioned (measured) based on radio waves received from GPS is used as the movement history information of outdoors. Therefore, the position management system 1 according to the first embodiment is able to manage positions of articles across indoors and outdoors in a seamless manner.

Furthermore, in the position management system 1 according to the first embodiment, position information based on radio field intensity information of radio waves received by the wireless tag 10 is used in addition to position information according to the IMES standard, and therefore it is possible to manage positions of articles indoors with high precision.

Second Embodiment

Next, a description is given of the position management system 1 according to a second embodiment. In the position management system 1 according to the second embodiment, when an article that is a management target is taken outdoors, a report indicating that the article has been taken outdoors is sent to the user terminal 50 used by, for example, the administrator, etc. Accordingly, the user such as the administrator, etc., is able to recognize that the article has been taken outdoors, for example, due to theft, etc., counter to the user's intention. Note that in the second embodiment, the differences between the second embodiment and the first embodiment are described, and the parts having substantially the same functional configuration as those of the first embodiment are denoted by the same reference numerals, and overlapping descriptions are omitted.

<Functional Configuration>

Figure 16:
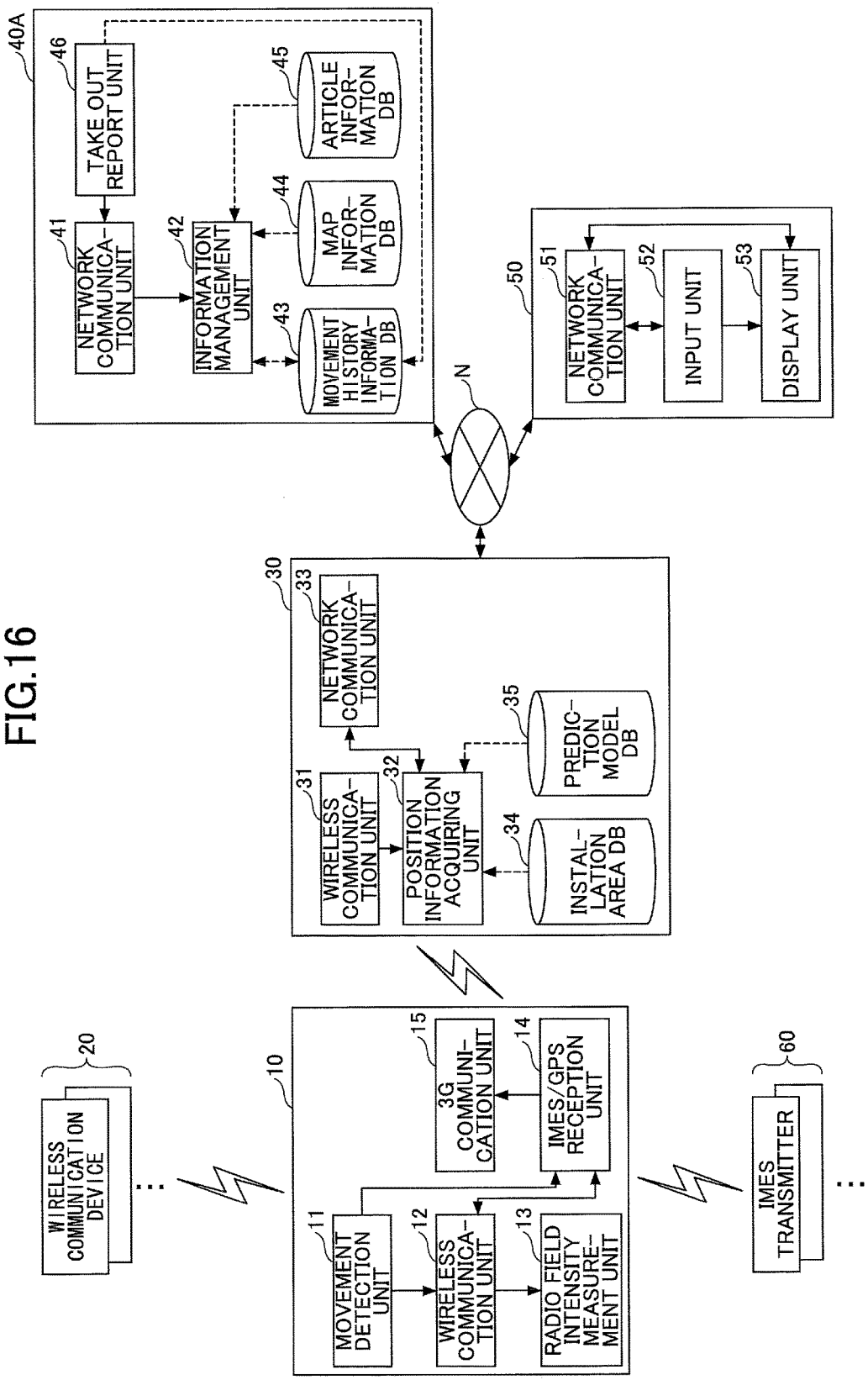
FIG. 16 illustrates an example of a functional configuration of the position management system according to a second embodiment.

First, a description is given of a functional configuration of the position management system 1 according to the second embodiment, with reference to FIG. 16. FIG. 16 illustrates an example of a functional configuration of the position management system 1 according to the second embodiment. A management device 40A according to the present embodiment includes a take out report unit 46.

The take out report unit 46 is realized by, for example, the CPU 206, etc., and when the take out report unit 46 determines that an article has been taken outdoors, the take out report unit 46 sends a report indicating that the article has been taken outdoors to the user terminal 50 set in advance. Here, the take out report unit 46 determines that an article has been taken outdoors, when position information of outdoors is stored in the movement history information stored in the movement history information database 43.

<Details of Process>

Next, a description is given of details of processes of the position management system 1 according to the second embodiment.

Figure 17:
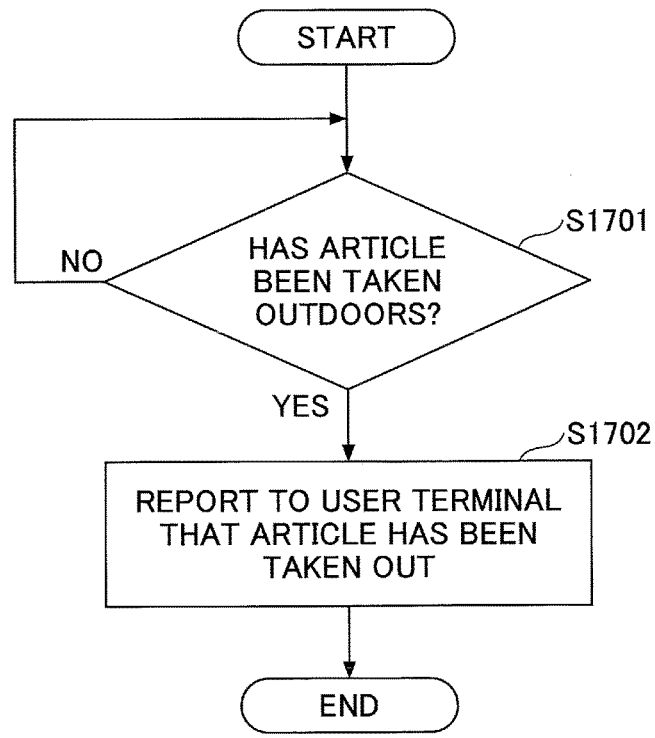
FIG. 17 is a flowchart of an example of a take out report process according to the second embodiment.

In the following, a description is given of a process of sending a report indicating that an article has been taken outdoors to the user terminal 50 set in advance, when the article that is a management target has been taken outdoors, with reference to FIG. 17. FIG. 17 is a flowchart of an example of a take out report process according to the second embodiment.

The take out report unit 46 of the management device 40 determines whether an article has been taken outdoors (step S1701). Here, the take out report unit 46 determines whether position information of outdoors has been stored in the movement history information stored in the movement history information database 43, at every predetermined time interval. Then, when the take out report unit 46 has determined that position information of outdoors has been stored in the movement history information, the take out report unit 46 determines that an article has been taken outdoors.

Figure 18:
FIG. 18 illustrates an example of a take out report screen.

In step S1701, when the take out report unit 46 determines that an article has been taken outdoors, the take out report unit 46 of the management device 40 sends a report including the article name and the tag ID of the article that has been taken outdoors, to the user terminal 50 set in advance (step S1702). Accordingly, the display device 202 of the user terminal 50 that has received the report displays, for example, a take out report screen 4000 illustrated in FIG. 18, and the user of the user terminal 50 is able to recognize the article name etc., of the article that has been taken out.

In step S1701, when the take out report unit 46 determines that an article has not been taken outdoors, the take out report unit 46 of the management device 40 performs the process of step S1701 again. As described above, the take out report unit 46 according to the present embodiment is to perform the process of step S1701 every time the movement history information stored in the movement history information database 43 is updated.

As described above, the position management system 1 according to the second embodiment reports that an article has been taken out to the user terminal 50 used by, for example, the administrator, etc., when an article that is a management target is taken outdoors. Accordingly, for example, it is possible to prevent theft, etc., of articles.

Third Embodiment

<System Configuration>

Figure 19:
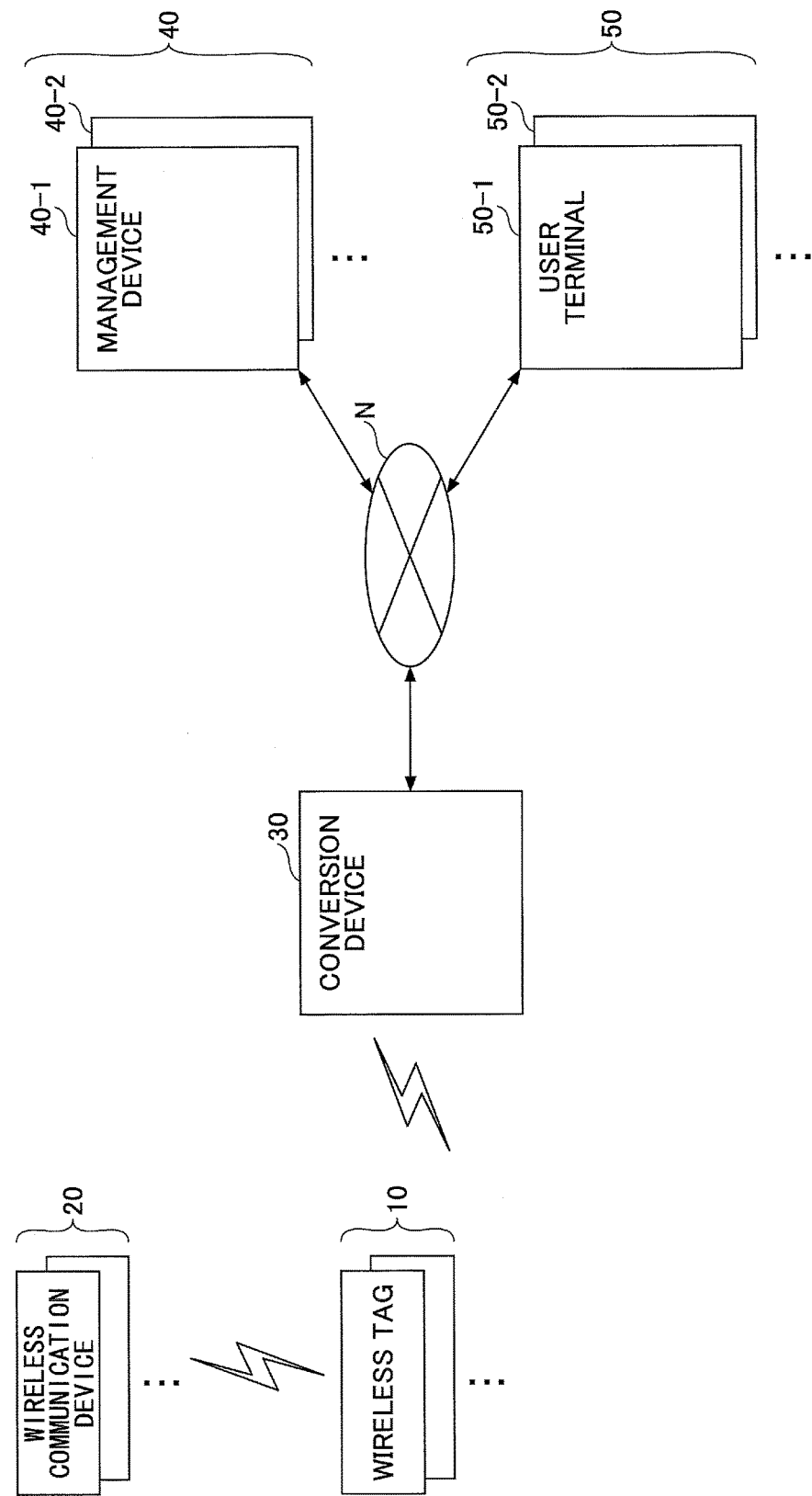
FIG. 19 illustrates an example of a system configuration of the position management system according to a third embodiment.

Next, a description is given of a position management system 1 according to a third embodiment of the present invention. FIG. 19 illustrates an example of a system configuration of the position management system 1 according to the third embodiment. The position management system 1 according to the third embodiment includes a wireless tag 10, a wireless communication device 20, a conversion device 30, a management device 40, and a user terminal 50. Furthermore, the conversion device 30, the management device 40, and the user terminal 50 are communicatively connected to each other via a network N such as the Internet, a telephone line network, etc.

The wireless tag 10 is a device that is, for example, attached to each article that is a management target, whose position, such as the installation location, the storage location, etc., is managed. When an article to which the wireless tag 10 is attached is moved, the wireless tag 10 measures the radio field intensity of wireless communication received from the wireless communication device 20, and sends information relevant to the measured radio field intensity (radio field intensity information) to the conversion device 30.

The wireless communication device 20 is a device for performing wireless communication with the wireless tag 10, etc., according to a predetermined wireless communication standard. A plurality of wireless communication devices 20 are installed in the room or on the floor, etc., (that is, in an "area" described below) where the article that is the management target is installed, stored, etc. The plurality of wireless communication devices 20 transmit radio waves of wireless communication in a predetermined surrounding range at every predetermined time interval. Here, as the predetermined wireless communication standard, standards of various kinds of wireless communication may be used, such as Zigbee (registered trademark), RFID (Radio Frequency Identifier), Bluetooth (registered trademark), infrared rays, Wi-Fi (registered trademark), ultrasonic waves, etc.

The conversion device 30 is an information processing apparatus for converting the radio field intensity information received from the wireless tag 10 into position information. Accordingly, in the position management system 1, the position information of an article that is a management target is acquired at the conversion device 30. Furthermore, the conversion device 30 identifies the management device 40 that is the storage destination for storing the position information obtained by the conversion, and sends the position information to the identified management device 40.

The management device 40 is a storage device or an information processing apparatus that manages the position information received from the conversion device 30. Furthermore, the management device 40 also manages information relevant to a map of the room or the floor, etc., where the article that is the management target is installed, stored, etc. In response to a request from the user terminal 50, the management device 40 sends position information and information relevant to a map, to the user terminal 50 that is the request source.

Note that in the following, when distinguishing a plurality of management devices 40, the management devices 40 are expressed as "management device 40-1", "management device 40-2", etc.

Furthermore, the position management system 1 may use, for example, a cloud storage, etc., provided from an external service provider, instead of the management device 40, and the position management system 1 may be adapted to various providing modes referred to as ASP (Application Service Provider), Web service, etc. In this case, as some of the management devices 40 among the plurality of management devices 40, cloud storages provided from an external service provider may be used. For example, an on premise type storage may be used as the management device 40-1, and a cloud type storage may be used as the management device 40-2.

The user terminal 50 is an information processing apparatus that the user uses for displaying a position of an article that is a management target. The user terminal 50 acquires, from the management device 40, information of an article to be searched for such as position information and information relevant to a map, and displays the position of the article on the map based on the acquired information. Accordingly, the user is able to recognize the installation location, the storage location, etc., of the article. Here, as the user terminal 50, for example, a mobile phone, a smartphone, a tablet terminal, a notebook PC, a desktop PC, etc., may be used.

Note that in the following, when distinguishing a plurality of user terminals 50, the user terminals 50 are expressed as "user terminal 50-1", "user terminal 50-2", etc.

The configuration of the position management system 1 illustrated in FIG. 19 is one example; the position management system 1 may have another configuration. For example, the conversion device 30 and the management device 40 may be respectively constituted by a plurality of devices, or the conversion device 30 and the management device 40 may constitute a single device.

<Hardware Configuration>

Next, a description is given of a hardware configuration of the position management system 1 according to the third embodiment.

Figure 20:
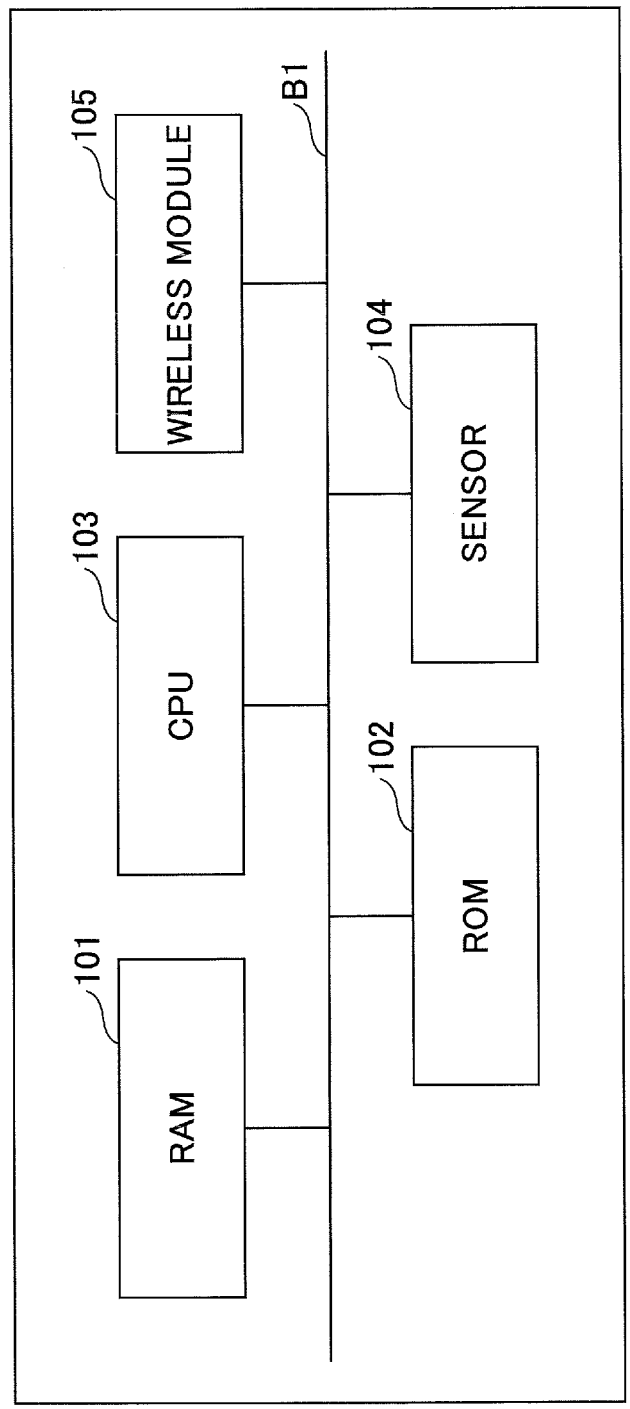
FIG. 20 illustrates an example of a hardware configuration of the wireless tag according to the third embodiment.

First, a hardware configuration of the wireless tag 10 is described with reference to FIG. 20. FIG. 20 illustrates an example of a hardware configuration of the wireless tag 10 according to the third embodiment. The wireless tag 10 includes a RAM (Random Access Memory) 101, a ROM (Read Only Memory) 102, and a CPU (Central Processing Unit) 103, a sensor 104, and a wireless module 105, which are connected to each other by a bus B1.

The RAM 101 is a volatile semiconductor memory for temporarily storing programs and data. The ROM 102 is a non-volatile semiconductor memory that can store data even after the power is turned off. The CPU 103 is an arithmetic device that loads, for example, the programs and data of the ROM 102, into the RAM 101, and executes various processes.

The sensor 104 is, for example, an acceleration sensor, a gyro sensor, etc., and is a sensor for detecting that the article has started moving or that the article is moving, according to the oscillation of the article to which the wireless tag 10 is attached.

The wireless module 105 is a module for performing wireless communication with the wireless communication device 20 according to a predetermined wireless communication standard.

The wireless tag 10 according to the present embodiment implements various processes described below, by the hardware configuration illustrated in FIG. 20.

Figure 21:
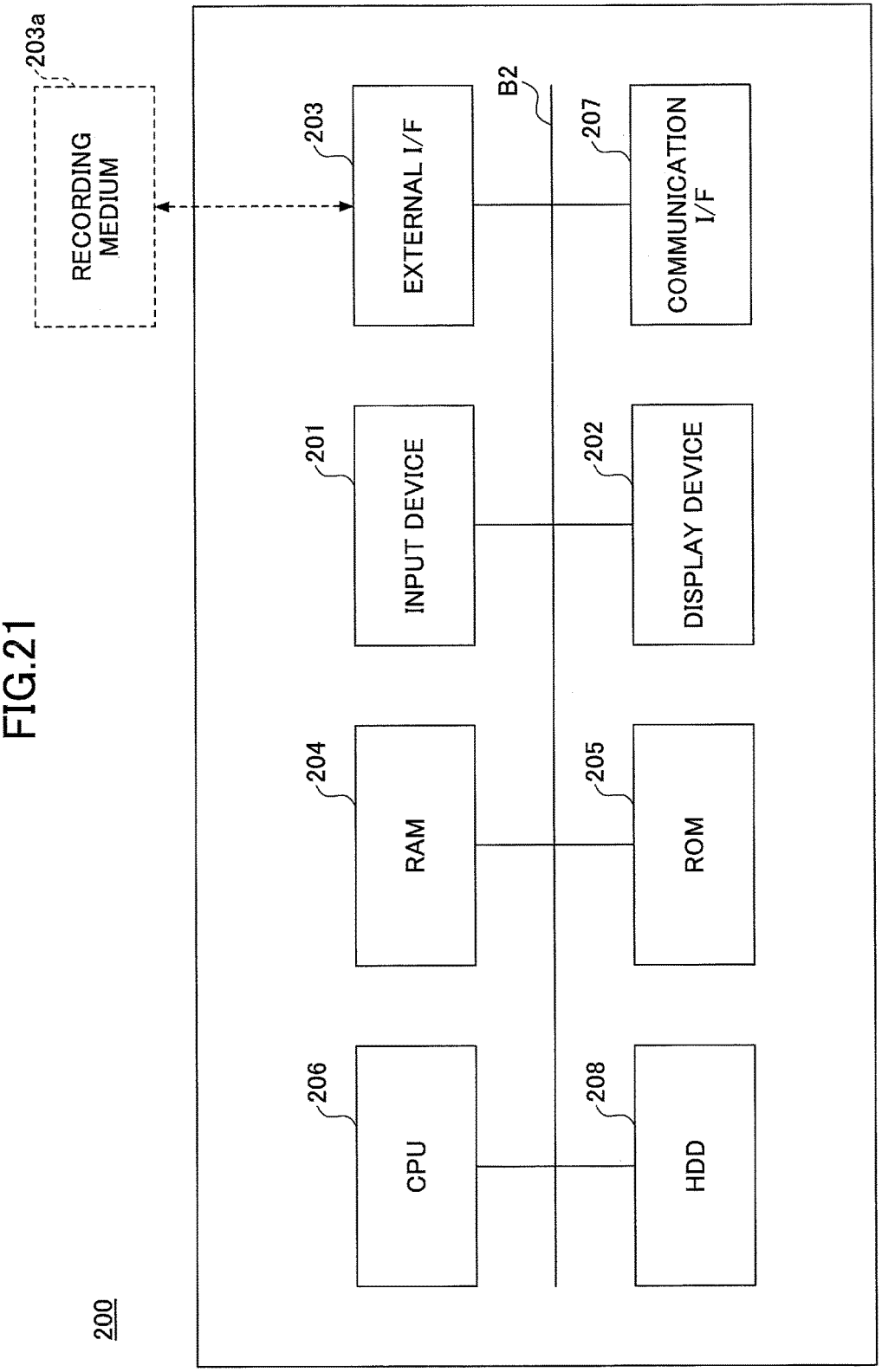
FIG. 21 illustrates an example of a hardware configuration of a computer according to the third embodiment.

Next, a hardware configuration of the conversion device 30, the management device 40, and the user terminal 50 is described with reference to FIG. 21. FIG. 21 illustrates an example of a hardware configuration of a computer according to the third embodiment. A computer 200 includes an input device 201, a display device 202, an external I/F 203, a RAM 204, a ROM 205, a CPU 206, a communication I/F 207, and a HDD (Hard Disk Drive) 208. Furthermore, these hardware elements are connected to each other by a bus B2.

The input device 201 includes a keyboard, a mouse, a touch panel, etc., and is used for inputting various signals in the computer 200. The display device 202 includes a display, etc., and displays various processing results. Note that the conversion device 30 and the management device 40 may have a mode in which the input device 201 and/or the display device 202 are connected and used according to need.

The external I/F 203 is an interface between the computer 200 and an external device. An example of an external device is a recording medium 203a, etc. Accordingly, the computer 200 is able to read and/or write information in the recording medium 203a via the external I/F 203. Examples of the recording medium 203a are a CD (Compact Disk), a DVD (Digital Versatile Disk), an SD memory card, a USB memory (Universal Serial Bus memory), etc.

The RAM 204 is a volatile semiconductor memory for temporarily storing programs and data. The ROM 205 is a non-volatile semiconductor memory that can store data even after the power is turned off. The CPU 206 is an arithmetic device that loads, for example, the programs and data of the HDD 208, the ROM 205, etc., into the RAM 204, and executes various processes.

The communication I/F 207 is an interface for connecting the computer 200 to the network N. Furthermore, the communication I/F 207 of the conversion device 30 includes a wireless module for performing wireless communication with the wireless tag 10 and/or the wireless communication device 20, according to a predetermined wireless communication standard.

The HDD 208 is a non-volatile memory storing programs and data. The stored programs and data include the OS (Operating System) that is the basic software for controlling the entire computer 200, and various programs operating on the OS. Note that the computer 200 may include a non-volatile memory such as SSD (Solid State Drive), etc., instead of the HDD 208.

The conversion device 30, the management device 40, and the user terminal 50 according to the present embodiment implement various processes described below, by the computer 200 illustrated in FIG. 21.

<Usage Scene>

Figure 22:
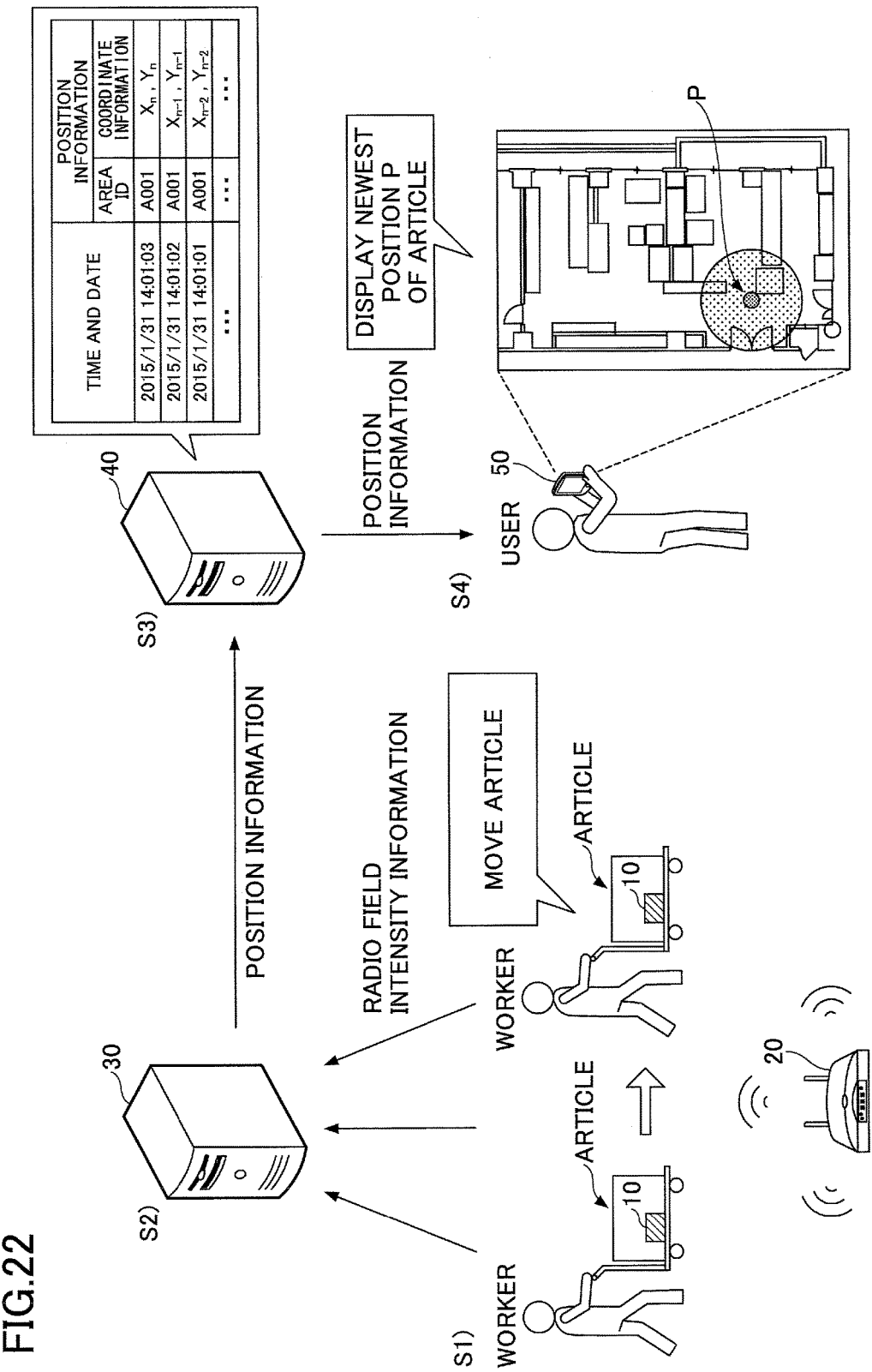
FIG. 22 is for describing a usage scene of the position management system according to the third embodiment.

Next, a description is given of a usage scene of the position management system 1 according to the third embodiment, with reference to FIG. 22. FIG. 22 is for describing a usage scene of the position management system 1 according to the third embodiment.

The position management system 1 according to the third embodiment is used, for example, for managing articles such as a mold, various components, equipment, etc., in a factory. The articles that are management targets have wireless tags 10 attached. Furthermore, in one area indicating one predetermined compartment (for example, one room, one floor, etc.) in the factory, a plurality of wireless communication devices 20 are installed, and the wireless communication devices 20 send radio waves of wireless communication at predetermined time intervals. A description is given of a case where a worker, etc., of the factory moves an article that is a management target.

Step S1) First, when a worker moves an article, the wireless tag 10 attached to the article detects the movement of the article, and receives radio waves from the plurality of wireless communication devices 20 Then, the wireless tag 10 measures the radio field intensity of the received radio waves, and sends the radio field intensity information to the conversion device 30.

Note that while the article is moving, at every predetermined time interval (for example, a time interval of several milliseconds through several seconds), the wireless tag 10 receives radio waves from the plurality of wireless communication devices 20, and sends the radio field intensity information of the received radio waves to the conversion device 30. Furthermore, the wireless tag 10 also sends a tag ID for uniquely identifying the wireless tag 10, to the conversion device 30.

Step S2) The conversion device 30 acquires position information of the wireless tag 10, based on the radio field intensity information received from the wireless tag 10. That is, the conversion device 30 coverts the received radio field intensity information into position information. In the position management system 1 according to the present embodiment, this conversion is performed every time the radio field intensity information is received, and therefore the position information at every predetermined time interval (that is, the movement history information) can be obtained in a case where the article to which the wireless tag 10 is attached is moved.

Then, the conversion device 30 sends the acquired position information to the management device 40. At this time, the conversion device 30 identifies the management device 40 to be the storage destination for storing the position information, based on the tag ID received from the wireless tag 10, and sends the position information to the identified management device 40. Note that the process of sending the acquired position information to the management device 40 by the conversion device 30 may be performed in response to a query process from the management device 40 to the conversion device 30.

Step S3) The management device 40 stores the position information received from the conversion device 30 in a storage area. Accordingly, in the management device 40, movement history information of the wireless tag 10 is managed.

Step S4) On the other hand, a user who wants to know the position of the article operates the user terminal 50, and acquires the newest position information of the wireless tag 10 that is attached to the corresponding article, from the movement history information of the wireless tag 10 managed by the management device 40. Then, the user terminal 50 displays a position P based on the acquired position information on the map. Accordingly, the user is able to recognize the position of the corresponding article.

As described above, the position management system 1 according to the third embodiment acquires the history (movement history information) of the position information based on the radio field intensity information of the radio waves received by the wireless tag 10, upon being triggered by the movement of an article. Then, the position management system 1 according to the third embodiment manages the movement history information in the management device 40 according to the wireless tag 10. Accordingly, in the position management system 1 according to the third embodiment, it is possible to manage the movement history information in a management device 40 according to, for example, the type of article, the importance level of the article, etc.

Furthermore, a user who wants to know the storage location, etc., of an article can recognize the storage location, etc., of an article by acquiring the newest position information of the desired article from the management device 40 by using the user terminal 50.

<Functional Configuration>

Figure 23:
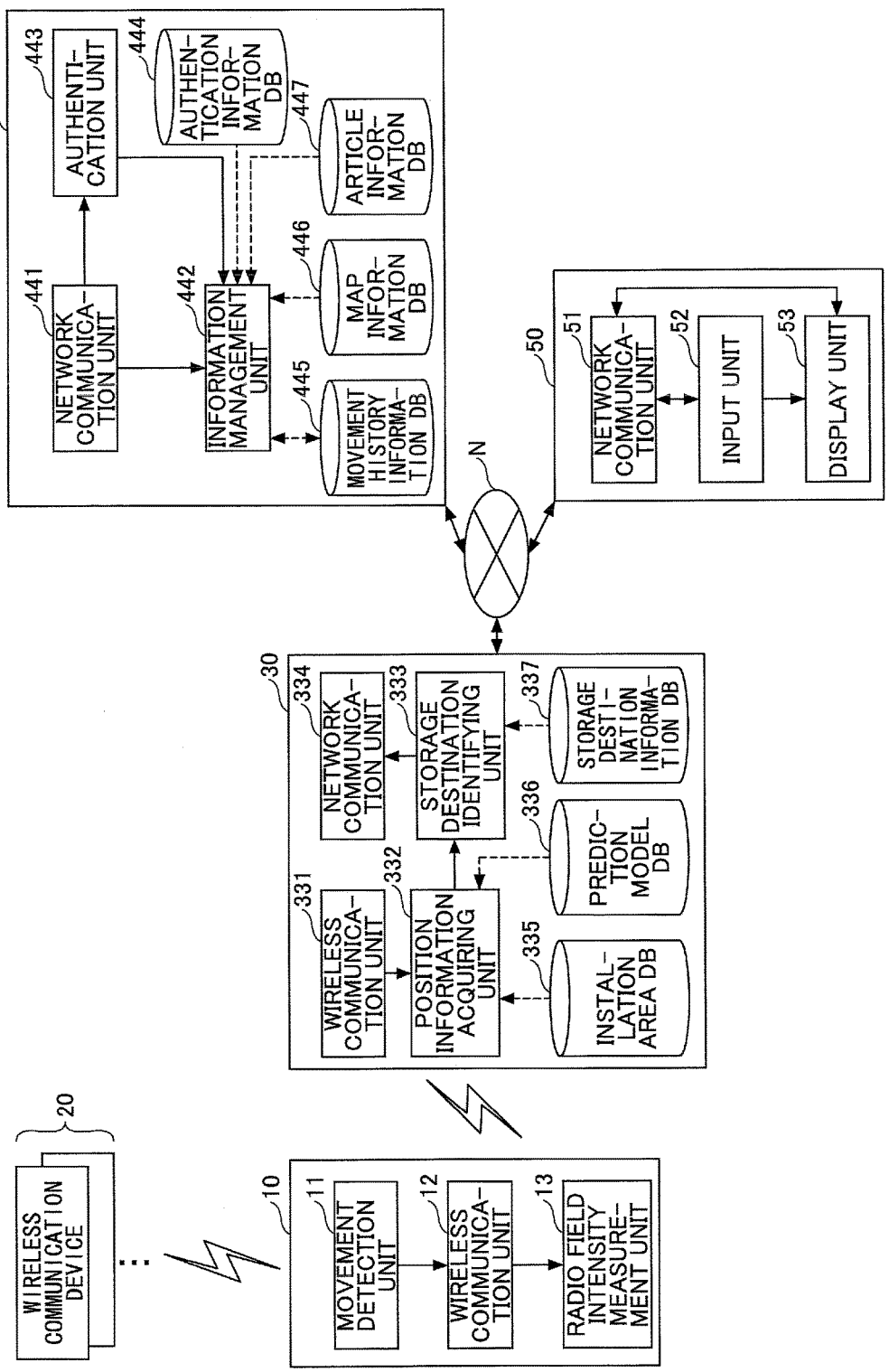
FIG. 23 illustrates an example of a functional configuration of the position management system according to the third embodiment.

Next, a description is given of a functional configuration of the position management system 1 according to the third embodiment, with reference to FIG. 23. FIG. 23 illustrates an example of a functional configuration of the position management system 1 according to the third embodiment. The wireless tag 10 includes a movement detection unit 11, a wireless communication unit 12, and a radio field intensity measurement unit 13.

The movement detection unit 11 is realized by, for example, the CPU 103, the sensor 104, etc., and detects that the article to which the wireless tag 10 is attached has started moving or that the article is moving.

The wireless communication unit 12 is realized by the CPU 103, the wireless module 105, etc., and performs wireless communication with the wireless communication device 20, etc.

The radio field intensity measurement unit 13 is realized by, for example, the CPU 103, the wireless module 105, etc., and measures the radio field intensity of the radio waves of wireless communication received by the wireless communication unit 12, and generates radio field intensity information.

Furthermore, the conversion device 30 includes a wireless communication unit 331, a position information acquiring unit 332, a storage destination identifying unit 333, a network communication unit 334, an installation area database 335, a prediction model database 336, and a storage destination information database 337.

The wireless communication unit 331 is realized by, for example, the CPU 206, the communication I/F 207, etc., and performs wireless communication with the wireless tag 10 or the wireless communication device 20, and receives radio field intensity information and a tag ID. Note that the tag ID is information for uniquely identifying the wireless tag 10.

The position information acquiring unit 332 is realized by, for example, the CPU 206, etc., and acquires position information based on radio field intensity information received by the wireless communication unit 331, installation area information stored in the installation area database 335, and a prediction model stored in the prediction model database 336.

The storage destination identifying unit 333 is realized by, for example, the CPU 206, etc., and identifies the management device 40 to be the storage destination of the position information acquired by the position information acquiring unit 332, based on the tag ID received by the wireless communication unit 331 and the storage destination information stored in the storage destination information database 337.

The network communication unit 334 is realized by, for example, the CPU 206, the communication I/F 207, etc., and sends the position information acquired by the position information acquiring unit 332 to the management device 40, which is identified by the storage destination identifying unit 333, via the network N.

The installation area database 335 is realized by, for example, the HDD 208 or a storage device connected to the conversion device 30 via a network, and stores installation area information. Details of the installation area information are described below.

The prediction model database 336 is realized by, for example, the HDD 208 or a storage device connected to the conversion device 30 via a network, and stores a prediction model for estimating the position information of the wireless tag 10 based on the radio field intensity information. This kind of prediction model is a distance attenuation model of the radio field intensity, for estimating the position information of a position for which the radio field intensity is measured. The distance attenuation model is generated by learning, in advance, information of radio field intensities of a plurality of positions, by a learning apparatus using, for example, a machine learning algorithm such as Random Forest, Support Vector Machine, etc.

The storage destination information database 337 is realized by, for example, the HDD 208 or a storage device connected to the conversion device 30 via a network, and stores storage destination information. Details of the storage destination information are described below.

Furthermore, the management device 40 includes a network communication unit 441, an information management unit 442, an authentication unit 443, an authentication information database 444, a movement history information database 445, a map information database 446, and an article information database 447.

The network communication unit 441 is realized by, for example, the CPU 206, the communication I/F 207, etc., and receives position information from the conversion device 30 via the network N. Furthermore, the network communication unit 441 receives a request to acquire the position information of an article, etc., from the user terminal 50 via the network N.

The information management unit 442 is realized by, for example, the CPU 206, etc., and reads information from various databases and writes (stores) information in various databases. For example, when the network communication unit 441 receives a request to acquire position information of an article from the user terminal 50, the information management unit 442 acquires the newest position information of the article from the movement history information database 445, in response to the acquisition request.

The authentication unit 443 is realized by, for example, the CPU 206, etc., and performs authentication as to whether a request to acquire position information of an article received by the network communication unit 441 is made from a valid user terminal 50, based on the authentication information stored in the authentication information database 444. Note that the authentication unit 443 performs authentication as to whether the user terminal 50 is valid, according to whether the terminal ID included in the request to acquire position information of an article is stored in the authentication information. Here, a terminal ID is information for uniquely identifying the user terminal 50.

The authentication information database 444, the movement history information database 445, the map information database 446, and the article information database 447 are realized by, for example, the HDD 208 or a storage device connected to the management device 40 via a network. The authentication information database 444, the movement history information database 445, the map information database 446, and the article information database 447 store authentication information, movement history information, map information, and article information, respectively.

Details of authentication information, movement history information, map information, and article information are described below.

Furthermore, the user terminal 50 includes a network communication unit 51, an input unit 52, and a display unit 53.

The network communication unit 51 is realized by, for example, the CPU 206, the communication I/F 207, etc., and sends a request to acquire position information of an article to the management device 40 via the network N. Furthermore, the network communication unit 51 receives position information, etc., of an article sent from the management device 40 in response to the acquisition request.

The input unit 52 is realized by, for example, the CPU 206, the input device 201, etc., and accepts input by a user. For example, the input unit 52 accepts a specification of an article (an article for which the position is to be displayed) input from the input device 201.

The display unit 53 is realized by, for example, the CPU 206, the display device 202, etc., and displays a position of an article based on position information on a map based on information relevant to a map, when the network communication unit 51 receives position information, information relevant to a map, etc.

Here, a description is given of the installation area information stored in the installation area database 335, with reference to FIG. 24. FIG. 24 illustrates an example of the installation area database 335. The installation area information is information for managing the area in which the wireless communication device 20 is installed, and includes data items of a device ID and an installation area ID. The device ID is identification information for uniquely identifying the wireless communication device 20. The installation area ID is identification information for identifying, for example, one area indicating one predetermined compartment in a factory, etc.

For example, in FIG. 24, device IDs "AP1" and "AP2" are associated with the installation area ID "A001". This means that in the area having the installation area ID "A001", two wireless communication devices 20 of device IDs "AP1" and "AP2" are installed. As described above, in the installation area information stored in the installation area database 335, the area where the wireless communication device 20 is installed is managed.

Next, a description is given of the storage destination information stored in the storage destination information database 337, with reference to FIG. 25. FIG. 25 illustrates an example of the storage destination information database 337. The storage destination information includes data items of a tag ID and a storage destination. The tag ID is identification information for uniquely identifying the wireless tag 10. The storage destination is a pair of a name and a host name of the management device 40 that is the storage destination of the position information. Here, a host name is address information used by the conversion device 30 for sending the position information to the management device 40. In FIG. 25, a host name is used as the address information; however, the address information is not so limited; for example, the address information may be an IP (Internet Protocol) address, a MAC (Media Access Control) address, a manufacturing unique number, etc.

For example, in FIG. 25, as the storage destination, a name "storage system A" and a host name "hosta.xxx.co.jp" are associated with a tag ID "T001". Furthermore, as the storage destination, a name "storage system B" and a host name "hostb.xxx.co.jp" are associated with a tag ID "T101".

Accordingly, the conversion device 30 identifies the management device 40-1, which is indicated by a name "storage system A" and a host name "hostb.xxx.co.jp", as the storage destination of the position information acquired based on the radio field intensity information received from the wireless tag 10 having the tag ID "T001".

Similarly, the conversion device 30 identifies the management device 40-2, which is indicated by a name "storage system B" and a host name "hostb.xxx.co.jp", as the storage destination of the position information acquired based on the radio field intensity information received from the wireless tag 10 having the tag ID "T101".

As described above, in the position management system 1 according to the present embodiment, the position information is stored in a management device 40 according to the tag ID of the wireless tag 10. Accordingly, it is possible to manage the position information of articles by different management devices 40 according to, for example, the type of an article, the importance level of an article, etc. Furthermore, for example, when the importance level of an article changes, the administrator, etc., changes the storage destination information, and therefore the management device 40 to be the storage destination of the position information can be easily changed.

Next, a description is given of the authentication information stored in the authentication information database 444, with reference to FIGS. 26A and 26B. FIGS. 26A and 26B illustrate examples of the authentication information database 444. FIG. 26A illustrates an example of authentication information stored in the authentication information database 444-1 of the management device 40-1, and FIG. 26B illustrates an example of authentication information stored in the authentication information database 444-2 of the management device 40-2.

The authentication information is information used for authentication when the management device 40 receives a request to acquire position information of an article from the user terminal 50, and includes a data item of a terminal ID. A terminal ID is identification information for uniquely identifying the user terminal 50. Note that in FIGS. 26A and 26B, as the terminal ID, identification information (for example, a user ID) set in advance by, for example, an administrator, etc., is used; however, the terminal ID is not so limited; for example, the terminal ID may be a MAC address, a manufacturing unique number, etc.

For example, in FIG. 26A, in the authentication information stored in the authentication information database 444-1 of the management device 40-1, terminal IDs "DEV001", "DEV002", "DEV003", etc., are stored. Accordingly, when the management device 40-1 receives a request to acquire position information of an article from the user terminal 50-1 having the terminal ID "DEV001", the management device 40-1 determines that the acquisition request is made by a valid user terminal 50. Similarly, when the management device 40-1 receives a request to acquire position information of an article from a user terminal 50 having the terminal ID "DEV002", "DEV003", etc., the management device 40-1 determines that the acquisition request is made by a valid user terminal 50.

On the other hand, in FIG. 26B, in the authentication information stored in the authentication information database 444-2 of the management device 40-2, terminal IDs "DEV101", "DEV102", "DEV103", etc., are stored. Accordingly, when the management device 40-2 receives a request to acquire position information of an article from the user terminal 50-2 having the terminal ID "DEV101", the management device 40-2 determines that the acquisition request is made by a valid user terminal 50. Similarly, when the management device 40-2 receives a request to acquire position information of an article from the user terminal 50 having the terminal ID "DEV102", "DEV103", etc., the management device 40-2 determines that the acquisition request is made by a valid user terminal 50.

As described above, in the position management system 1 according to the present embodiment, the user terminals 50 that can acquire position information of articles (that is, the user terminals 50 that can access the management device 40) are managed for each management device 40.

Next, a description is given of the movement history information stored in the movement history information database 445, with reference to FIGS. 27A and 27B. FIGS. 27A and 27B illustrate examples of the movement history information database 445. FIG. 27A illustrates an example of the movement history information stored in the movement history information database 445-1 of the management device 40-1. FIG. 27B illustrates an example of the movement history information stored in the movement history information database 445-2 of the management device 40-2.

The movement history information is information for managing the history of the position information of the wireless tag 10 at every hour, and includes data items of a time and date and position information, for each tag ID. The tag ID is identification information for uniquely identifying the wireless tag 10. The time and date is information relevant to the date and the time when, for example, the wireless tag 10 sends the radio field intensity information to the conversion device 30. The position information includes an area ID and coordinate information. The area ID is identification information for identifying, for example, one area indicating one predetermined compartment in a factory, etc., similar to the installation area ID described with reference to FIG. 24. The information of the compartment area managed by the area ID and the installation area ID may be the same compartment area information according to the same compartment divisions, or may be compartment area information according to different compartment divisions between the area ID and the installation area ID. The coordinate information is information of coordinates indicating a position in an area indicated by the associated area ID. Here, these coordinates are relative coordinates from a reference point set in advance in an area indicated by the area ID.

For example, in FIG. 27A, the position information at the time and date "2015/1/31 14:01:02" of the wireless tag 10 having the tag ID "T001" is identified by the area ID "A001" and "$X_{n-1}, Y_{n-1}$". Furthermore, the position information at the time and date "2015/1/31 14:01:03" of the wireless tag 10 having the tag ID "T001" is identified by the area ID "A001" and "$X_n, Y_n$".

Similarly, for example, in FIG. 27B, the position information at the time and date "2015/1/31 9:30:00" of the wireless tag 10 having the tag ID "T101" is identified by the area ID "A002" and "$X_{m-1}, Y_{m-1}$". Furthermore, the position information at the time and date "2015/1/31 9:30:01" of the wireless tag 10 having the tag ID "T101" is identified by the area ID "A002" and "$X_m, Y_m$".

As described above, in the movement history information stored in the movement history information database 445, the movement history information of the wireless tag 10 (that is, the movement history information of the article to which the wireless tag 10 is attached) is managed. Note that in FIGS. 27A and 27B, the time and date is expressed by year/month/date and hour/minutes/seconds; however, in addition, for example, the time and date may be further managed in units of one one-thousandth of a second (milliseconds).

Next, a description is given of the map information stored in the map information database 446, with reference to FIG. 28. FIG. 28 illustrates an example of the map information database 446. The map information is information for managing the map display data of an area indicated by an area ID, and includes data items of an area ID and map display data. The area ID is the same as the area ID described with reference to FIGS. 27A and 27B. The map display data is information relevant to the map described above, and is data for displaying the map of the area indicated by the associated area ID. The map display data is not limited to data in a raster format such as JPEG (Joint Photographic Experts Group), BMP (Bit Map), PNG (Portable Network Graphics), etc.; the map display data may be data in a vector format.

For example, in FIG. 28, an area ID "A001" is associated with map display data "X wing first floor". This means that the map of the area having the area ID "A001" is the map display data "X wing first floor".

Note that in the example of FIG. 28, the management devices 40 have a common map information database 446; however, there may be different map information databases 446 for the respective management devices 40. For example, when the management device 40-1 manages the movement history information of an article in the areas having the area IDs "A001" through "A100", the management device 40-1 is to include a map information database 446-1 storing the map information of the areas that are the management targets.

Next, a description is given of the article information stored in the article information database 447, with reference to FIGS. 29A and 29B. FIGS. 29A and 29B illustrate examples of the article information database 447. FIG. 29A illustrates the article information stored in the article information database 447-1 of the management device 40-1. FIG. 29B illustrates the article information stored in the article information database 447-2 of the management device 40-2.

The article information is information for managing the wireless tags 10 and articles in association with each other, and includes data items of a tag ID and an article name. The tag ID is identification information for uniquely identifying the wireless tag 10. The article name is the name of the article, to which the wireless tag 10 having the associated tag ID, is attached.

For example, in FIG. 29A, in the article information stored in the article information database 447-1 of the management device 40-1, a tag ID "T001" is associated with the article name "mold of ○○ of company ABC". This means that the wireless tag 10 having the tag ID "T001" is attached to the article having the article name "mold of ○○ of company ABC".

Similarly, in FIG. 29B, in the article information stored in the article information database 447-2 of the management device 40-2, a tag ID "T101" is associated with the article name "mold of ○Δ of company XYZ". This means that the wireless tag 10 having the tag ID "T101" is attached to the article having the article name "mold of ○Δ of company XYZ".

As described above, the position management system 1 according to the present embodiment manages, for each management device 40, the information of articles having attached the wireless tags 10 whose movement history information is managed.

Note that in FIGS. 29A and 29B, the article information may include a data item of "article ID", etc., that is identification information for uniquely identifying the article, instead of or in addition to the data item "article name".

<Details of Process>

Next, a description is given of details of processes of the position management system 1 according to the third embodiment.

Figure 30:
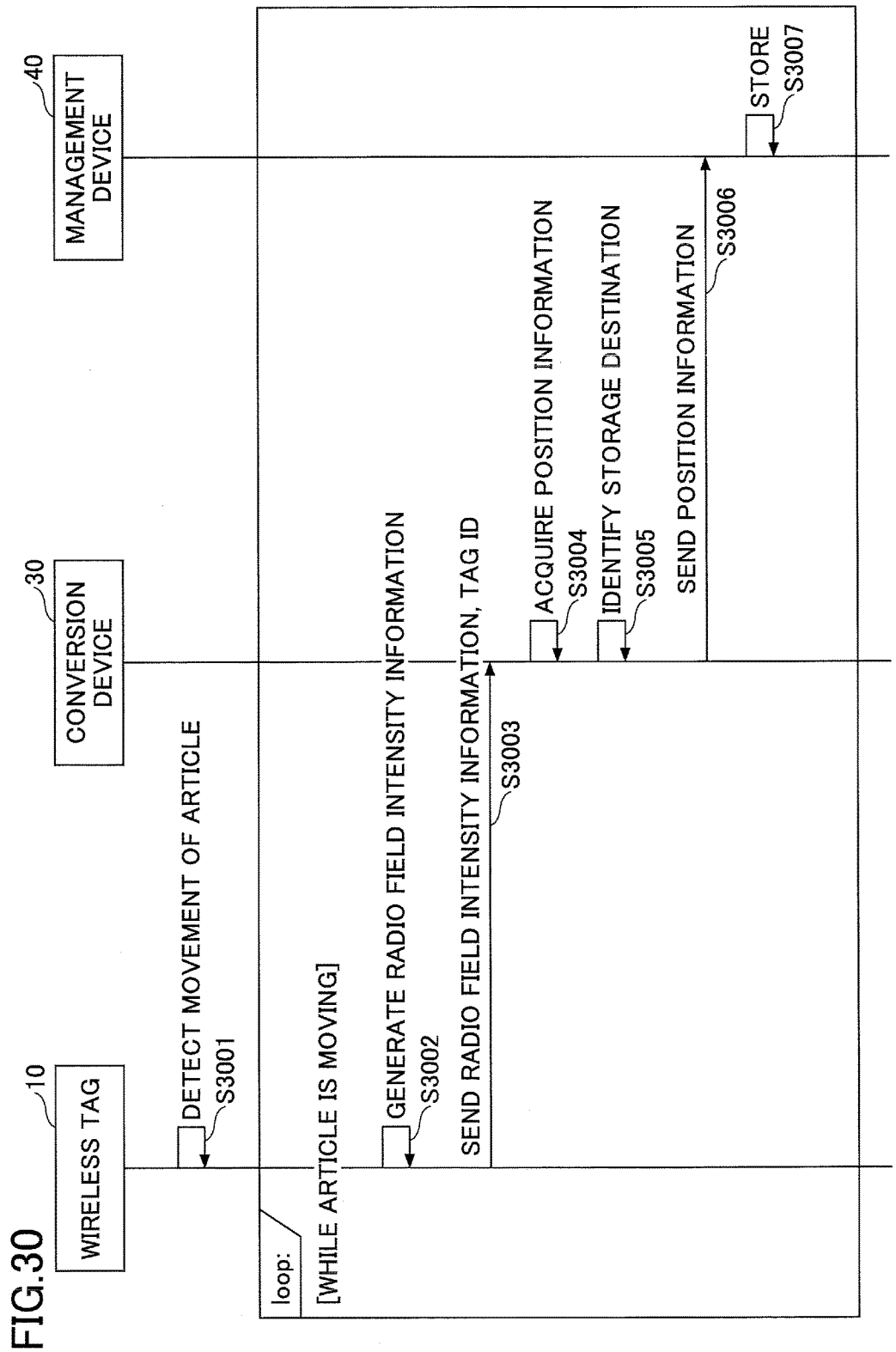
FIG. 30 is a sequence diagram of an example of a process of storing the movement history information according to the third embodiment.

First, a description is given of a process of storing the movement history information of the wireless tag 10 in the management device 40 in a case where, for example, a worker of a factory, etc., moves an article to which the wireless tag 10 is attached, with reference to FIG. 30. FIG. 30 is a sequence diagram of an example of a process of storing the movement history information according to the third embodiment.

The worker, etc., starts to move an article, to which the wireless tag 10 is attached. Then, the movement detection unit 11 of the wireless tag 10 detects that the movement of the article has started (step S3001). At this time, the wireless tag 10 supplies power to the wireless module 105 from a power source, upon being triggered by the detection of the start of movement by the movement detection unit 11. Then, the wireless communication unit 12 receives radio waves of wireless communication sent from the wireless communication device 20.

As described above, power is supplied to the wireless module 105 of the wireless tag 10 upon being triggered by the detection of the start of movement by the movement detection unit 11. Therefore, it is possible to suppress the power consumption of the wireless module 105.

Next, the radio field intensity measurement unit 13 of the wireless tag 10 measures the radio field intensity of the radio waves received by the wireless communication unit 12, and generates radio field intensity information (step S3002). At this time, the wireless communication unit 12 receives a plurality of radio waves sent from a plurality of wireless communication device 20, and the radio field intensity measurement unit 13 measures the radio field intensity of the respective radio waves, and generates the radio field intensity information.

That is, the radio field intensity information generated by the radio field intensity measurement unit 13 includes a plurality of pairs of device IDs and radio field intensity values. For example, the radio field intensity information includes a plurality of pairs of device IDs and radio field intensity values, such as (device ID, radio field intensity value)=(AP1, 50), (AP2, 60), etc. Furthermore, the radio field intensity information may include the time and date (information relevant to date and time) when the radio field intensity measurement unit 13 has generated the radio field intensity information.

Next, the wireless communication unit 12 of the wireless tag 10 sends, to the conversion device 30, the radio field intensity information generated by the radio field intensity measurement unit 13 and the tag ID of the wireless tag 10 (step S3003). Note that the wireless communication unit 12 may directly send the radio field intensity information to the conversion device 30, or may send this information to the conversion device 30 via one or more wireless communication devices 20.

For example, when the wireless tag 10 and the conversion device 30 are located at a distance in which wireless communication cannot be directly performed with each other, the wireless communication unit 12 of the wireless tag 10 sends the radio field intensity information and the tag ID to a nearby wireless communication device 20. Then, when the wireless communication device 20 is able to directly send information to the conversion device 30, the wireless communication device 20 sends the radio field intensity information and the tag ID to the conversion device 30. On the other hand, when the wireless communication device 20 is unable to directly send information to the conversion device 30, the wireless communication device 20 sends the radio field intensity information and the tag ID to another wireless communication device 20. As described above, the wireless communication unit 12 of the wireless tag 10 may send the radio field intensity information and the tag ID to the conversion device 30, by relaying the information to one or more wireless communication devices 20.

Next, when the wireless communication unit 331 receives the radio field intensity information and the tag ID by, the position information acquiring unit 332 of the conversion device 30 acquires the position information based on the radio field intensity information, the installation area information, and the prediction model (step S3004).

More specifically, the position information acquiring unit 332 refers to the installation area information, and converts the device ID of the wireless communication device 20 included in the radio field intensity information into an installation area ID. That is, the position information acquiring unit 332 converts (device ID, radio field intensity value) included in the radio field intensity information, into (installation area ID, radio field intensity value). Then, the position information acquiring unit 332 estimates the position information of the wireless tag 10 based on (installation area ID, radio field intensity value) and the prediction model, and acquires the estimated position information. The estimated position information acquired at this time includes an area ID and the coordinate information (relative coordinates) from a reference point in the area indicated by the area ID. Accordingly, in the conversion device 30, the radio field intensity information is converted into position information at the conversion device 30.

Note that in the present embodiment, in step S3004, the device ID of the wireless communication device 20 is converted into an installation area ID; however, this conversion may be performed in step S3007 described below. That is, in step S3004, the position information acquiring unit 332 may estimate the position information of the wireless tag 10 based on the respective items of (device ID, radio field intensity value) and the prediction model, and acquire this estimated position information.

Next, the storage destination identifying unit 333 of the conversion device 30 identifies the management device 40 to be the storage destination of the position information, based on the tag ID received by the wireless communication unit 331 and the storage destination information stored in the storage destination information database 337 (step S3005). That is, the storage destination identifying unit 333 of the conversion device 30 identifies the management device 40 to be the storage destination by acquiring the storage destination associated with the tag ID from the storage destination information.

Note that in the present embodiment, the management device 40 to be the storage destination is identified according to the tag ID of the wireless tag 10; however, the present embodiment is not so limited. For example, when the number of wireless tags 10 is increased, the position information may be stored upon changing the management device 40 to be the storage destination. Furthermore, for example, when a failure, a problem, etc., occurs in the management device 40-1, and the position information cannot be stored in the management device 40-1, the position information may be stored in the management device 40-2.

Furthermore, for example, the management device 40 to be the storage destination may be identified based on the position information of the wireless tag 10. More specifically, when the position information indicates an indoor position inside of a factory, etc., the management device 40-1 may be identified as the storage destination, and when the position information indicates an outdoor position outside of a factory, etc., the management device 40-2 may be identified as the storage destination.

Furthermore, for example, the management device 40 to be the storage destination may be identified based on the time when the conversion device 30 has received the radio field intensity information, etc. More specifically, when the radio field intensity information, etc., is received at a time within the business hours of the factory, the management device 40-1 may be identified as the storage destination, and when the radio field intensity information, etc., is received at a time outside the business hours of the factory, the management device 40-2 may be identified as the storage destination.

Then, the network communication unit 334 of the conversion device 30 sends the position information to the management device 40 identified as the storage destination by the storage destination identifying unit 333 (step S3006). That is, the network communication unit 334 of the conversion device 30 sends the position information to the host name (address information) included in the storage destination identified by the storage destination identifying unit 333.

When network communication unit 441 receives the position information from the conversion device 30, the information management unit 442 of the management device 40 stores this information in association with the time and date (information relevant to date and time) in the movement history information stored in the movement history information database 445 (step S3007). At this time, the time and date associated with the position information is to be the time and date when the wireless tag 10 has sent the radio field intensity information. However, the time and date are not so limited; for example, the time and date when the management device 40 has received the position information from the conversion device 30 may be stored in association with the position information in the movement history information.

The processes of steps S3002 through S3007 described above are performed at every predetermined interval (for example, a time interval such as several milliseconds through several seconds), while the worker, etc., is moving the article to which the wireless tag 10 is attached. That is, the processes are performed at every predetermined time interval while the movement detection unit 11 of the wireless tag 10 attached to the article, is detecting that the article is being moved.

Note that when a predetermined time (for example, 60 seconds) passes without the movement detection unit 11 detecting that the article has started moving or that the article is moving, the wireless tag 10 stops supplying power to the wireless module 105 from the power source. Therefore, for example when a predetermined time passes after the article stops moving, the wireless communication unit 12 stops receiving radio waves of wireless communication sent from the wireless communication device 20.

As described above, the movement history information when the article is moved is managed in the management device 40. Furthermore, in the present embodiment, the management device 40 to manage the movement history information is identified according to the tag ID of the wireless tag 10. Accordingly, it is possible to set different management devices 40 for managing the movement history information, according to, for example, the type of the article and the importance level of the article.

For example, the movement history information of the wireless tag 10 attached to an article of company ABC may be managed by the management device 40-1, and the movement history information of the wireless tag 10 attached to an article of company XYZ may be managed by the management device 40-2.

Furthermore, for example, the movement history information of the wireless tag 10 attached to an article having a high importance level may be managed by an on premise type management device 40-1, and the movement history information of the wireless tag 10 attached to an article having an importance level that is not high may be managed by a cloud-type type management device 40-2.

As described above, the user such as an administrator, etc., of the position management system 1 according to the present embodiment can change the storage destination of the position information according to the type, the quality, etc., of the article. Furthermore, the user such as an administrator, etc., of the position management system 1 can easily change the storage destination of the position information by updating the storage destination information.

Figure 31:
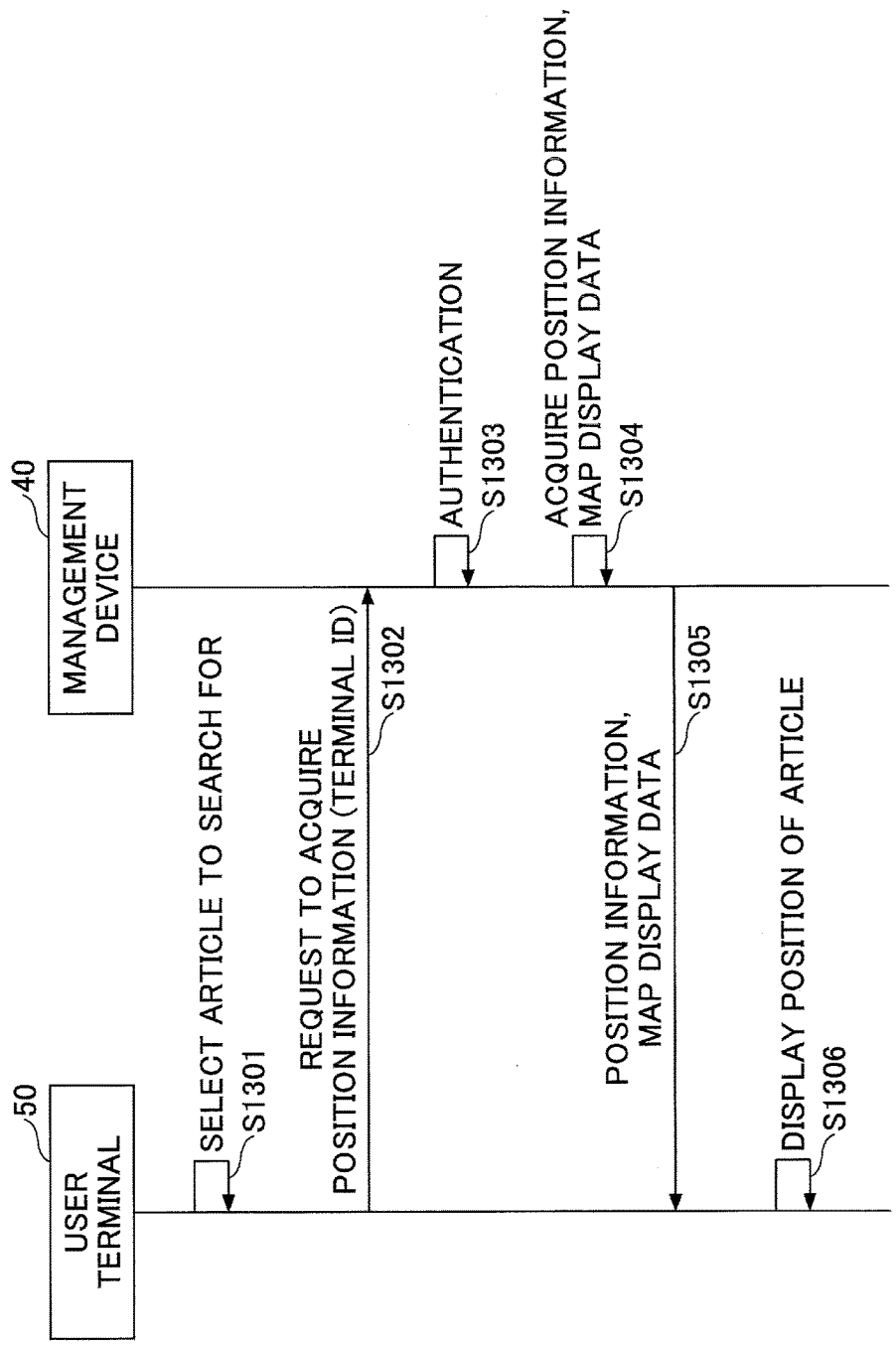
FIG. 31 is a sequence diagram of an example of a process of displaying position information according to the third embodiment.

Next, a description is given of a process of displaying the position of the storage location, etc., of an article on the user terminal 50 by the user, with reference to FIG. 31. FIG. 31 is a sequence diagram of an example of a process of displaying position information according to the third embodiment.

First, the user operates the user terminal 50, and displays, for example, an article selection screen 1000 illustrated in FIG. 32, on the display device 202. Then, the user selects the article to be searched for (that is, the article for which the user wants to display the present position) in the article selection screen 1000 (step S1301). This can be performed, for example, as the user selects the desired article name from a list of article names 1100 displayed on the article selection screen 1000.

Next, when the input unit 52 accepts a selection of an article name, the network communication unit 51 of the user terminal 50 sends a request to acquire position information of the article having the selected article name, to the management device 40 (step S1302). Here, the network communication unit 51 of the network communication unit 51 sends a request to acquire the position information of the article, to the management device 40 in which the position information of the selected article is managed.

For example, when the user of the user terminal 50 has selected an article name "mold of ○○ of company ABC" in the article selection screen 1000, the network communication unit 51 of the user terminal 50 sends a request to acquire the position information of the article to the management device 40-1. On the other hand, when the user of the user terminal 50 has selected an article name "mold of ○Δ of company XYZ" in the article selection screen 1000, the network communication unit 51 of the user terminal 50 sends a request to acquire the position information of the article to the management device 40-2.

Note that the request to acquire the position information of the article includes the terminal ID of the user terminal 50 and the article name of the selected article. However, the acquisition request may include an article ID for uniquely identifying the selected article, instead of the article name.

Next, when the request to acquire the position information of the article is received from the user terminal 50 via the network communication unit 441, the authentication unit 443 of the management device 40 performs authentication based on the terminal ID included in the acquisition request (step S1303). That is, the authentication unit 443 of the management device 40 performs authentication as to whether the acquisition request is made by a valid user terminal 50, by determining whether the terminal ID included in the request to acquire the position information of the article is included in the authentication information stored in the authentication information database 444.

Here, a case where the authentication is successful in step S1303 is a case where the terminal ID included in the request to acquire the position information of the article is stored in the authentication information stored in the authentication information database 444.

For example, when the terminal ID included in the request to acquire the position information of the article is "DEV001", and the management device 40-1 receives the acquisition request, the authentication unit 443 of the management device 40-1 determines that the authentication is successful. On the other hand, when the terminal ID included in the request to acquire the position information of the article is "DEV001", and the management device 40-2 receives the acquisition request, the authentication unit 443 of the management device 40-2 determines that the authentication is unsuccessful. In the following, the description is continued assuming that the authentication is successful.

Note that when the authentication is unsuccessful, the authentication unit 443 of the management device 40 sends a report indicating that the position information of the article cannot be acquired, to the user terminal 50 that is the transmission source of the request to acquire the position information of the article, via the network communication unit 441.

The information management unit 442 of the management device 40 acquires the corresponding position information and map display data (step S1304).

That is, first, the information management unit 442 acquires a tag ID associated with an article name from the article information stored in the article information database 447. Next, the information management unit 442 acquires the newest position information associated with the acquired tag ID (that is, the position information having the newest time and date) from the movement history information stored in the movement history information database 445. Lastly, the information management unit 442 acquires the map display data associated with the area ID included in the acquired position information, from the map information stored in the map information database 446. As described above, the information management unit 442 acquires the newest position information of the article having the article name selected by the user, and map display data for displaying a map of the area.

Note that when an area ID included in the newest first position information is not set (that is, when the newest first position information and second position information are position information of outdoors), the information management unit 42 does not acquire the map display data.

Then, the network communication unit 441 of the management device 40 sends the position information and the map display data acquired by the information management unit 442, to the user terminal (step S1305).

Note that at this time, the network communication unit 441 of the management device 40 sends, to the user terminal 50, error information indicating the error of the position information acquired by the information management unit 442. For example, the error information may be a value set in advance by the administrator, etc., of the position management system 1, based on, for example, the prediction precision of the prediction model stored in the prediction model database 336, a standard of wireless communication used by the wireless communication device 20, etc.

Figure 33:
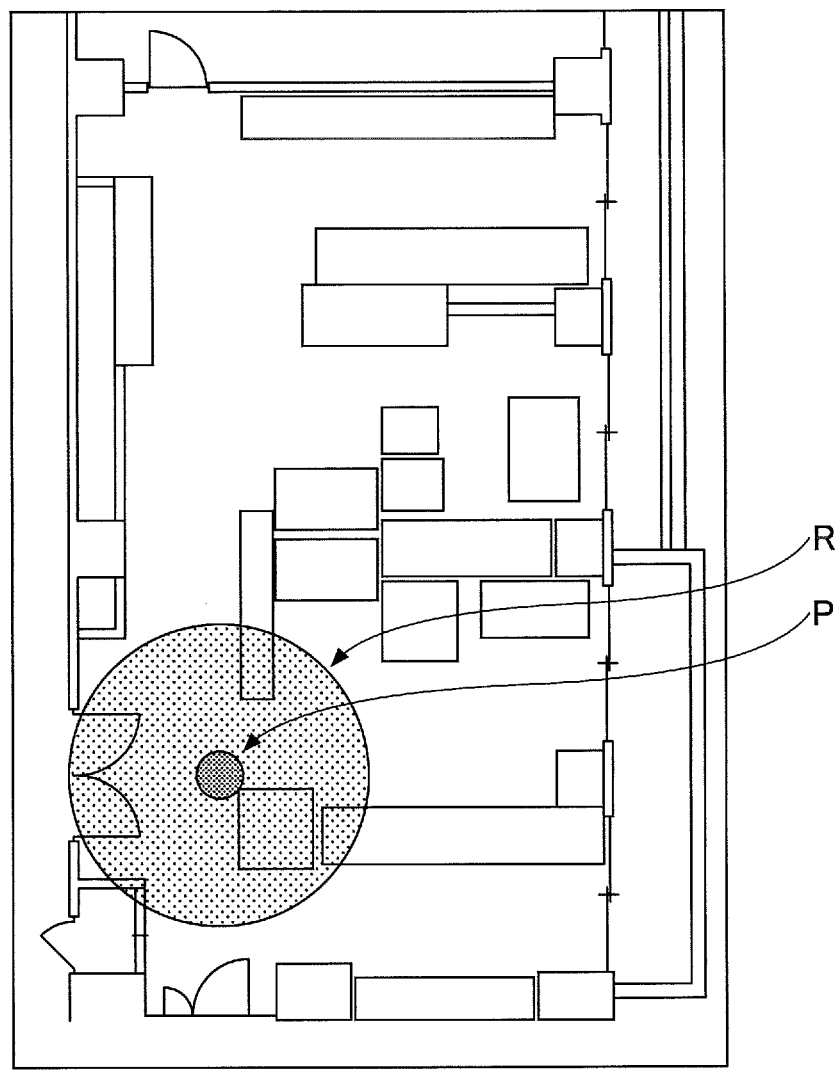
FIG. 33 illustrates an example of an article position display screen.

Lastly, when the network communication unit 51 receives the position information, the map display data, etc., the display unit 53 of the user terminal 50 displays, for example, an article position display screen 2000 illustrated in FIG. 33, on the display device 202 (step S1306).

In the article position display screen 2000 illustrated in FIG. 33, the newest position of the article having the article name selected by the user in the article selection screen 1000 illustrated in FIG. 32, is displayed as a position P in the map displayed based on the received map display data. Furthermore, in the article position display screen 2000, an error range R indicating the error of the position of the article is displayed based on the received error information. Accordingly, the user is able to recognize that the article having the article name selected in the article selection screen 1000, is present near the position P including the error range R. Therefore, the user is able to find the desired article, by searching the area near the position P including the displayed error range R.

Note that in step S1306, the user terminal 50 may acquire the position information within a predetermined past time period, in addition to the newest position information. Accordingly, the display unit 53 of the user terminal 50 is able to display the movement trajectory of the article from a position at a predetermined past time to the newest position. Therefore, the user can easily predict where the article is situated within the error range R, based on the displayed movement trajectory.

As described above, the user is able to recognize the present position of an article by using the user terminal 50. Furthermore, in the present embodiment, when the user terminal 50 acquires the position information, the management device 40 performs authentication. Therefore, it is possible to change the user terminal 50 that can acquire the position information to a different user terminal 50, according to, for example, the importance level, the quality, etc., of the article.

In the present embodiment, the user terminal 50-1 used by a user A can acquire the position information of an article from the management device 40-1, whereas the user terminal 50-2 used by a user B cannot acquire the position information of an article from the management device 40-1. Therefore, for example, it is possible to allow only the user terminals 50 used by a particular user group to acquire the position information from the management device 40 in which the position information of important articles are managed.

As described above, the position management system 1 according to the third embodiment manages the movement history information of the wireless tag 10 attached to an article.

Furthermore, in the position management system 1 according to the third embodiment, the management device 40 managing the movement history information can be changed to a different management device 40 according to the tag ID of the wireless tag 10. Accordingly, the administrator, etc., of the position management system 1 is able to flexibly change the management device 40 to be the storage destination of the position information, according to the importance level, the quality, etc., of the article that is the management target.

Furthermore, the position management system 1 according to the third embodiment is able to restrict the article for which the position can be displayed, according to the user terminal 50.

Fourth Embodiment

Next, a description is given of a process by the position management system 1 according to a fourth embodiment. The position management system 1 according to the fourth embodiment is different from the third embodiment in that an IMES transmitter for transmitting position information according to the IMES (Indoor Messaging System) standard is included. Accordingly, the position management system 1 according to a fourth embodiment is able to manage position information of indoors and position information of outdoors. Note that in the fourth embodiment, the differences between the fourth embodiment and the third embodiment are described, and the parts having substantially the same functional configuration as those of the third embodiment are denoted by the same reference numerals, and overlapping descriptions are omitted.

<System Configuration>

Figure 34:
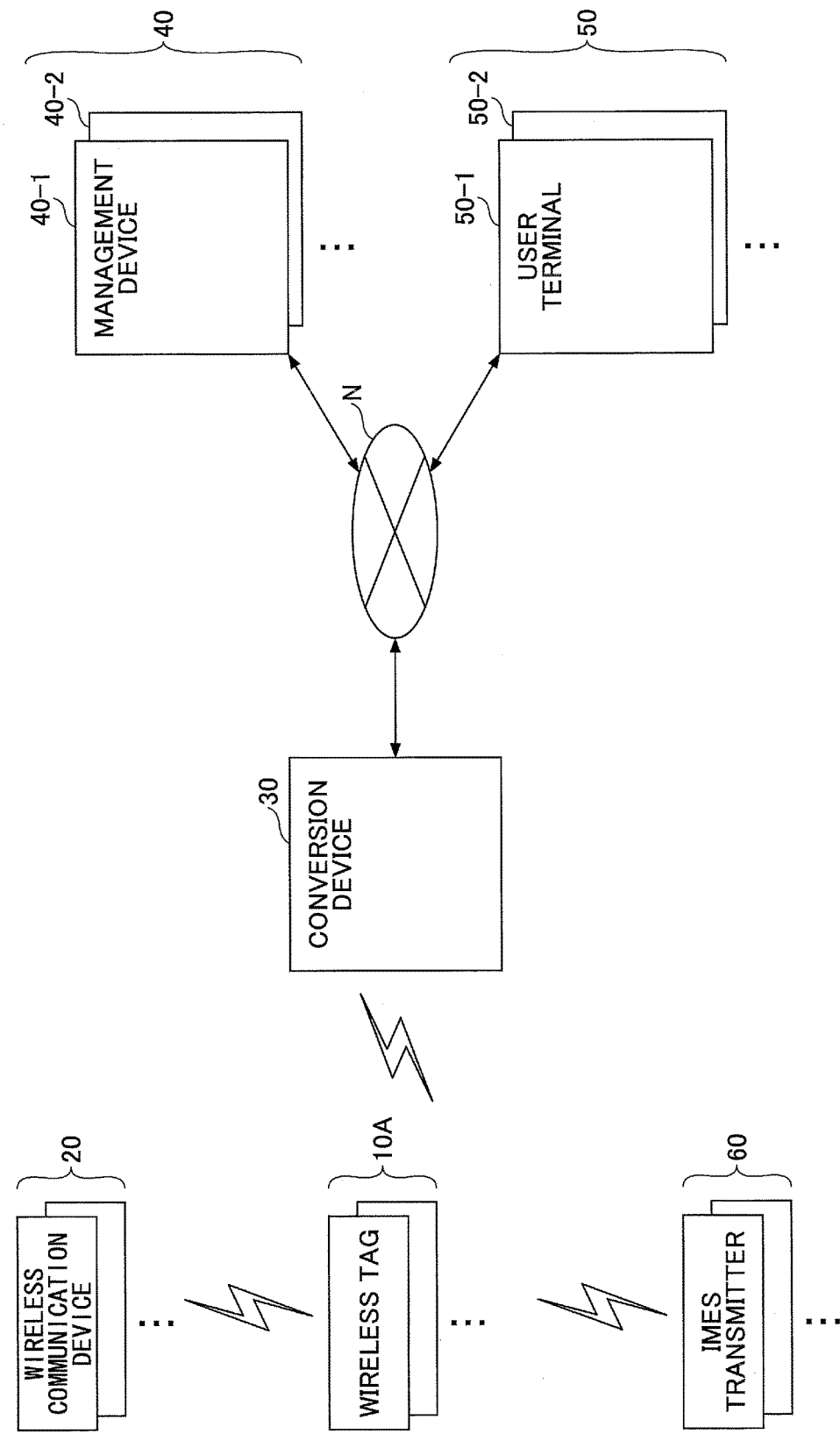
FIG. 34 illustrates an example of a system configuration of the position management system according to a fourth embodiment.

First, a description is given of a position management system 1 according to the fourth embodiment of the present invention, with reference to FIG. 34. FIG. 34 illustrates an example of a system configuration of the position management system 1 according to the fourth embodiment. The position management system 1 according to the fourth embodiment includes the IMES transmitter 60.

The IMES transmitter 60 is a device for transmitting the position information according to the IMES standard. At least one IMES transmitter 60 is installed in an area, and the IMES transmitter 60 sends the position information within a predetermined surrounding range. Here, the position information according to the IMES standard includes the latitude and longitude information, the floor information, etc., of the IMES transmitter 60 set in advance. Floor information is information relevant to the floor of a building, etc., and is set in units of, for example, 0.5 floors. Accordingly, it is possible to recognize the floor of a building on which the article to which the wireless tag 10 is attached is located, in the latitude and longitude indicated by the latitude and longitude information included in the position information.

Furthermore, the wireless tag 10A included in the position management system 1 according to the fourth embodiment receives position information sent from the IMES transmitter 60.

Here, in the following, as a matter of convenience, the position information described in the third embodiment (the position information that is estimated based on radio field intensity information) is expressed as "first position information", and the position information sent form the IMES transmitter 60 is expressed as "second position information".

<Hardware>

Figure 35:
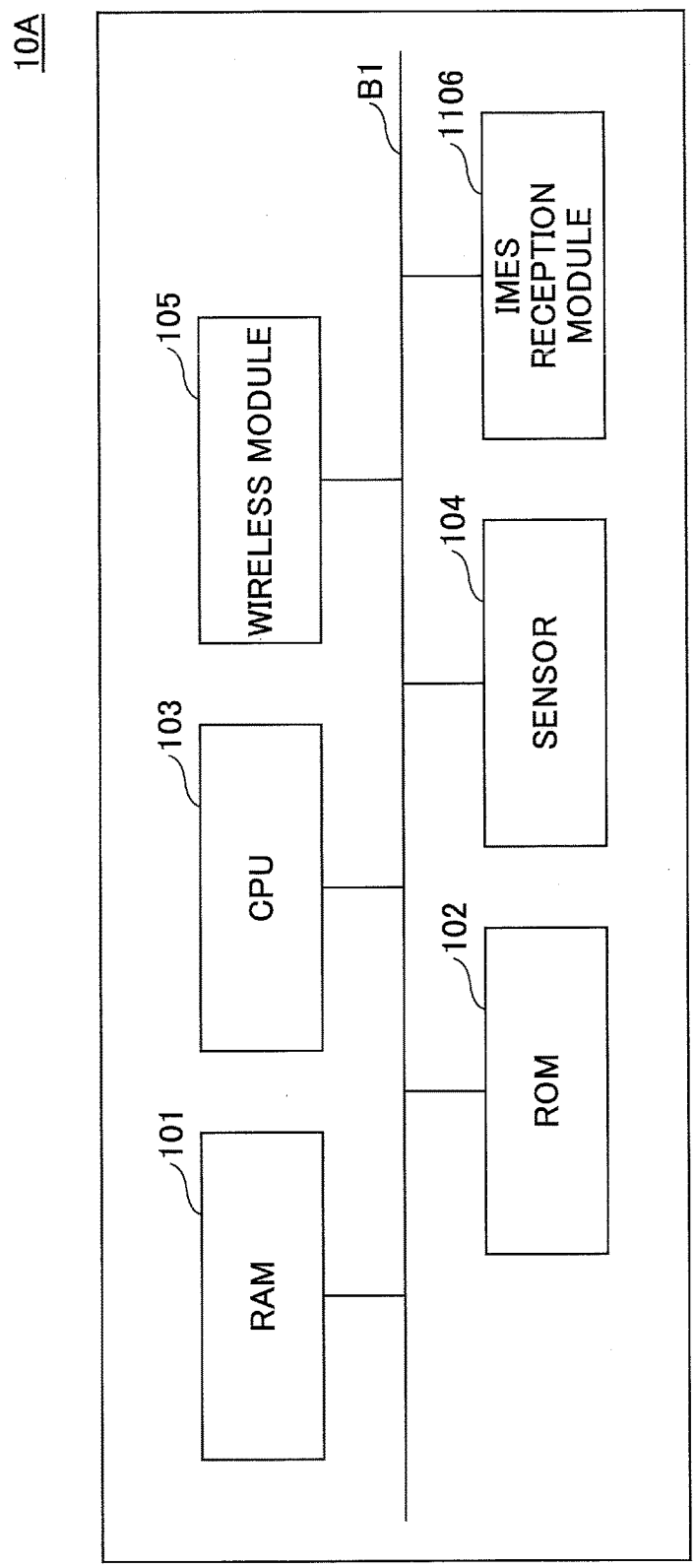
FIG. 35 illustrates an example of a hardware configuration of the wireless tag according to the fourth embodiment.

Next, a hardware configuration of the wireless tag 10A included in the position management system 1 according to the fourth embodiment is described with reference to FIG. 35. FIG. 35 illustrates an example of a hardware configuration of the wireless tag 10A according to the fourth embodiment. The wireless tag 10A includes an IMES reception module 1106.

The IMES reception module 1106 is a module for receiving, from the IMES transmitter 60, frames according to the IMES standard including the second position information.

The wireless tag 10A according to the present embodiment implements various processes described below, by the hardware configuration illustrated in FIG. 35. Note that the wireless tag 10A according to the present embodiment does not include an IMES transmission module. Therefore, compared to a case where an IMES transmission module is included, the wireless tag 10A according to the present embodiment can be realized at low cost.

<Functional Configuration>

Figure 36:
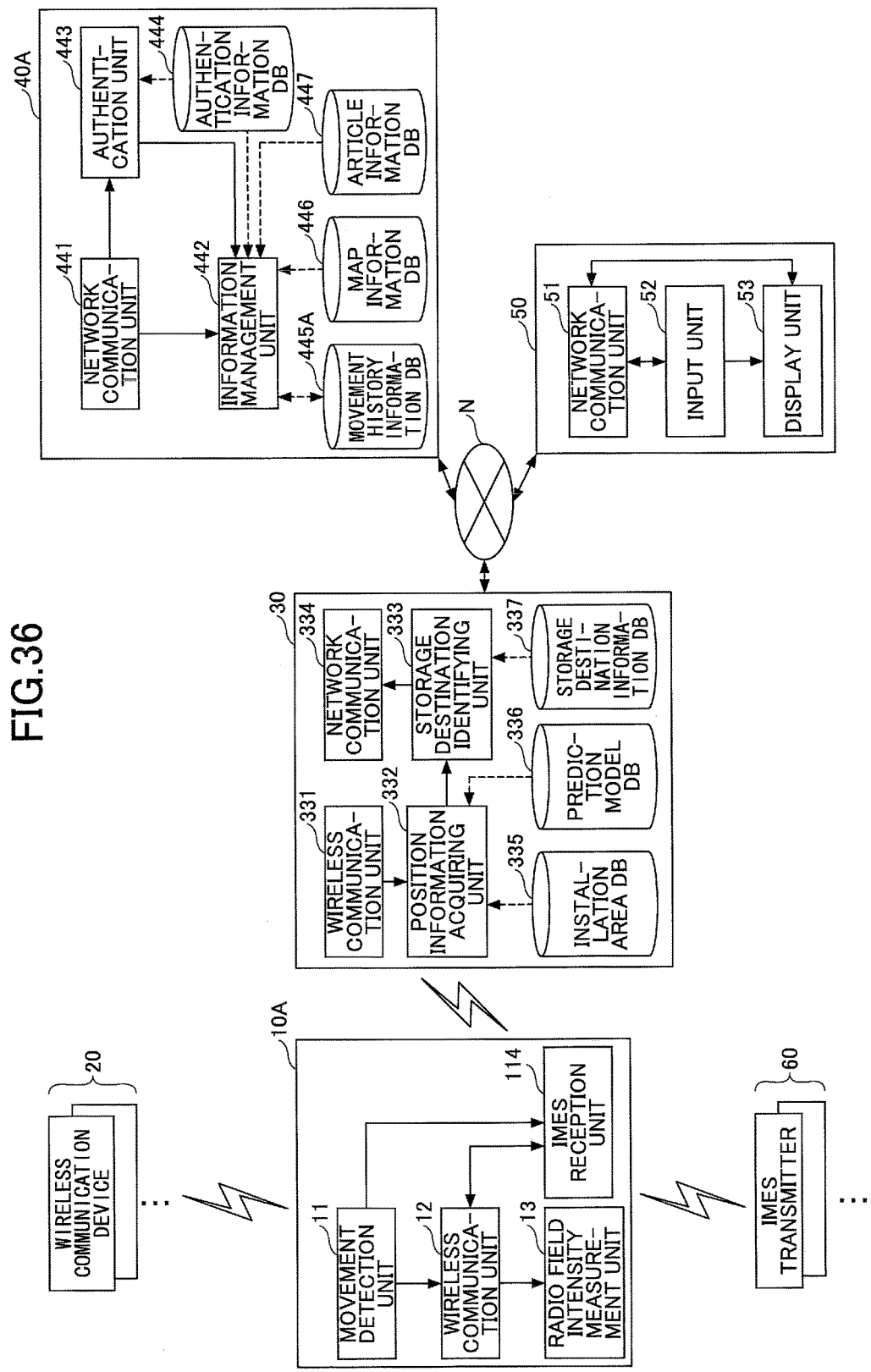
FIG. 36 illustrates an example of a functional configuration of the position management system according to the fourth embodiment.

Next, a description is given of a functional configuration of the position management system 1 according to the fourth embodiment, with reference to FIG. 36. FIG. 36 illustrates an example of a functional configuration of the position management system 1 according to the fourth embodiment. The fourth embodiment is different from the third embodiment in that the wireless tag 10A includes an IMES reception unit 114.

The IMES reception unit 114 is realized by, for example, the CPU 103, the IMES reception module 1106, etc., and receives radio waves according to the IMES standard from the IMES transmitter 60, and acquires second position information included in the radio waves.

Furthermore, the management device 40A has a different movement history information database 445A. A description is given of the movement history information stored in the movement history information database 445A, with reference to FIGS. 37A and 37B. FIGS. 37A and 37B illustrate examples of the movement history information database 445A. The movement history information according to the fourth embodiment is information for managing the history of the first position information and the second position information of the wireless tag 10A at every hour, and includes data items of a time and date, first position information, and second position information, for each tag ID. The tag ID, the time and date, and the first position information are as described in the third embodiment. The second position information is latitude and longitude information and floor information received by the wireless tag 10A from the IMES transmitter 60. As described above, in the movement history information according to the fourth embodiment, the history of the first position information and the second position information is managed. Accordingly, for example, in a map expressing indoors inside a factory, etc., the position of an article can be displayed by using the first position information, while in a map expressing outdoors including the outside of a factory, the position of an article can be displayed by using the second position information. Furthermore, by including floor information in the second position information in addition to the latitude and longitude information, the floor of the factory on which the article is located, can be displayed.

<Details of Process>

Next, a description is given of details of processes of the position management system 1 according to the fourth embodiment.

First, similar to the third embodiment, a description is given of a process of storing the movement history information of the wireless tag 10A in the management device 40A in a case where, for example, a worker of a factory, etc., moves an article to which the wireless tag 10A is attached, with reference to FIG. 38. FIG. 38 is a sequence diagram of an example of a process of storing the movement history information according to the fourth embodiment.

The worker, etc., starts to move an article, to which the wireless tag 10A is attached. Then, the movement detection unit 11 of the wireless tag 10A detects that the movement of the article has started (step S2001). At this time, the wireless tag 10A supplies power to the wireless module 105 and the IMES reception module 1106 from a power source, upon being triggered by the detection of the start of movement by the movement detection unit 11. Then, the wireless communication unit 12 receives radio waves of wireless communication sent from the wireless communication device 20. Furthermore, the IMES reception unit 114 receives radio waves according to the IMES standard sent from the IMES transmitter 60. As described above, power is supplied to the wireless module 105 and the IMES reception module 1106 of the wireless tag 10A upon being triggered by the detection of the start of movement by the movement detection unit 11. Therefore, it is possible to suppress the power consumption of the wireless module 105 and the IMES reception module 1106.

The IMES reception unit 114 of the wireless tag 10A acquires second position information included in the radio wave received from the IMES transmitter (step S2002). Note that when the IMES reception unit 114 receives radio waves according to the IMES standard from a plurality of IMES transmitters 60, the IMES reception unit 114 acquires the second position information included in the radio wave having strong radio field intensity (reception intensity).

The wireless communication unit 12 of the wireless tag 10A sends, to the conversion device 30, the radio field intensity information generated by the radio field intensity measurement unit 13, the tag ID of the wireless tag 10A, and the second position information acquired by the IMES reception unit 114 (step S2003). Note that the wireless communication unit 12 may directly send the radio field intensity information, the tag ID, and the second position information to the conversion device 30, or may send this information to the conversion device 30 via one or more wireless communication devices 20.

The network communication unit 334 of the conversion device 30 sends the first position information and the second position information to the management device 40A that is the storage destination identified by the storage destination identifying unit 333 (step S2004). As described above, in the fourth embodiment, the conversion device 30 directly sends the received second position information to the management device 40A.

Lastly, when the network communication unit 441 receives the first position information and the second position information from the conversion device 30, the information management unit 442 of the management device 40A stores the first position information and the second position information in association with the time and date in the movement history information (step S2005). At this time, the time and date associated with the first position information and the second position information is to be the time and date when the wireless tag 10A has sent the radio field intensity information. However, the time and date are not so limited; the time and date when the management device 40A has received the first position information and the second position information from the conversion device 30 may be stored in association with the first position information and the second position information in the movement history information.

Note that in step S2005, the area ID included in the first position information is the installation area ID obtained by the conversion based on the device ID included in the radio field intensity information at the conversion device 30; however, the present embodiment is not so limited; the area ID may be the area ID acquired based on the second position information. That is, the area ID of the area in which the IMES transmitter 60 is installed indicated by the second position information acquired in step S2002 may be the area ID in included in the first position information. Accordingly, it is possible to acquire an appropriate area ID even when the wireless tag 10A is stored (or passing, etc.) near the boundary of two areas, etc.

Note that the processes of FIG. 38 described above are performed at every predetermined interval (for example, a time interval such as several milliseconds through several seconds), while the worker, etc., is moving the article to which the wireless tag 10A is attached.

Note that when a predetermined time (for example, 60 seconds) passes without the movement detection unit 11 detecting that the article has started moving or that the article is moving, the wireless tag 10A stops supplying power to the wireless module 105 and the IMES reception module 1106 from the power source. Therefore, for example, when a predetermined time passes after the article stops moving, the IMES reception unit 114 stops receiving the second position information sent from the IMES transmitter 60.

As described above, the movement history information in the case where the article is moved, is managed in the management device 40. Furthermore, in the present embodiment, the second position information indicating the position information according to the IMES standard can also be managed.

Figure 39:
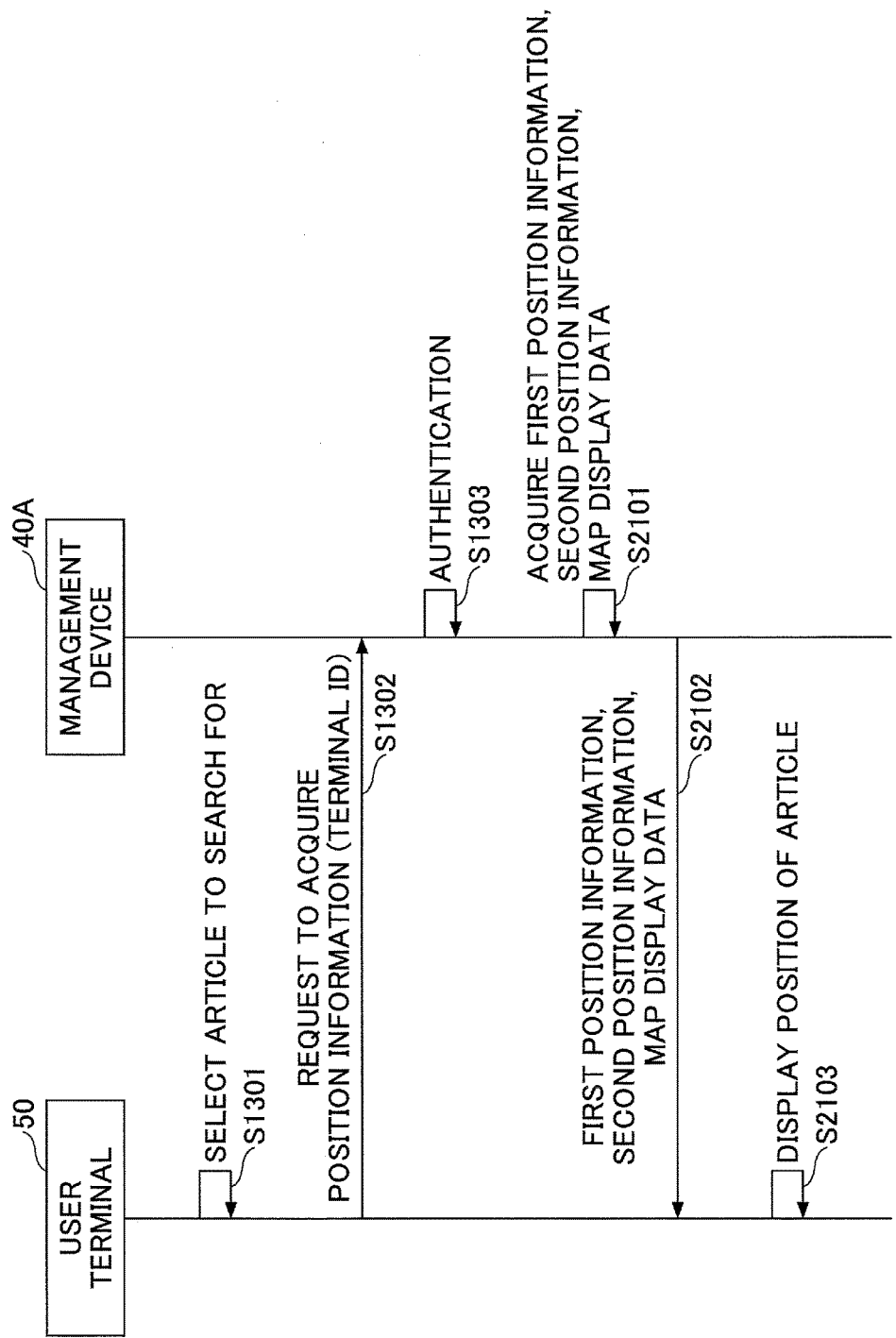
FIG. 39 is a sequence diagram of an example of a process of displaying position information according to the fourth embodiment.

Next, a description is given of a process of displaying the position such as a storage location, etc., of an article on the user terminal 50 by the user, with reference to FIG. 39. FIG. 39 is a sequence diagram of an example of a process of displaying position information according to the fourth embodiment.

The information management unit 442 of the management device 40A acquires the corresponding first position information, second position information, and map display data (step S2101).

That is, first, the information management unit 442 acquires a tag ID associated with an article name from the article information stored in the article information database 447. Next, the information management unit 442 acquires the newest first position information and second position information associated with the acquired tag ID from the movement history information stored in the movement history information database 445A. Lastly, the information management unit 442 acquires the map display data associated with the area ID included in the acquired position information, from the map information stored in the map information database 446. As described above, the information management unit 442 acquires the newest first position information and second position information of the article having the article name selected by the user, and map display data for displaying a map of the area Then, the network communication unit 441 of the management device 40A sends the first position information, the second position information, and the map display data acquired by the information management unit 442, to the user terminal 50 (step S2102).

Note that at this time, the network communication unit 441 of the management device 40A sends, to the user terminal 50, first error information indicating the error of the first position information and second error information indicating the error of the second position information acquired by the information management unit 442. The first error information may be a value set in advance by the administrator, etc., of the position management system 1, based on, for example, the prediction precision of the prediction model stored in the prediction model database 336, a standard of wireless communication used by the wireless communication device 20, etc. Furthermore, the second error information may be the positioning error according to the IMES standard.

Figure 40:
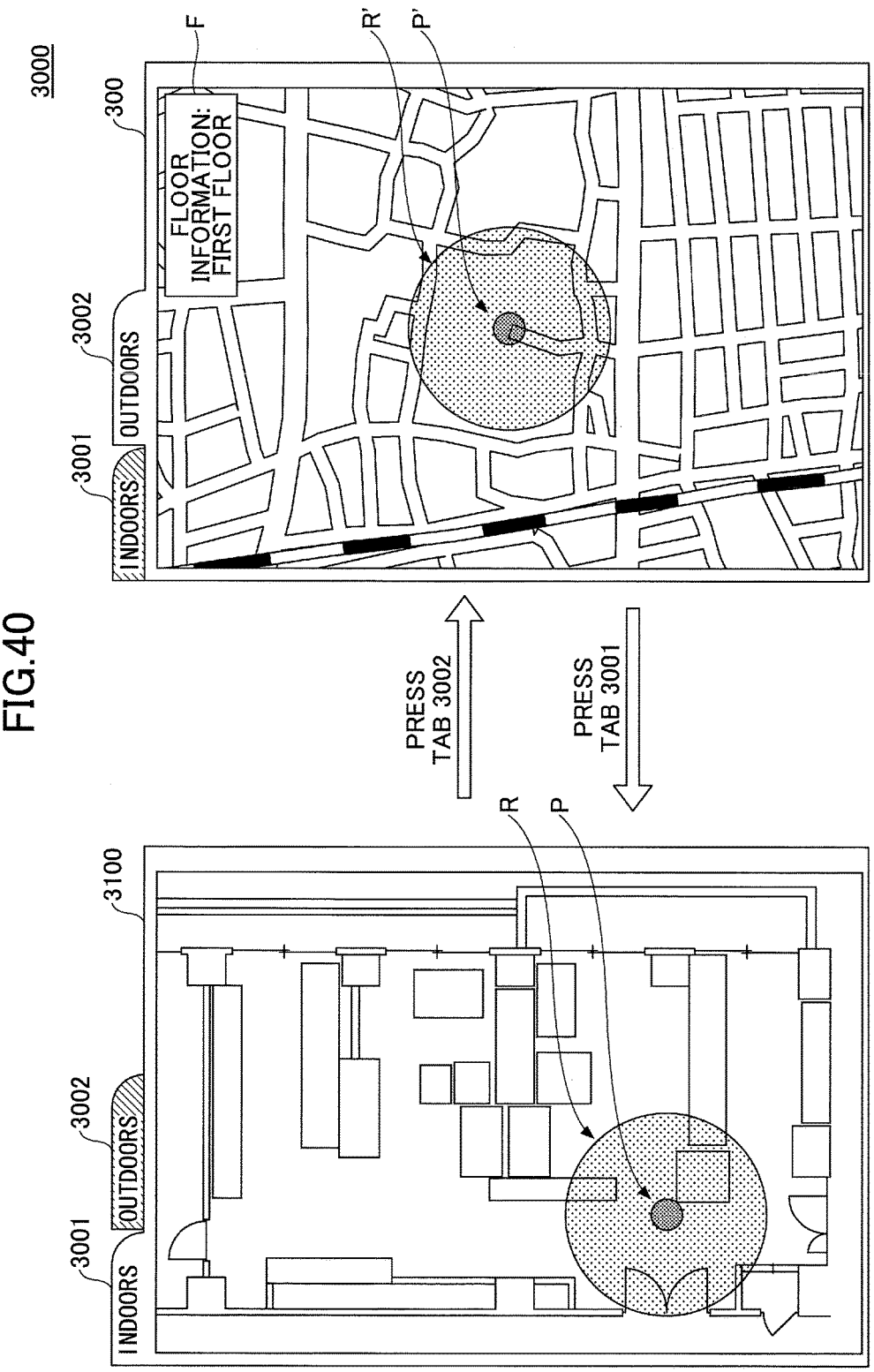
FIG. 40 illustrates an example of an article position display screen.

Lastly, when the network communication unit 51 receives the first position information, the second position information, the map display data, etc., the display unit 53 of the user terminal 50 displays, for example, an article position display screen 3000 illustrated in FIG. 40, on the display device 202 (step S2103).

In the article position display screen 3000 illustrated in FIG. 40, the display of an indoors position display screen 3100 and an outdoors position display screen 3200 can be switched by selecting a tab 3001 or a tab 3002. In the indoors position display screen 3100, the newest position of the article based on the first position information is displayed at a position P on the map displayed based on map display data, similar to the article position display screen 2000 illustrated in FIG. 33. Furthermore, in the indoors position display screen 3100, an error range R indicating the error of the position of an article is displayed based on the first error information. Accordingly, the user is able to recognize the position of the article displayed on the map of indoors of the factory. Here, in the indoors position display screen 3100, by selecting the tab 3002, it is possible to switch the display to the outdoors position display screen 3200.

On the other hand, in the outdoors position display screen 3200, the newest position of the article based on the second position information is displayed at a position P' on the map indicating a wider range including outdoors. Furthermore, in the outdoors position display screen 3200, an error range R' indicating the error of the position of an article is displayed based on the second error information. Accordingly, the user is able to recognize the position of the article displayed on the map including outdoors outside the factory.

Furthermore, in the outdoors position display screen 3200, floor information F is displayed. Accordingly, it is possible to recognize the floor of a building on which the article is located, in the latitude and longitude in the range indicated by the position P' including the error R'.

Here, in the outdoors position display screen 3200, by selecting the tab 3001, it is possible to switch the display to the indoors position display screen 3100. Note that the map display data of the map displayed in the outdoors position display screen 3200 may be acquired from, for example, an external map display data providing service, or map display data stored in the user terminal 50 in advance may be used.

As described above, the position management system 1 according to the fourth embodiment manages the history of the first position information based on the radio field intensity received by the wireless tag 10A from the wireless communication device 20 and the second position information received by the wireless tag 10A from the IMES transmitter 60. Accordingly, when displaying the position of a desired article, the user can use the user terminal 50 to display the position of the article indoors inside a factory, etc., based on the first position information, and display the position of the article outdoors outside the factory, etc., based on the second position information. Therefore, in the position management system 1 according to the fourth embodiment, the indoors position information of an article and the outdoors position information of an article can be switched in a seamless manner. Furthermore, even when the article is taken outdoors, the user is able to display the position of the article based on the second position information.

Note that when an article to which the wireless tag 10A according to the present embodiment is attached, is taken outdoors, the latitude and longitude information, which is measured based on radio waves received by the IMES reception module 1106 from GPS (Global Positioning System), is to be sent to the conversion device 30.

At this time, the wireless tag 10A is to send the latitude and longitude information to the conversion device 30, by communication defined according to a standard such as 3G (3rd Generation), LTE (Long Term Evolution), etc.

According to one embodiment of the present invention, a position management system, a position management apparatus, and a position management method are provided, which are capable of supporting the operation of identifying the present position of a device indoors and outdoors.

According to one embodiment of the present invention, a position management system, a position management apparatus, and a position management method are provided, which are capable of flexibly changing the element managing the present position of a device.

The position management system, the position management apparatus, and the position management method are not limited to the specific embodiments described herein, and variations and modifications may be made without departing from the spirit and scope of the present invention.

The present application is based on and claims the benefit of priority of Japanese Priority Patent Application No. 2015-098302, filed on May 13, 2015, Japanese Priority Patent Application No. 2015-098298, filed on May 13, 2015, Japanese Priority Patent Application No. 2015-098299, filed on May 13, 2015, Japanese Priority Patent Application No. 2015-098300, filed on May 13, 2015, and Japanese Priority Patent Application No. 2015-098301, filed on May 13, 2015, the entire contents of which are hereby incorporated herein by reference.

What is claimed is:

1. A position management system for managing position information of a second device configured to perform communication with a predetermined first device installed indoors and an indoor messaging system transmitting device, the position management system including one or more information processing apparatuses for implementing various functions of the position management system, the position management system comprising:
a plurality of processors configured to:
detect a movement of the second device;
receive a radio wave according to a predetermined wireless communication standard from the first device when the movement of the second device is detected;
receive second position information including latitude and longitude information from the indoor messaging system transmitting device when the movement of the second device is detected;
measure an intensity of the received radio wave, estimate a position of the second device based on the measured intensity of the radio wave, and acquire first position information indicating the estimated position;
store the first position information and the second position information in association with time information in a predetermined storage unit,
receive a radio wave from a global positioning system when the second device moves outdoors where the second device cannot perform communication with the indoor messaging system transmitting device, and set latitude and longitude information, which is measured based on the radio wave received from the global positioning system, as the second position information, and
provide a most recent first position information and a most recent second position information that are most recently stored in association with the time information in the predetermined storage unit upon receiving a request for the first position information and the second position information from a user.

2. The position management system according to claim 1, wherein the plurality of processors configured to:
determine whether the second device has moved outdoors, and send a report indicating that the second device has moved outdoors to a terminal device which is one of the information processing apparatuses included in the position management system according to the determination result, and
determine whether the second device has moved outdoors based on the first position information and the second position information stored in the predetermined storage unit.

3. The position management system according to claim 2, wherein the plurality of processors configured to store the second position information in association with the time information in the predetermined storage unit without setting the first position information, when the second device has moved outdoors where the second device cannot perform communication with the first device.

4. The position management system according to claim 3, wherein the plurality of processors configured to determine that the second device has moved outdoors when the first position information associated with newest time information is not set in the predetermined storage unit.

5. The position management system according to claim 1, wherein the positioning management system includes a conversion device that converts the intensity of the radio wave into position information, and includes the installation area database and the prediction model database.

6. The position management system according to claim 1, wherein, the processor is further configured to estimate the position of the second device based on installation area information that is stored in an installation area database and a prediction model that is stored in a prediction model database.

7. A position management apparatus for managing position information of a second device configured to perform communication with a predetermined first device installed indoors and an indoor messaging system transmitting device, the position management apparatus comprising:
a processor that is configured to:
receive information indicating an intensity of a radio wave received from the first device by the second device, and second position information including latitude and longitude information received from the indoor messaging system transmitting device by the second device, according to a movement of the second device;
estimate a position of the second device based on the information indicating the intensity of the received radio wave, and acquire first position information indicating the estimated position;
store the first position information and the second position information in association with time information in a predetermined storage unit, and
receive a radio wave from a global positioning system when the second device moves outdoors where the second device cannot perform communication with the indoor messaging system transmitting device, and acquires the second position information indicating latitude and longitude information that is measured based on the radio wave received from the global positioning system, and provide a most recent first position information and a most recent second position information that are most recently stored in association with the time information in the predetermined storage unit upon receiving a request for the first position information and the second position information from a user.

8. A position management method performed in a position management system for managing position information of a second device configured to perform communication with a predetermined first device installed indoors and an indoor messaging system transmitting device, the position management system including one or more information processing apparatuses for implementing various functions of the position management system, the position management method comprising:

detecting a movement of the second device;
receiving a radio wave according to a predetermined wireless communication standard from the first device when the movement of the second device is detected at the detecting;
receiving second position information including latitude and longitude information from the indoor messaging system transmitting device when the movement of the second device is detected at the detecting;
measuring an intensity of the received radio wave, estimating a position of the second device based on the measured intensity of the radio wave, and acquiring first position information indicating the estimated position; and
storing the first position information and the second position information in association with time information in a predetermined storage unit,
wherein the receiving of the second position information includes receiving a radio wave from a global positioning system when the second device moves outdoors where the second device cannot perform communication with the indoor messaging system IMES transmitting device, and setting latitude and longitude information, which is measured based on the radio wave received from the global positioning system, as the second position information, and
wherein the position management method further comprises a step of providing a most recent first position information and a most recent second position information that are most recently stored in association with the time information in the predetermined storage unit upon receiving a request for the first position information and the second position information from a user.

9. A position management method performed in a position management apparatus for managing position information of a second device configured to perform communication with a predetermined first device installed indoors and an indoor messaging system transmitting device, the position management method comprising:

receiving information indicating an intensity of a radio wave received from the first device by the second device, and second position information including latitude and longitude information received from the indoor messaging system transmitting device by the second device, according to a movement of the second device;

estimating a position of the second device based on the information indicating the intensity of the radio wave received at the receiving, and acquiring first position information indicating the estimated position; and storing the first position information and the second position information in association with time information in a predetermined storage unit, wherein the receiving includes receiving a radio wave from a global positioning system when the second device moves outdoors where the second device cannot perform communication with the indoor messaging system transmitting device, and acquiring the second position information indicating latitude and longitude information that is measured based on the radio wave received from the global positioning system, and wherein the position management method further comprises a step of providing a most recent first position information and a most recent second position information that are most recently stored in association with the time information in the predetermined storage unit upon receiving a request for the first position information and the second position information from a user.

10. A non-transitory computer-readable recording medium storing a program that causes a computer that constitutes a position management apparatus to execute a process, the position management apparatus managing position information of a second device configured to perform communication with a predetermined first device installed indoors and an indoor messaging system transmitting device, the process comprising:

receiving information indicating an intensity of a radio wave received from the first device by the second device, and second position information including latitude and longitude information received from the indoor messaging system transmitting device by the second device, according to a movement of the second device;

estimating a position of the second device based on the information indicating the intensity of the radio wave received at the receiving, and acquiring first position information indicating the estimated position; and storing the first position information and the second position information in association with time information in a predetermined storage unit, wherein the receiving includes receiving a radio wave from a global positioning system when the second device moves outdoors where the second device cannot perform communication with the indoor messaging system transmitting device, and acquiring the second position information indicating latitude and longitude information that is measured based on the radio wave received from the global positioning system, and wherein the process further comprises a step of providing a most recent first position information and a most recent second position information that are most recently stored in association with the time information in the predetermined storage unit upon receiving a request for the first position information and the second position information from a user.

11. A position management system for managing position information of a second device configured to perform wireless communication with a predetermined first device installed indoors, the position management system including one or more information processing apparatuses for implementing various functions of the position management system, the position management system comprising:

a plurality of processors configured to:
- receive a radio wave of the wireless communication from the first device when movement of the second device is detected;
- measure an intensity of the radio wave when the radio wave is received from the first device;
- estimate a position of the second device based on the measured intensity of the radio wave, and acquire position information indicating the estimated position;
- identify a storage destination of the position information, according to the second device;
- store the position information in association with time information in a predetermined storage unit, based on the storage destination, and
- provide a most recent position information that is most recently stored in association with the time information in the predetermined storage unit upon receiving a request for the position information from a user.

12. The position management system according to claim 11, wherein the plurality of processors configured to:
- identify address information indicating the predetermined storage unit that is the storage destination of the position information, according to the second device, and
- send the position information to the identified address information, and store the position information in association with the time information in the predetermined storage unit.

13. The position management system according to claim 12, wherein the plurality of processors configured to:
- send the position information to an external storage connected to the position management system via a network based on the identified address information, and store the position information in association with the time information in the external storage.

14. The position management system according to claim 11, wherein the plurality of processors are configured to identify the storage destination according to a device ID identifying the second device.

* * * * *